US012671657B2

(12) United States Patent
Singh

(10) Patent No.: US 12,671,657 B2
(45) Date of Patent: Jun. 30, 2026

(54) TECHNIQUES FOR PROCESSING NETWORK FLOWS

(71) Applicant: Oracle International Corporation, Redwood Shores, CA (US)

(72) Inventor: Brijesh Singh, Mercer Island, WA (US)

(73) Assignee: Oracle International Corporation, Redwood Shores, CA (US)

( * ) Notice: Subject to any disclaimer, the term of this patent is extended or adjusted under 35 U.S.C. 154(b) by 578 days.

(21) Appl. No.: 17/952,519

(22) Filed: Sep. 26, 2022

(65) Prior Publication Data

US 2023/0013110 A1 Jan. 19, 2023

Related U.S. Application Data

(63) Continuation-in-part of application No. 17/244,727, filed on Apr. 29, 2021, now Pat. No. 11,496,599.

(60) Provisional application No. 63/388,890, filed on Jul. 13, 2022.

(51) Int. Cl.
*H04L 47/10* (2022.01)
*G06F 9/48* (2006.01)
*H04L 45/64* (2022.01)

(52) U.S. Cl.
CPC ............ *H04L 47/10* (2013.01); *G06F 9/4843* (2013.01); *H04L 45/64* (2013.01)

(58) Field of Classification Search
None
See application file for complete search history.

(56) References Cited

U.S. PATENT DOCUMENTS

| | | | |
|---|---|---|---|
| 8,930,690 B2 | 1/2015 | Zuo et al. | |
| 9,674,090 B2 | 6/2017 | Caulfield et al. | |
| 10,742,558 B1 | 8/2020 | Matthews et al. | |
| 10,841,243 B2 | 11/2020 | Levi et al. | |
| 11,157,422 B2 | 10/2021 | Bernat et al. | |
| 11,388,225 B1 * | 7/2022 | Duraj | H04L 63/0478 |
| 11,456,951 B1 | 9/2022 | Wu | |

(Continued)

FOREIGN PATENT DOCUMENTS

| | | |
|---|---|---|
| EP | 3621251 A1 | 3/2020 |
| WO | 2020068725 A1 | 4/2020 |

OTHER PUBLICATIONS

U.S. Appl. No. 17/394,300 , Final Office Action, Mailed On Oct. 1, 2024, 15 pages.

(Continued)

*Primary Examiner* — Jung H Park
(74) *Attorney, Agent, or Firm* — Kilpatrick Townsend & Stockton LLP

(57) ABSTRACT

Improved network traffic flow processing techniques are described. In a network device providing multiple processing planes, each processing plane comprising multiple processing units, techniques are described that take advantage of flow affinity/locality principles such that the same processing component of a processing plane, which previously performed processing for a network flow, is used for performing subsequent processing for the same network flow. This enables faster processing of network traffic flows by the network device. In certain implementations, the techniques described herein can be implemented in a network virtualization device (NVD) that is configured to perform network virtualization functions.

20 Claims, 21 Drawing Sheets

(56) References Cited

U.S. PATENT DOCUMENTS

| | | | |
|---|---|---|---|
| 11,496,599 | B1 | 11/2022 | Singh |
| 11,593,136 | B2 | 2/2023 | Galles |
| 11,960,919 | B2 | 4/2024 | Niu et al. |
| 12,010,195 | B2 | 6/2024 | Singh |
| 12,015,557 | B2 | 6/2024 | Singh et al. |
| 12,015,562 | B2 | 6/2024 | Singh |
| 12,355,669 | B2 | 7/2025 | Singh et al. |
| 2008/0301332 | A1 | 12/2008 | Butler et al. |
| 2009/0228589 | A1 | 9/2009 | Korupolu |
| 2016/0232019 | A1 | 8/2016 | Shah et al. |
| 2016/0330112 | A1 | 11/2016 | Raindel et al. |
| 2016/0380896 | A1 | 12/2016 | Caulfield et al. |
| 2017/0187640 | A1 | 6/2017 | Vasudevan et al. |
| 2017/0289067 | A1 | 10/2017 | Lu et al. |
| 2018/0285288 | A1 | 10/2018 | Bernat et al. |
| 2019/0042741 | A1 | 2/2019 | Abodunrin et al. |
| 2019/0044866 | A1 | 2/2019 | Chilikin et al. |
| 2019/0044879 | A1 | 2/2019 | Richardson et al. |
| 2019/0109793 | A1 | 4/2019 | Dalal |
| 2019/0394066 | A1* | 12/2019 | Lin ..................... H04L 12/4641 |
| 2020/0021532 | A1 | 1/2020 | Borikar et al. |
| 2020/0174954 | A1 | 6/2020 | Pope |
| 2020/0201624 | A1 | 6/2020 | Halder et al. |
| 2020/0267082 | A1* | 8/2020 | Dong ................. H04L 63/0227 |
| 2020/0278892 | A1 | 9/2020 | Nainar et al. |
| 2020/0314011 | A1 | 10/2020 | Deval et al. |
| 2021/0019270 | A1 | 1/2021 | Li et al. |
| 2021/0112132 | A1 | 4/2021 | Paliwal et al. |
| 2021/0117360 | A1 | 4/2021 | Kutch et al. |
| 2021/0203597 | A1 | 7/2021 | Kadu |
| 2022/0100546 | A1 | 3/2022 | Cherian et al. |
| 2022/0164451 | A1 | 5/2022 | Bagwell |
| 2022/0291952 | A1 | 9/2022 | Milojicic et al. |
| 2022/0303137 | A1 | 9/2022 | Brogle et al. |
| 2022/0329520 | A1 | 10/2022 | Degrace et al. |
| 2022/0329528 | A1 | 10/2022 | Degrace et al. |
| 2022/0353197 | A1 | 11/2022 | Singh |
| 2022/0353240 | A1 | 11/2022 | McDowall et al. |
| 2022/0353339 | A1 | 11/2022 | Singh |
| 2023/0029796 | A1 | 2/2023 | Li |
| 2023/0041806 | A1 | 2/2023 | Singh |
| 2023/0300075 | A1 | 9/2023 | Peri |

OTHER PUBLICATIONS

U.S. Appl. No. 18/657,055 , Non-Final Office Action, Mailed On Dec. 10, 2024, 10 pages.

An Introduction to SmartNICs, Available Online at: https://www.nextplatform.com/2019/03/04/an-introduction-to-smartnics/, Mar. 4, 2019, 3 pages.

Best Practices for Client IP Address Preservation, Available online at: https://docs.aws.amazon.com/global-accelerator/latest/dg/best-practices-aga.html, 2020, 2 pages.

Flow logs in AWS Global Accelerator, Available Online at: https://docs.aws.amazon.com/global-accelerator/latest/dg/monitoring-global-accelerator.flow-logs.html, 2020, 7 pages.

What is AWS Global Accelerator? Available Online At: https://docs.aws.amazon.com/global-accelerator/latest/dg/what-is-global-accelerator.html, 2020, 1 page.

What Makes a NIC a SmartNIC, and why is it Needed? Available Online at: https://www.netronome.com/blog/what-makes-a-nic-a-smartnic-and-why-is-it-needed/, Sep. 13, 2016, 8 pages.

U.S. Appl. No. 17/244,723, Non-Final Office Action mailed on Sep. 15, 2023, 11 pages.

U.S. Appl. No. 17/244,727, Notice of Allowance mailed on Jul. 5, 2022, 10 pages.

U.S. Appl. No. 17/394,300, Final Office Action mailed on Jul. 28, 2023, 16 pages.

U.S. Appl. No. 17/394,300, Non-Final Office Action mailed on Feb. 28, 2023, 14 pages.

U.S. Appl. No. 17/959,941, Non-Final Office Action mailed on Jun. 1, 2023, 12 pages.

Chawla, Is it Time for NICs to get Smarter? Available Online At: https://www.delltechnologies.com/en-us/blog/smart-nics-smarter/, Sep. 18, 2019, 3 pages.

Deierling, Achieving a Cloud Scale Architecture with DPU based Smart NICs, Available Online at: https://blog.mellanox.com/2018/09/why-you-need-dpu-based-smart-nic-use-cases/, Sep. 11, 2018, 5 pages.

Firestone et al., Azure Accelerated Networking: SmartNICs in the Public Cloud, 15th USENIX Symposium on Networked Systems Design and Implementation, Apr. 2018, 14 pages.

Gwennap, Single-Chip Control/Data-Plane Processors Trends, Features, Deployment, Available Online at: http://linleygroup.com/cms_builder/uploads/WP_SCDP.pdf, Jun. 2008, 10 pages.

Kumar, Taming Latency in Data Center Applications, Available Online at: https://smartech.gatech.edu/bitstream/handle/1853/61693/KUMAR-DISSERTATION-2019.pdf, Aug. 2019, 156 pages.

Le et al., UNO: Uniflying Host and Smart NIC Offload for Flexible Packet Processing, ACM, https://doi.org/10.1145/3127479.3132252, Sep. 27, 2017, pp. 506-519.

Schweitzer, SmartNIC Architectures: A Shift to Accelerators and why FPGAs are Poised to Dominate, Jul. 10, 2020, 19 pages.

U.S. Appl. No. 17/244,723 , "Corrected Notice of Allowability", May 15, 2024, 2 pages.

U.S. Appl. No. 17/394,300 , Non-Final Office Action, Mailed on Apr. 10, 2025, 14 pages.

U.S. Appl. No. 18/656,436 , Non-Final Office Action, Mailed on Mar. 25, 2025, 17 pages.

U.S. Appl. No. 18/657,055 , "Corrected Notice of Allowability", May 15, 2025, 2 pages.

U.S. Appl. No. 18/657,055 , Notice of Allowance, Mailed on May 1, 2025, 9 pages.

U.S. Appl. No. 17/394,300, Final Office Action, Mailed On Sep. 3, 2025, 16 pages.

U.S. Appl. No. 18/656,436, Final Office Action, Mailed On Dec. 30, 2025, 18 pages.

* cited by examiner

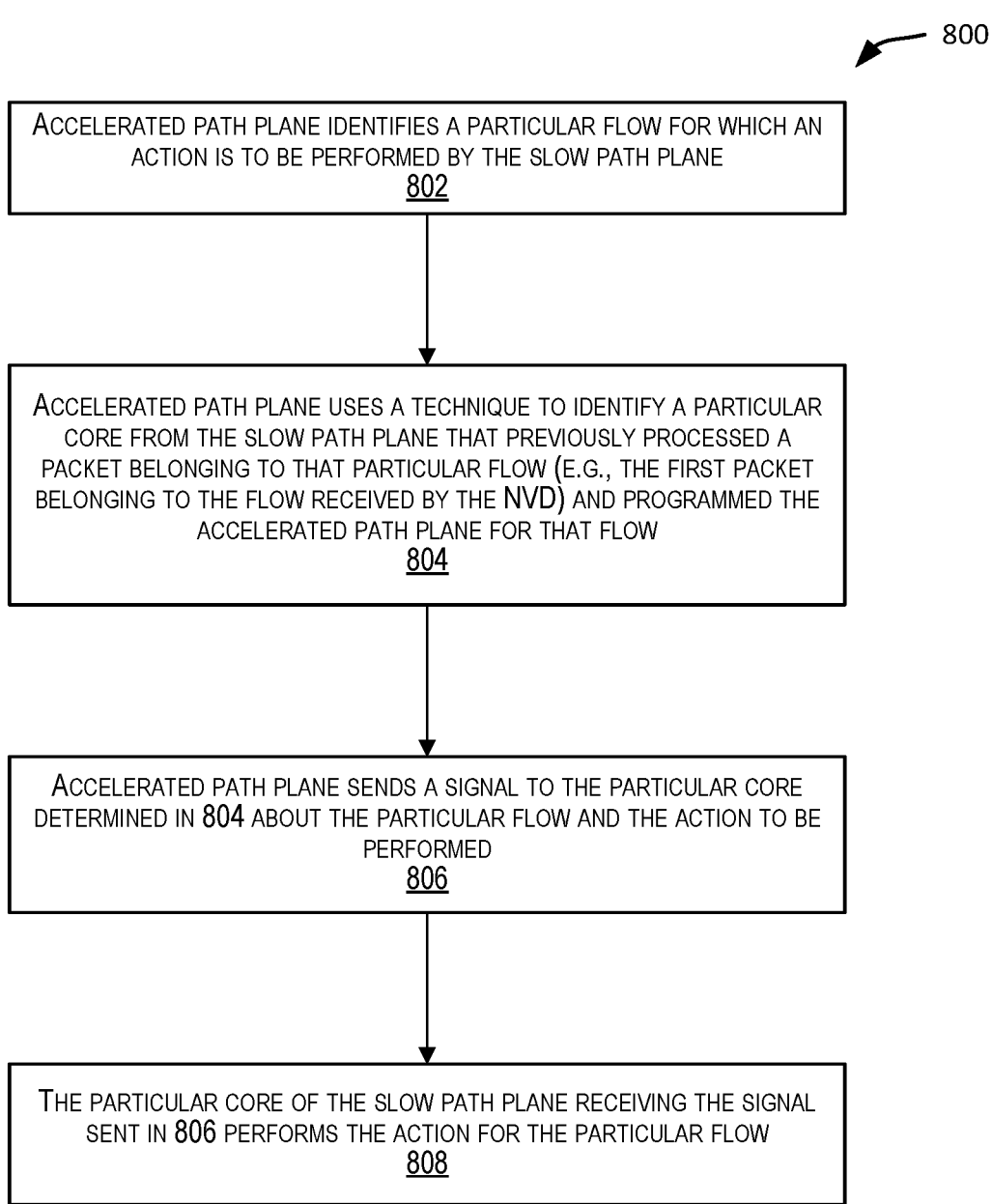

800

ACCELERATED PATH PLANE IDENTIFIES A PARTICULAR FLOW FOR WHICH AN
ACTION IS TO BE PERFORMED BY THE SLOW PATH PLANE
802

ACCELERATED PATH PLANE USES A TECHNIQUE TO IDENTIFY A PARTICULAR
CORE FROM THE SLOW PATH PLANE THAT PREVIOUSLY PROCESSED A
PACKET BELONGING TO THAT PARTICULAR FLOW (E.G., THE FIRST PACKET
BELONGING TO THE FLOW RECEIVED BY THE NVD) AND PROGRAMMED THE
ACCELERATED PATH PLANE FOR THAT FLOW
804

ACCELERATED PATH PLANE SENDS A SIGNAL TO THE PARTICULAR CORE
DETERMINED IN 804 ABOUT THE PARTICULAR FLOW AND THE ACTION TO BE
PERFORMED
806

THE PARTICULAR CORE OF THE SLOW PATH PLANE RECEIVING THE SIGNAL
SENT IN 806 PERFORMS THE ACTION FOR THE PARTICULAR FLOW
808

FIG. 8

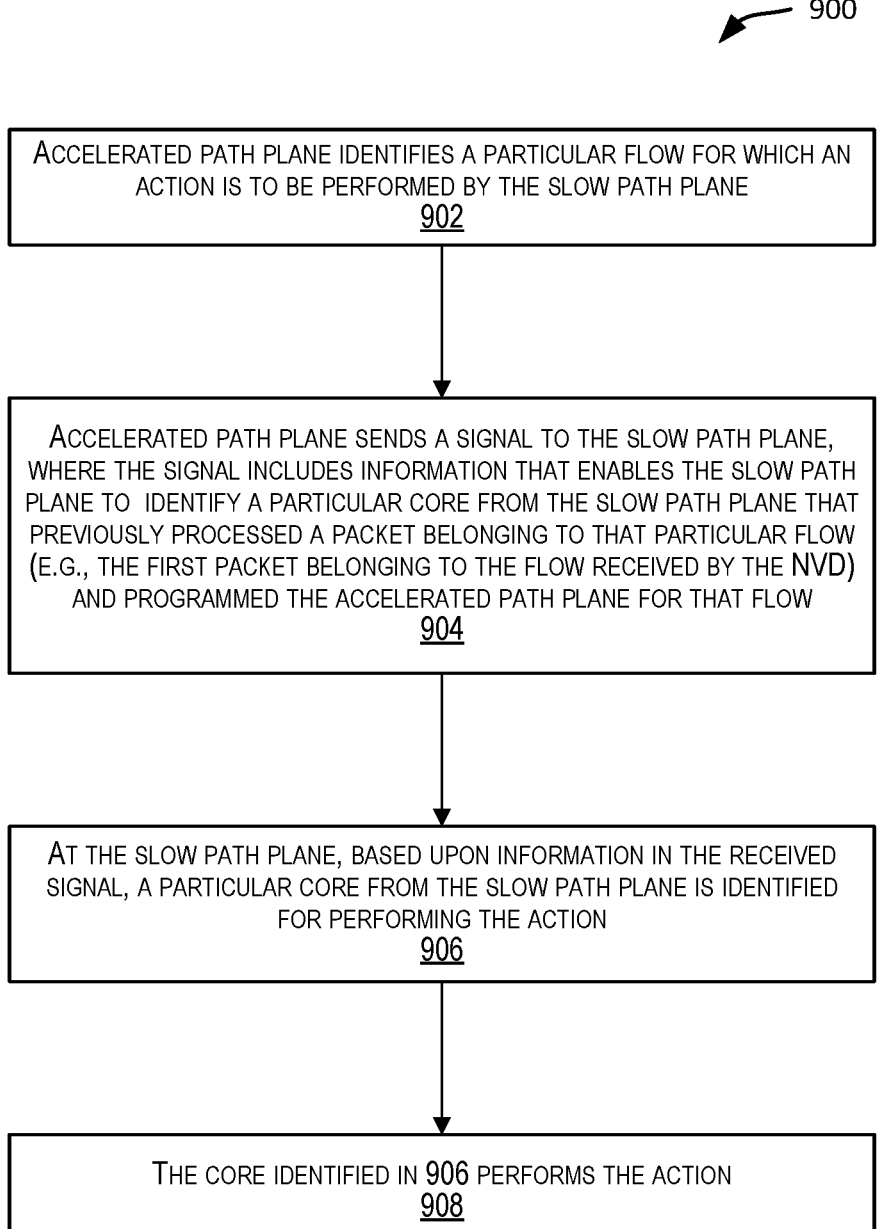

900

ACCELERATED PATH PLANE IDENTIFIES A PARTICULAR FLOW FOR WHICH AN
ACTION IS TO BE PERFORMED BY THE SLOW PATH PLANE
902

ACCELERATED PATH PLANE SENDS A SIGNAL TO THE SLOW PATH PLANE,
WHERE THE SIGNAL INCLUDES INFORMATION THAT ENABLES THE SLOW PATH
PLANE TO  IDENTIFY A PARTICULAR CORE FROM THE SLOW PATH PLANE THAT
PREVIOUSLY PROCESSED A PACKET BELONGING TO THAT PARTICULAR FLOW
(E.G., THE FIRST PACKET BELONGING TO THE FLOW RECEIVED BY THE NVD)
AND PROGRAMMED THE ACCELERATED PATH PLANE FOR THAT FLOW
904

AT THE SLOW PATH PLANE, BASED UPON INFORMATION IN THE RECEIVED
SIGNAL, A PARTICULAR CORE FROM THE SLOW PATH PLANE IS IDENTIFIED
FOR PERFORMING THE ACTION
906

THE CORE IDENTIFIED IN 906 PERFORMS THE ACTION
908

*FIG. 9*

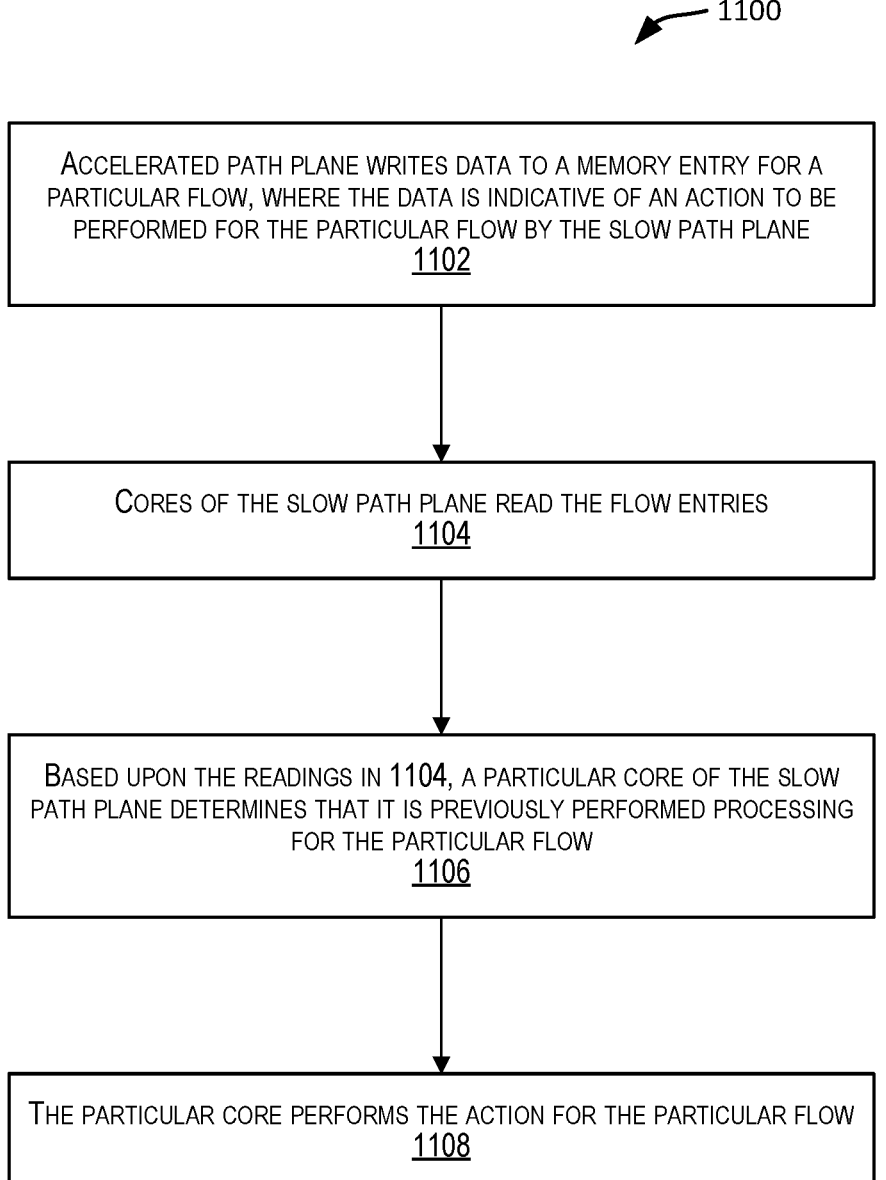

1100

ACCELERATED PATH PLANE WRITES DATA TO A MEMORY ENTRY FOR A PARTICULAR FLOW, WHERE THE DATA IS INDICATIVE OF AN ACTION TO BE PERFORMED FOR THE PARTICULAR FLOW BY THE SLOW PATH PLANE
1102

CORES OF THE SLOW PATH PLANE READ THE FLOW ENTRIES
1104

BASED UPON THE READINGS IN 1104, A PARTICULAR CORE OF THE SLOW PATH PLANE DETERMINES THAT IT IS PREVIOUSLY PERFORMED PROCESSING FOR THE PARTICULAR FLOW
1106

THE PARTICULAR CORE PERFORMS THE ACTION FOR THE PARTICULAR FLOW
1108

*FIG. 11*

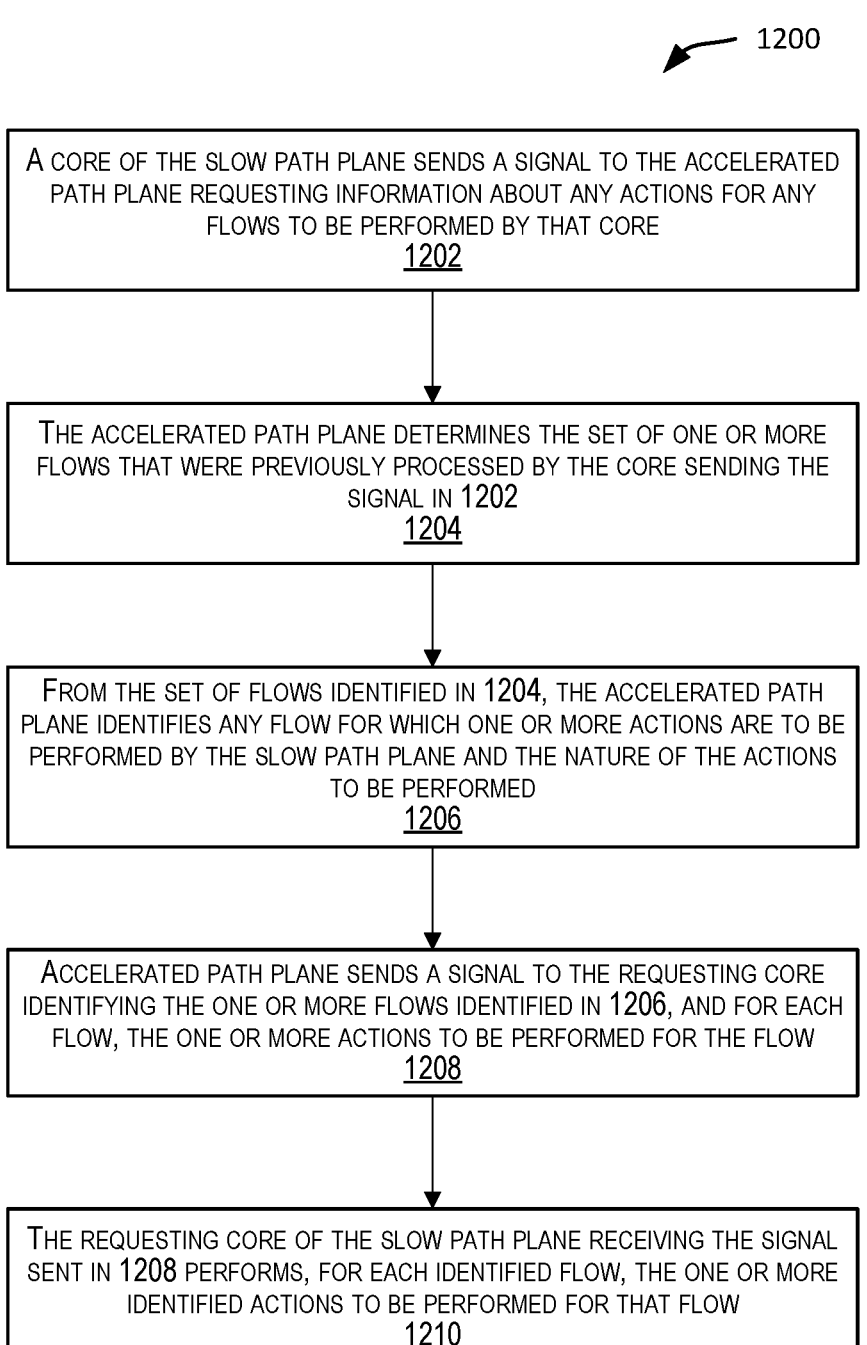

1200

A CORE OF THE SLOW PATH PLANE SENDS A SIGNAL TO THE ACCELERATED PATH PLANE REQUESTING INFORMATION ABOUT ANY ACTIONS FOR ANY FLOWS TO BE PERFORMED BY THAT CORE
1202

THE ACCELERATED PATH PLANE DETERMINES THE SET OF ONE OR MORE FLOWS THAT WERE PREVIOUSLY PROCESSED BY THE CORE SENDING THE SIGNAL IN 1202
1204

FROM THE SET OF FLOWS IDENTIFIED IN 1204, THE ACCELERATED PATH PLANE IDENTIFIES ANY FLOW FOR WHICH ONE OR MORE ACTIONS ARE TO BE PERFORMED BY THE SLOW PATH PLANE AND THE NATURE OF THE ACTIONS TO BE PERFORMED
1206

ACCELERATED PATH PLANE SENDS A SIGNAL TO THE REQUESTING CORE IDENTIFYING THE ONE OR MORE FLOWS IDENTIFIED IN 1206, AND FOR EACH FLOW, THE ONE OR MORE ACTIONS TO BE PERFORMED FOR THE FLOW
1208

THE REQUESTING CORE OF THE SLOW PATH PLANE RECEIVING THE SIGNAL SENT IN 1208 PERFORMS, FOR EACH IDENTIFIED FLOW, THE ONE OR MORE IDENTIFIED ACTIONS TO BE PERFORMED FOR THAT FLOW
1210

*FIG. 12*

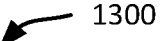

1300

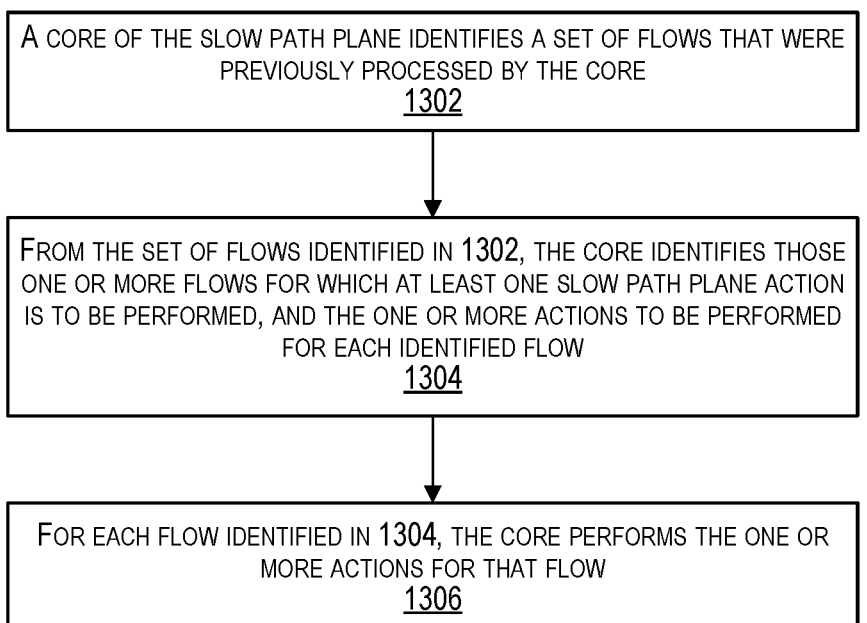

A CORE OF THE SLOW PATH PLANE IDENTIFIES A SET OF FLOWS THAT WERE PREVIOUSLY PROCESSED BY THE CORE
1302

FROM THE SET OF FLOWS IDENTIFIED IN 1302, THE CORE IDENTIFIES THOSE ONE OR MORE FLOWS FOR WHICH AT LEAST ONE SLOW PATH PLANE ACTION IS TO BE PERFORMED, AND THE ONE OR MORE ACTIONS TO BE PERFORMED FOR EACH IDENTIFIED FLOW
1304

FOR EACH FLOW IDENTIFIED IN 1304, THE CORE PERFORMS THE ONE OR MORE ACTIONS FOR THAT FLOW
1306

*FIG. 13*

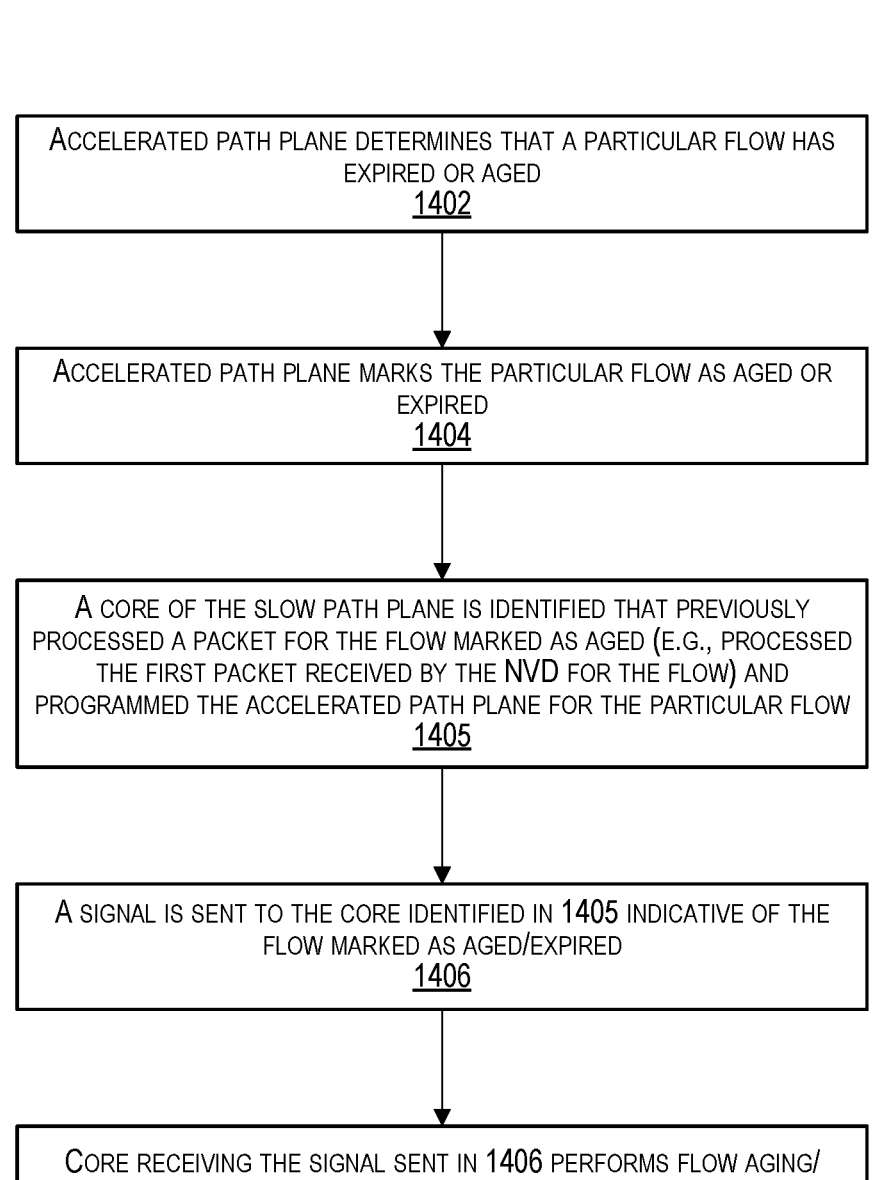

1400

ACCELERATED PATH PLANE DETERMINES THAT A PARTICULAR FLOW HAS EXPIRED OR AGED
1402

ACCELERATED PATH PLANE MARKS THE PARTICULAR FLOW AS AGED OR EXPIRED
1404

A CORE OF THE SLOW PATH PLANE IS IDENTIFIED THAT PREVIOUSLY PROCESSED A PACKET FOR THE FLOW MARKED AS AGED (E.G., PROCESSED THE FIRST PACKET RECEIVED BY THE NVD FOR THE FLOW) AND PROGRAMMED THE ACCELERATED PATH PLANE FOR THE PARTICULAR FLOW
1405

A SIGNAL IS SENT TO THE CORE IDENTIFIED IN 1405 INDICATIVE OF THE FLOW MARKED AS AGED/EXPIRED
1406

CORE RECEIVING THE SIGNAL SENT IN 1406 PERFORMS FLOW AGING/ DELETION RELATED PROCESSING RESPONSIVE TO THE NOTIFICATION
1408

FIG. 14

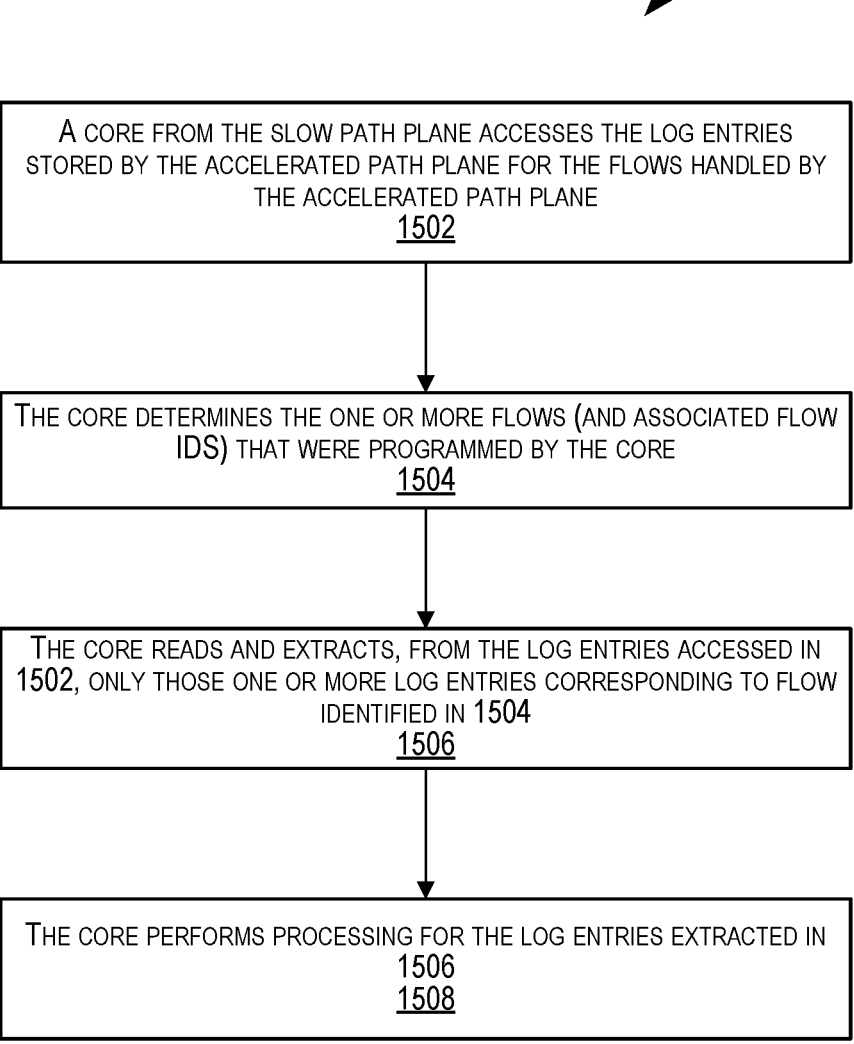

1500

A CORE FROM THE SLOW PATH PLANE ACCESSES THE LOG ENTRIES STORED BY THE ACCELERATED PATH PLANE FOR THE FLOWS HANDLED BY THE ACCELERATED PATH PLANE
1502

THE CORE DETERMINES THE ONE OR MORE FLOWS (AND ASSOCIATED FLOW IDS) THAT WERE PROGRAMMED BY THE CORE
1504

THE CORE READS AND EXTRACTS, FROM THE LOG ENTRIES ACCESSED IN 1502, ONLY THOSE ONE OR MORE LOG ENTRIES CORRESPONDING TO FLOW IDENTIFIED IN 1504
1506

THE CORE PERFORMS PROCESSING FOR THE LOG ENTRIES EXTRACTED IN 1506
1508

*FIG. 15*

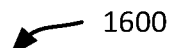

1600

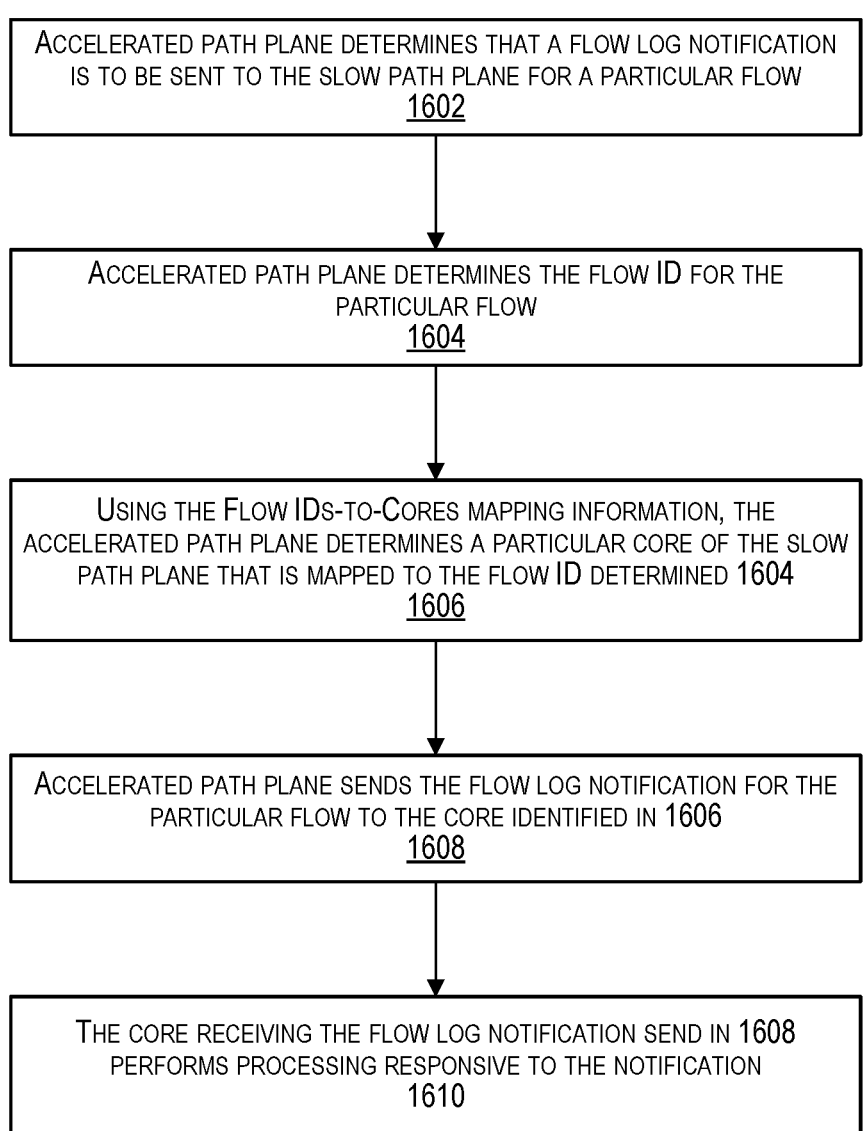

ACCELERATED PATH PLANE DETERMINES THAT A FLOW LOG NOTIFICATION IS TO BE SENT TO THE SLOW PATH PLANE FOR A PARTICULAR FLOW
1602

ACCELERATED PATH PLANE DETERMINES THE FLOW ID FOR THE PARTICULAR FLOW
1604

USING THE FLOW IDS-TO-CORES MAPPING INFORMATION, THE ACCELERATED PATH PLANE DETERMINES A PARTICULAR CORE OF THE SLOW PATH PLANE THAT IS MAPPED TO THE FLOW ID DETERMINED 1604
1606

ACCELERATED PATH PLANE SENDS THE FLOW LOG NOTIFICATION FOR THE PARTICULAR FLOW TO THE CORE IDENTIFIED IN 1606
1608

THE CORE RECEIVING THE FLOW LOG NOTIFICATION SEND IN 1608 PERFORMS PROCESSING RESPONSIVE TO THE NOTIFICATION
1610

*FIG. 16*

TECHNIQUES FOR PROCESSING NETWORK FLOWS

CROSS-REFERENCE TO RELATED APPLICATIONS

The present application is a non-provisional of and claims priority to U.S. Provisional Application No. 63/388,890 filed Jul. 13, 2022, the entire contents of which are incorporated herein by reference for all purposes.

The present application is also a continuation-in-part (CIP) application of U.S. Non-Provisional application Ser. No. 17/244,727 filed Apr. 29, 2021, the entire contents of which are incorporated herein by reference for all purposes.

BACKGROUND

In today's distributed computing environment there is a constant need to enable faster data communications. This is especially true for a cloud service provider (CSP) providing cloud services to subscribing customers. Faster data communications translate to faster delivery of the cloud services to users of the cloud services, which in turn translates to better customer and user experience. There is thus a constant desire to improve the infrastructure provided by the CSP for provisioning cloud services.

A network traffic flow (also referred to as a "network flow" or "traffic flow" or just "flow") typically identifies packets communicated between two specific endpoints. How fast data can be communicated from a source to a destination depends upon various criteria including the path taken by the packets from the source to the destination and how fast the network devices in that path can process flows of data packets. There is always a need for improvements in the architectures of network devices and the techniques they use for processing packet flows to enable even faster data communications.

BRIEF SUMMARY

The present disclosure relates to improved network traffic flow processing techniques. More specifically, in a network device that includes at least two different processing planes for processing packets, improved techniques are disclosed that take advantage of network flow affinity or locality for faster processing related to network traffic flows. In a network device providing multiple processing planes, each processing plane comprising multiple processing units, techniques described herein take advantage of flow affinity or locality such that the same processing component of a processing plane, which previously performed processing for a network flow, is used for performing subsequent processing for the same network flow. This enables faster processing of network traffic flows by the network device. In certain implementations, the techniques described herein can be implemented in a network virtualization device (NVD) that is configured to perform network virtualization functions.

According to certain embodiments, a network device comprises a first processing plane and a second processing plane, the first processing plane comprising a first plurality of processing units and second processing plane comprising a second plurality of processing units, the processing units in the second plurality of processing units being different from the processing units in the first plurality of processing units. Responsive to a first packet received by the network device for a network flow, a first processing unit from the first plurality of processing units performs processing for the network flow by, the processing comprising processing the first packet for the network flow, and programming the second processing plane to handle processing of subsequent packets received by the network device for the network flow. Subsequent to the processing for the network flow performed by the first processing unit, for an action to be performed for the network flow by the first processing plane, the action is caused to be performed by the first processing unit. The network device may be a network virtualization device that is configured to perform one or more network virtualization functions for forwarding data in an overlay network.

In certain implementations, programming the second processing plane for the network flow may comprise configuring the second processing plane to perform data plane-related functions for the network flow, the data plane-related functions including forwarding packets received by the network device that belong to the network flow.

The action that is caused to be performed by the first processing unit may include various different actions. For example, the action may include an action performed for the network flow responsive to the network flow being marked as aged, or the action is an action related to processing one or more log entries for the network flow.

In certain implementations, as part of the processing performed by the first processing unit for the network flow, the first processing unit may store mapping information indicative of a mapping between the network flow and the first processing unit. The mapping information may be stored in a memory that is shared between the first processing plane and the second processing plane.

In certain implementations, processing performed by the first processing unit for the network flow comprises building, by the first processing unit, one or more data structures in a cache associated with the first processing unit. Additionally, causing the action to be performed by the first processing unit comprises performing, by the first processing unit, the action using at least one of the one or more data structures stored in the cache associated with the first processing unit.

In certain implementations, as part of causing the action to be performed by the first processing unit, the second processing plane determines that the action is to be performed for the network flow. The second processing plane identifies that the first processing unit of the first processing plane previously performed processing for the network flow. The second processing plane then sends a signal to the first processing unit, the signal identifying the network flow and the action to be performed. Responsive to the signal received from the second processing plane, the first processing unit performs the action for the network flow. There are various ways in which the second processing plane sends the signal to the first processing unit. For example, the second processing plane may send a notification or a control packet to the first processing unit.

In certain embodiments, causing the action to be performed by the first processing unit may comprises determining, by the second processing plane, that the action is to be performed for the network flow. The second processing plane may then send a signal to the first processing plane, where the signal included information about the network flow and the action. Based upon the signal received from the second processing plane, the first processing plane identifies the first processing unit of the first processing plane for performing the action for the network flow. The first processing unit then performs the action for the network flow.

In certain implementations, the information about the network flow and the action included in the signal sent by the second processing plane to the first processing plane comprises a hash value generated by the second processing plane based upon an n-tuple corresponding to the network flow.

In certain other implementations, the information about the network flow and the action included in the signal sent by the second processing plane to the first processing plane comprises an n-tuple corresponding to the network flow. Based upon the signal received from the second processing plane, the first processing plane generates a hash value for the n-tuple, and identifies the first processing unit for performing the action for the network flow based upon the hash value.

In yet other implementations, the information about the network flow and the action included in the signal sent by the second processing plane to the first processing plane comprises information identifying the network flow. Based upon the signal received from the second processing plane, the first processing plane identifies the first processing plane that the first processing unit is mapped to the network flow using mapping information indicative of mappings between processing units of the first processing plane and a set of network flows that the second processing plane is programmed to handle.

In certain embodiments, causing the action to be performed by the first processing unit comprises storing, by the second processing plane, a set of one or more flow entries corresponding to a set of one or more network flows for which the second processing plane is programmed to handle processing, the set of one or more flow entries comprising a first flow entry for the network flow. The second processing plane writes data to the first flow entry indicative of the action. Based upon the data written by the second processing plane, it is identified that the action for the network flow is to be performed by the first processing plane. It is determined that the first processing unit of the first processing plane previously performed processing for the network flow corresponding to the first flow entry. A signal is sent to the first processing unit indicative of the network flow and the action. Responsive to receiving the signal, the first processing unit performs the action for the network flow.

In certain implementations, the network device comprises a notifications subsystem. Based upon the data written by the second processing plane, the notifications subsystem determines that the action is to be performed by the first processing plane. The notifications subsystem determines that the first processing unit previously performed processing for the network flow corresponding to the first flow entry. The notifications subsystem sends the notification to the first processing unit indicative of the network flow and the action.

In yet other embodiments, causing the action to be performed by the first processing unit comprises sending, by the first processing unit, a signal to the second processing plane requesting information about any actions for any network flows to be performed by the first processing unit. Responsive to receiving the signal from the first processing unit, the second processing plane determines that the first processing unit previously processed the network flow, the second processing plane determines that the action is to be performed for the network flow, and the second processing plane sends a signal to the first processing unit, wherein the signal identifies the network flow and the action. Based upon the signal received from the second processing plane, the first processing unit performs the action for the network flow.

In yet other embodiments, causing the action to be performed by the first processing unit comprises storing, by the second processing plane in a memory shared by the second processing plane and the first processing plane, a set of one or more flow entries corresponding to a set of one or more network flows for which the second processing plane is programmed to handle processing, the set of one or more flow entries comprising a first flow entry for the network flow. The second processing plane writes data to the first flow entry indicative of the action. The first processing unit determines that the first processing unit previously performed processing for the network flow. The first processing unit determines, based upon the data written by the second processing plane to the first flow entry, that the action is to be performed for the network flow. The first processing unit then performs the action for the network flow.

According to another embodiment, a network device comprises a first processing plane and a second processing plane. The first processing plane comprises a first plurality of processing units, the first plurality of processing units including a first processing unit. The second processing plane comprises a second plurality of processing units, wherein the processing units in the second plurality of processing units are different from the processing units in the first plurality of processing units. Responsive to a first packet received by the network device for a network flow, a first processing unit from the first plurality of processing units is configured to: process the first packet for the network flow; program the second processing plane to handle processing of subsequent packets received by the network device for the network flow; and store mapping information indicative of a mapping between the network flow and the first processing unit. Subsequent to the programming of the second processing plane by the first processing unit, the second processing plane is configured to: determine that an action is to be performed for the network flow; identify, using the mapping information, that the first processing unit of the first processing plane is mapped to the network flow; and send a signal to the first processing unit, the signal identifying the network flow and the action to be performed. Responsive to the signal received from the second processing plane, the first processing unit is configured to perform the action for the network flow. In certain implementations, the network device may be a network virtualization device that is configured to perform one or more network virtualization functions for forwarding data in an overlay network. The action may be an action performed for the network flow responsive to the network flow being marked as aged, or the action is an action related to processing one or more log entries for the network flow.

According to certain embodiments, a network device comprises a slow path plane and an accelerated path plane. The accelerated path plane is configured to perform processing comprising: for a particular processing unit from the plurality of processing components of the slow path plane, determine a network flow for which an action is to be performed by the slow path plane, wherein the particular processing unit previously programmed the accelerated path plane for the particular flow; and sending information indicative of the network flow to the particular processing unit of the slow path plane. The particular processing unit of the slow path plane performs the action for the network flow.

The foregoing, together with other features and embodiments will become more apparent upon referring to the following specification, claims, and accompanying drawings.

BRIEF DESCRIPTION OF THE DRAWINGS

FIG. 8 depicts a simplified flowchart showing processing performed for causing an action for a flow to be performed by a particular processing unit (e.g., core) of the slow path plane that previously performed processing for the flow, according to certain embodiments.

FIG. 9 depicts another simplified flowchart showing processing performed for causing an action for a flow to be performed by a particular processing unit (e.g., core) of the slow path plane that previously performed processing for the flow, according to certain embodiments.

FIG. 11 depicts a simplified flowchart showing processing performed for causing an action for a flow to be performed by a particular processing unit (e.g., core) of the slow path plane that previously performed processing for the flow, according to certain embodiments.

FIG. 12 depicts a simplified flowchart showing processing performed when a core of the slow path plane initiates processing for an action to be performed by the slow path plane, according to certain embodiments.

FIG. 13 depicts a simplified flowchart showing processing performed according to certain embodiments.

FIG. 14 depicts a simplified flowchart showing processing performed when a flow is marked as aged or expired and where the resultant processing on the slow path plane side is directed to and performed by the same core that processed a previous (e.g., the first packet of the flow received by the NVD) packet belonging to the flow and programmed that flow, according to certain embodiments.

FIG. 15 depicts a simplified flowchart showing flow logging processing performed according to certain embodiments.

FIG. 16 depicts a simplified flowchart showing flow log processing performed according to certain embodiments.

DETAILED DESCRIPTION

Figure 1:
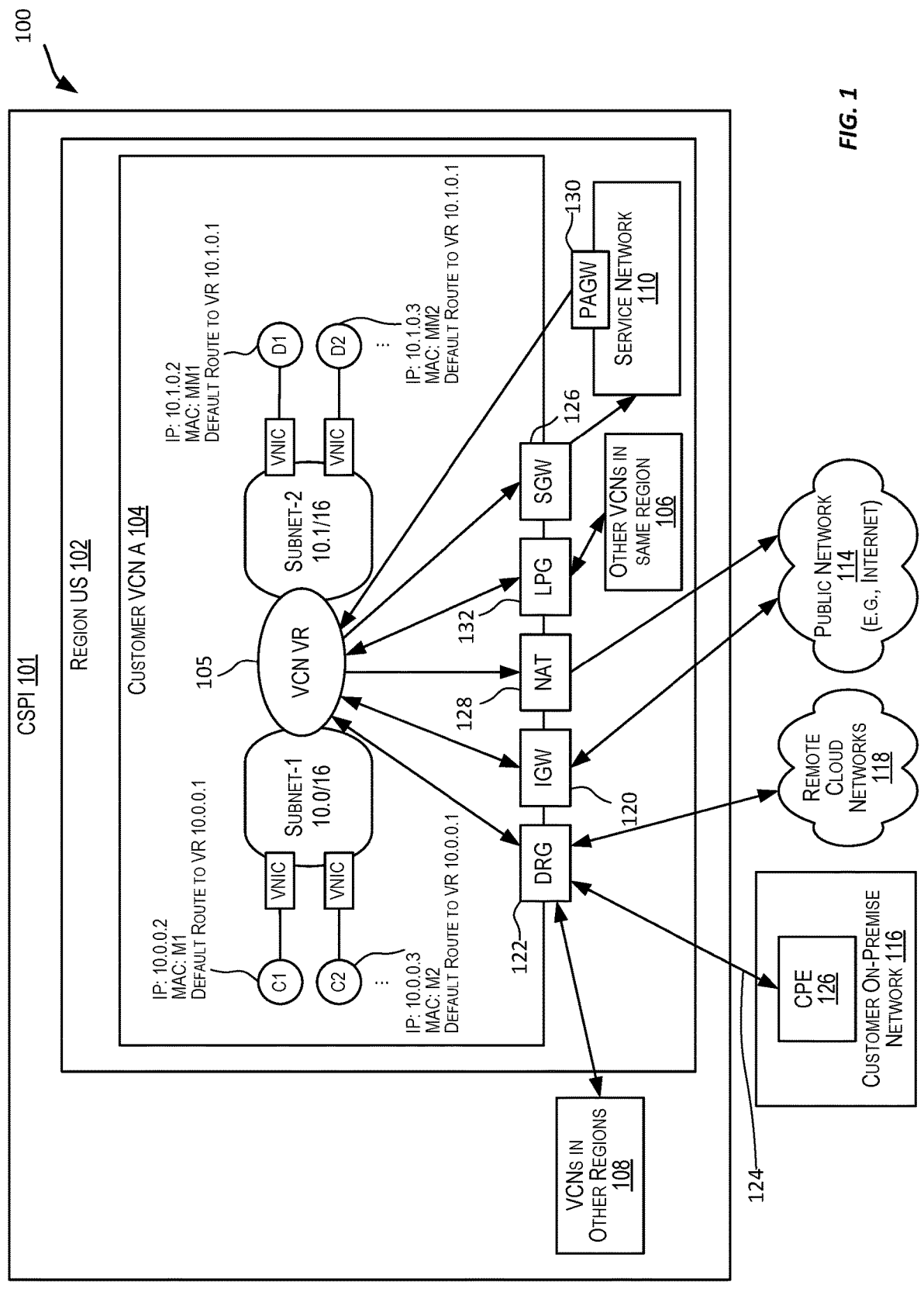
FIG. 1 is a high-level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to improved network traffic flow processing techniques. More specifically, in a network device that includes at least two different processing planes for processing packets, improved techniques are disclosed that take advantage of network flow affinity or locality for faster processing related to network traffic flows. In a network device providing multiple processing planes, each processing plane comprising multiple processing units, techniques described herein take advantage of flow affinity or locality such that the same processing component of a processing plane, which previously performed processing for a network flow, is used for performing subsequent processing for the same network flow. This enables faster processing of network traffic flows by the network device. In certain implementations, the techniques described herein can be implemented in a network virtualization device (NVD) that is configured to perform network virtualization functions.

In some NVD implementations, a single processing plane is provided comprising multiple processing units such as cores (e.g., ARM Cores). When such an NVD receives a packet belonging to a network flow, the packet is forwarded to a particular core from the multiple cores of the NVD. The particular core then performs a function (e.g., encapsulate the packet, decapsulate the packet, etc.) and the packet is then forwarded from the NVD. For example, the packet may be forwarded from the NVD to another NVD associated with a host machine that is the intended recipient of the packet.

In certain NVD implementations, multiple processing planes are provided with differing processing characteristics. For example, in certain implementations, an NVD may include two different packet processing planes with different processing capabilities. For example, the NVD may include: (1) a slow path plane, and (2) an accelerated plane (also referred to as a fast path plane). The NVD thus provides two separate processing planes for processing packets received by the NVD. Processing of packets received by the NVD may be performed by one or both of the processing planes.

As its name implies, the accelerated plane is one that is able to process packets faster than the slow path plane. For example, the accelerated path plane comprises processing components/units that are able to perform certain actions or functions faster than the processing components/units of the slow path plane. In certain NVD implementations, the slow path plane comprises multiple processors or cores, such as ARM cores (Advanced Reduced Instruction Set Computing (RISC) Machine architecture cores), while the accelerated path plane comprises specialized multiple microprocessor units (MPUs). The MPUs in the accelerated path plane may run P4 code for performing various network functions (e.g., encapsulation of packets, decapsulation of packets). P4 is a programming language that is typically used for performing packet processing functions in forwarding planes in networking devices. In contrast to general purpose languages such as C or Python, P4 is a domain-specific language with a number of constructs optimized for network data forwarding. Accordingly, the accelerated path plane may be able to process packets faster than the slow path plane. For example, in certain implementations, the accelerated path plane can process 40 million PPS (packets per second), while the slow path plane comprising ARM cores can do about 10 million PPS. The accelerated path plane is thus much faster than the slow path plane and offers ultra-low latency. The MPUs can be organized into groups of MPUs and different pipelines of MPUs. MPUs can run multiple stages and a packet could be processed by multiple MPUs. There could be a pipeline of actions performed by multiple MPUs. While performance of the MPUs is faster than the ARM cores, the ARM cores may offer more flexibility in their programming. Thus, the type of processing units in the slow path plane are of a different type than the processing units in the accelerated path plane.

The networking-related processing performed by an NVD can be categorized as data plane (DP) related processing or control plane (CP) related processing. Control plane-related processing typically includes functions for configuring a network such as setting up routes and route tables, configuring network interface cards/controllers (NICs) and virtual network interface cards/controllers (vNICs or VNICs)), etc., which control how data is to be forwarded. Data plane-related processing typically includes functions for routing/forwarding a packet received by the NVD based upon configuration set up using control plane processing. In a typical networking environment, a vast majority of the packet processing performed by an NVD is data plane-related processing with a small amount of control plane-related processing. For example, in several typical use cases, about 90% of the overall packet processing performed by an NVD is data plane-related processing and only about 10% of the overall packet processing is control plane-related processing. Accordingly, for better performance, NVDs are designed such that the slow path plane is used primarily for performing control plane (CP) related processing and for minimal data plane-related processing, and the bulk of the data plane-related processing is performed by the accelerated path plane. As a result, the slow path plane has the intelligence of owning the network traffic flows and the states of the flows.

A network traffic flow (also referred to as a "network flow" or "traffic flow" or just "flow") typically identifies packets communicated between two specific endpoints. Various different techniques may be used to determine a traffic flow for a received packet. Typically, information from the header of the received packet is used to determine the traffic flow to which the packet belongs. In certain implementations, a 6-tuple from the packet header is used to determine a traffic flow for the packet, where the 6-tuple includes the source IP address, the source port number, the destination IP address, the destination port number, the protocol in use, and the virtual cloud network (VCN). In certain implementations, a 5-tuple is used to determine the traffic flow to which the packet belongs, where the 5-tuple comprises the source IP address, the source port number, the destination IP address, the destination port number, and the protocol. Various other techniques based upon information in a packet's header may be used to determine a network flow for a packet.

Since the slow path plane performs the control plane-related functions, in certain implementations, the slow path plane on an NVD is configured to program the accelerated path plane for data plane-related processing for each new traffic flow. When the NVD receives a packet for a new flow (i.e., the first packet received by the NVD for that traffic flow), the packet is processed by the slow path plane. The slow path plane then programs the accelerated path plane for that new traffic flow such that subsequent packets belonging to that traffic flow are processed by the accelerated path plane instead of by the slow path plane.

For example, in certain implementations, the following processing is performed when the NVD receives a packet for a new traffic flow (i.e., receives the first packet for a traffic flow).

(1) NVD receives a packet via a port of the NVD.

(2) The packet is forwarded to the accelerated path plane for processing.

(3) The accelerated path plane checks if the received packet belongs to a known traffic flow (i.e., is not the first packet received for that flow) for which the accelerated path plane has previously been programmed by the slow path plane. The 6-tuple or the 5-tuple determined from the header (e.g., encapsulated header) of the received packet may be used to determine the flow to which the packet belongs. Upon determining that the received packet belongs to a known flow, the accelerated path plane processes the packet. For a packet belonging to a known flow, as part of its processing, the accelerated path plane may perform one or more actions on the packet, and the packet may then be forwarded from the NVD, and processing of the packet by the NVD is completed. For example, the packet may be forwarded from the NVD to another NVD associated with the host machine that is the intended recipient of the packet. If it is determined that the packet belongs to a new flow, the accelerated path plane forwards the packet to the slow path plane for processing.

(4) As indicated above, in the scenario where the received packet is the first packet in a traffic flow, i.e., belongs to a new traffic flow, and the accelerated path plane has not been previously programmed by the slow path plane for that flow, the packet is forwarded to the slow path plane for processing. The packet may be processed by one of the multiple cores (e.g., ARM cores) of the slow path plane. For example, if the slow path plane comprises sixteen (16) ARM cores, a particular ARM core from the sixteen cores is selected and the selected core then processes the packet. Different techniques may be used to select a particular core for processing the packet. In certain implementations, a Receive Side Scaling (RSS) hashing technique is used to select a particular core from among the multiple cores of the slow path plane for processing the packet. The 5-tuple (or 6-tuple) of the packet is determined and hashed using an RSS hashing technique, such as a 16-bit RSS hash. The resultant hash value is then used to select a particular core from the multiple cores of the slow path plane. As a result, packets belonging to the same flow get hashed to the same core from the multiple cores of the slow path plane and you do not have to worry about packet reordering. As part of its processing, the selected core may determine that the received packet belongs to a new traffic flow. In certain implementations, the core performs "match-action processing" to determine the actions to be performed for the packet As part of this processing, the core matches various things such as the 6-tuple, which customer the packet is received from, etc. and determines one or more actions to be performed on the packet. The particular core then performs the one or more actions or operations, and the packet is then forwarded from the NVD. For example, the packet may be forwarded from the NVD to another network device to facilitate the communication of the packet to its intended destination. For example, the packet may be forwarded from the NVD to another NVD associated with the host machine that is the intended recipient of the packet. The particular core of the slow path plane then programs the accelerated path plane for the new traffic flow corresponding to the received packet so that subsequent packets belonging to that same traffic flow can be processed by the accelerated path plane without the slow path plane being involved.

When the selected core from the slow path plane processes a packet, the core may build and use one or more data or memory structures storing information that is used by the core to process the packet. These data structure may store information related to the traffic flow, and other information. These data structures may be built by the selected core and cached in one or more caches local to or associated with the selected core (e.g., L2 and/or L3 cache of that selected core). The caches may thus store flow state information for the flows being processed such as timeout data, statistical data about the flow, routing information, n-tuple hash information, etc. Since caches are typically at least 20× or 30× faster than using DRAM, the performance gains obtained from using these caches is better than using DRAM.

There are situations where, after the slow path plane has already programmed the accelerated path plane to handle a traffic flow and data plane-related processing is performed by the accelerated path plane, the slow path plane has to sometimes perform processing for that flow. There are various situations when this may occur. For example, since the slow path plane performs control plane-related processing, there are certain control plane actions related to flows that the slow path plane has to perform. Examples of such actions include performing logging for a flow, deleting a flow when the flow expires, and other control plane functions. As additional examples, in some situations, the accelerated path plane may be unable to perform some of its functions and the slow path plane may then have to take over one or all functions performed by the accelerated path plane. This may happen, for example, when the accelerated path plane is shut down or not operational due to the presence of software or hardware problems, or when the accelerated path plane is shut down for performing a software/hardware upgrade, etc.

In such situations, when the slow path plane has to perform an action for a flow whose processing is otherwise handled by the accelerated path plane, it is preferable that the processing be performed by the same particular core of the slow path plane that performed the processing for the first received packet for that flow and which resulted in the programming of the accelerated path plane for that flow. This is because, as mentioned earlier, the particular core may have cached flow-related data structures that were used by the core to process previous packets related to the flow, such as the first received packet for the flow. These data structures may still persist in the one or more caches associated with that core. These data structures may store state information for the flow such as timeout data, statistical data about the flow, routing information, n-tuple hash information, etc. Accordingly, if the same core performs the processing now, the core can reuse and take advantage of these already cached and available data structures storing flow state information. If instead, the processing was performed by some other core of the slow path plane, that other core would have to rebuild these data structures in order to perform the processing. This rebuilding of the data structures and associated flow information can take time and thus add unwanted latency to the processing performed by the slow path plane making the processing slower. Accordingly, it is preferable that the processing be performed by the same core so that the core can leverage the data structures stored in its cache(s) and be able to perform the flow-related processing in a faster manner with reduced latency. Also, all these data structures are not thread-safe and give higher performance.

The present disclosure describes techniques that enable the same core of the slow path plane to be selected for performing processing related to a traffic flow. The present disclosure describes improved flow processing techniques implemented in a network device that includes at least two different processing planes for processing packets and packet flows. The improved techniques take advantage of network flow affinity or locality for faster packet flows processing. In certain implementations, the techniques described herein can be implemented in a network virtualization device (NVD), such as in a smartNIC that is configured to perform network virtualization functions. The disclosed techniques take advantage of flow affinity or locality to enable all processing for a traffic flow to be handled by the same component of the slow path plane. Using the techniques described herein, a processing unit or component of the slow path plane that handles processing of the first received packet for a traffic flow and programs the accelerated path plane is also selected for performing any subsequent processing related to the traffic flow where the subsequent processing is to be performed by the slow path plane.

FIGS. 1-5 and the associated description provided in the "Example Virtual Networking Environment and Architecture" section below describes networking concepts including virtualization, overlay networks, network virtualization devices (NVDs) and their usage, and provides examples of environments in which NVDs implementing the improved techniques disclosed in this disclosure may be used. FIGS. 6-16 describe examples and embodiments related to the improved techniques described in this disclosure. FIGS. 17-20 depict examples of architectures for implementing cloud infrastructures for providing one or more cloud services, where the infrastructures may incorporate teachings described herein. FIG. 21 depicts a block diagram illustrating an example computer system, according to at least one embodiment. While the various embodiments and examples in this disclosure describe NVDs with two processing planes, namely, a slow path plane and an accelerated path plane, this is not intended to be limiting. In alternative embodiments, more than two processing planes may be provided with different processing capabilities. While the various embodiments and examples in this disclosure describe a slow path plane comprising cores and an accelerated path plane comprising MPUs, this is also not intended to be limiting. In general, each processing plane may comprise multiple processing units.

Example Virtual Networking Environment and Architecture

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken, and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions, and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with publicly accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN, and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN, and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP), and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 14, 15, 16, and 17 (see references 1416, 1516, 1616, and 1716) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 17, 18, 19, and 20, and are described below. FIG. 1 is a high-level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 14, 15, 16, and 17 (for example, gateways referenced by reference numbers 1434, 1436, 1438, 1534, 1536, 1538, 1634, 1636, 1638, 1734, 1736, and 1738) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. APE thus provides a way to present a service within a private customer VCN subnet using a VNIC. Since the endpoint is exposed as a VNIC, all the features associated with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked, and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
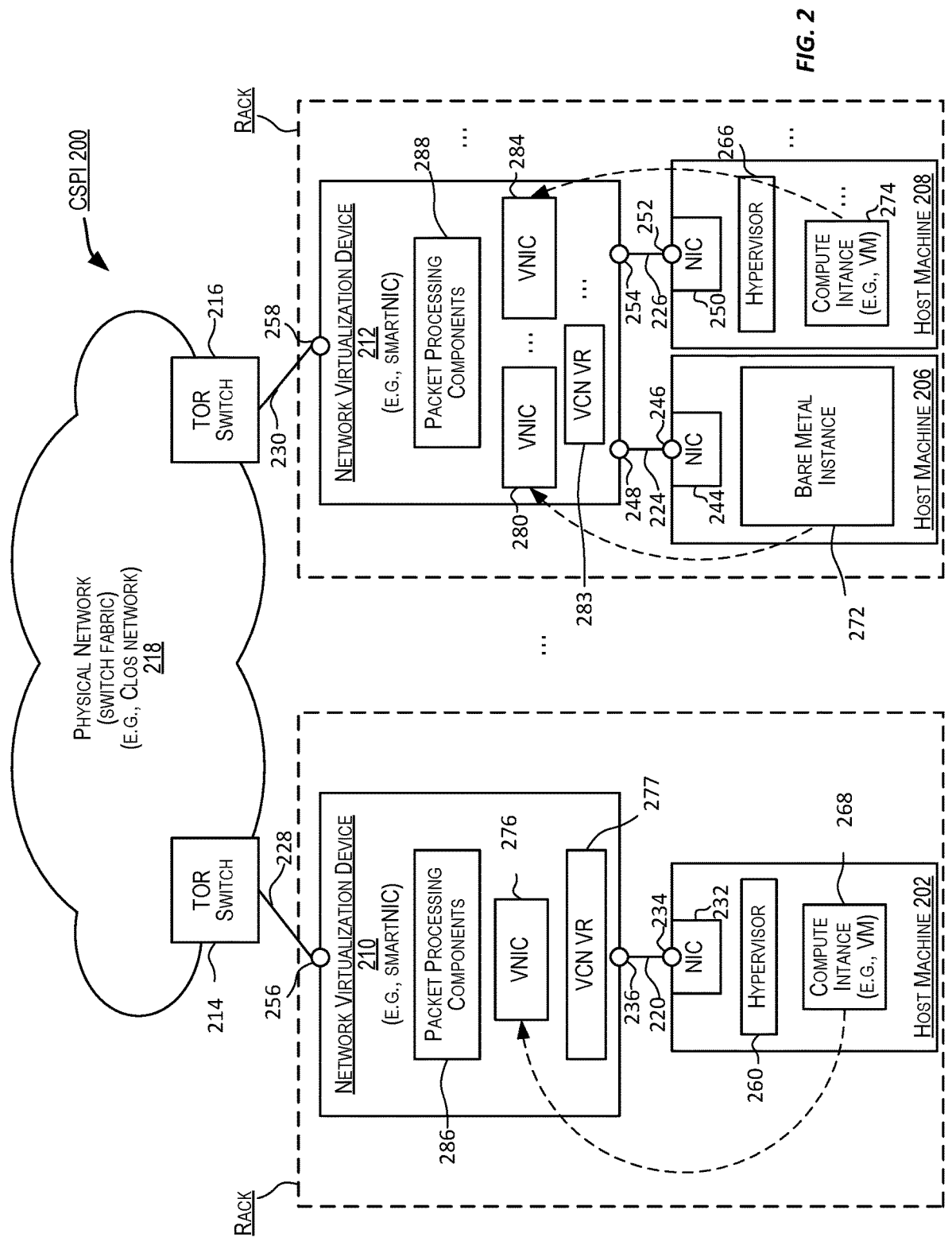
FIG. 2 depicts a simplified architectural diagram of the physical components in the physical network within a cloud services provider infrastructure (CSPI) according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric).

In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
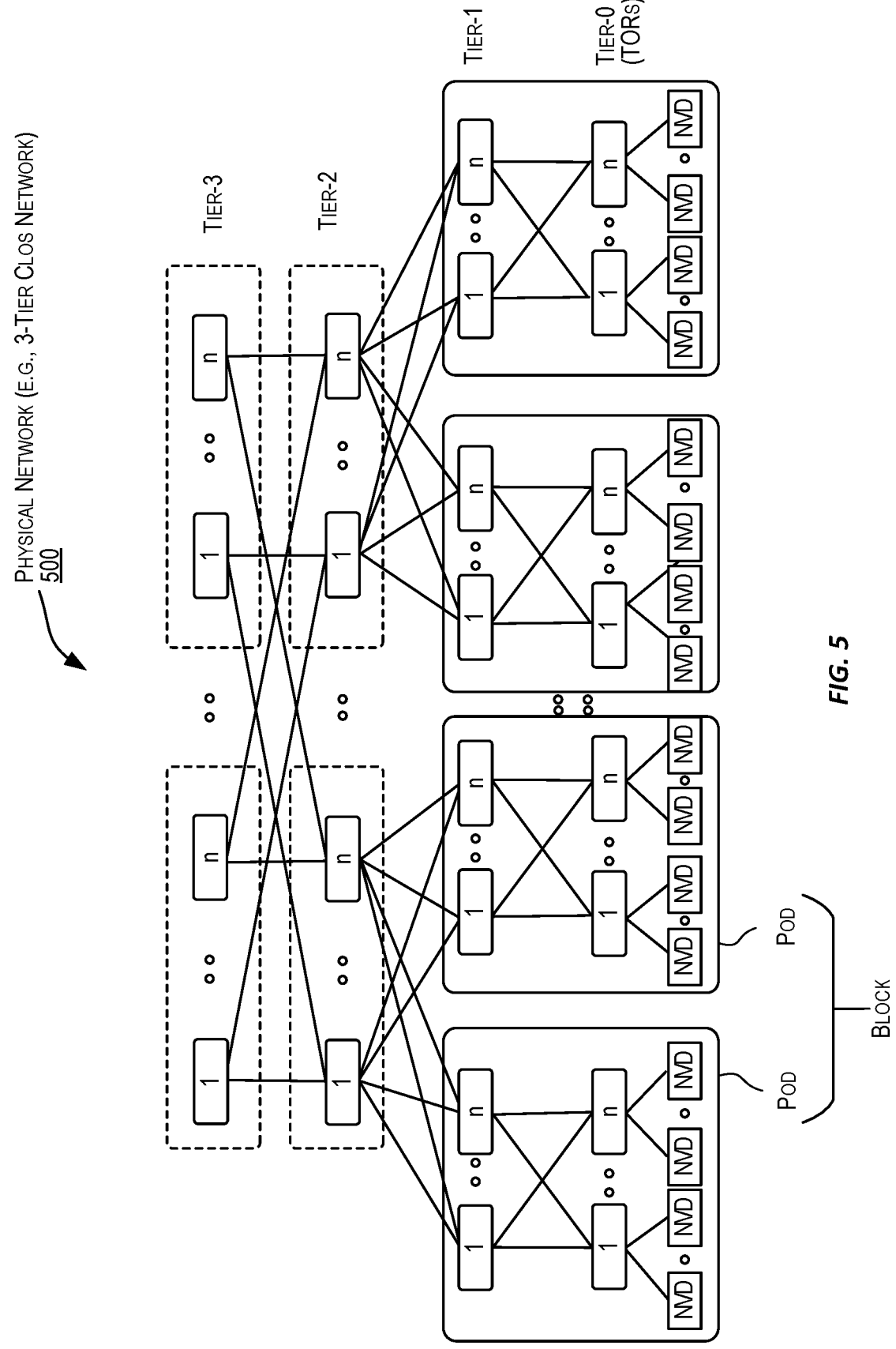
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
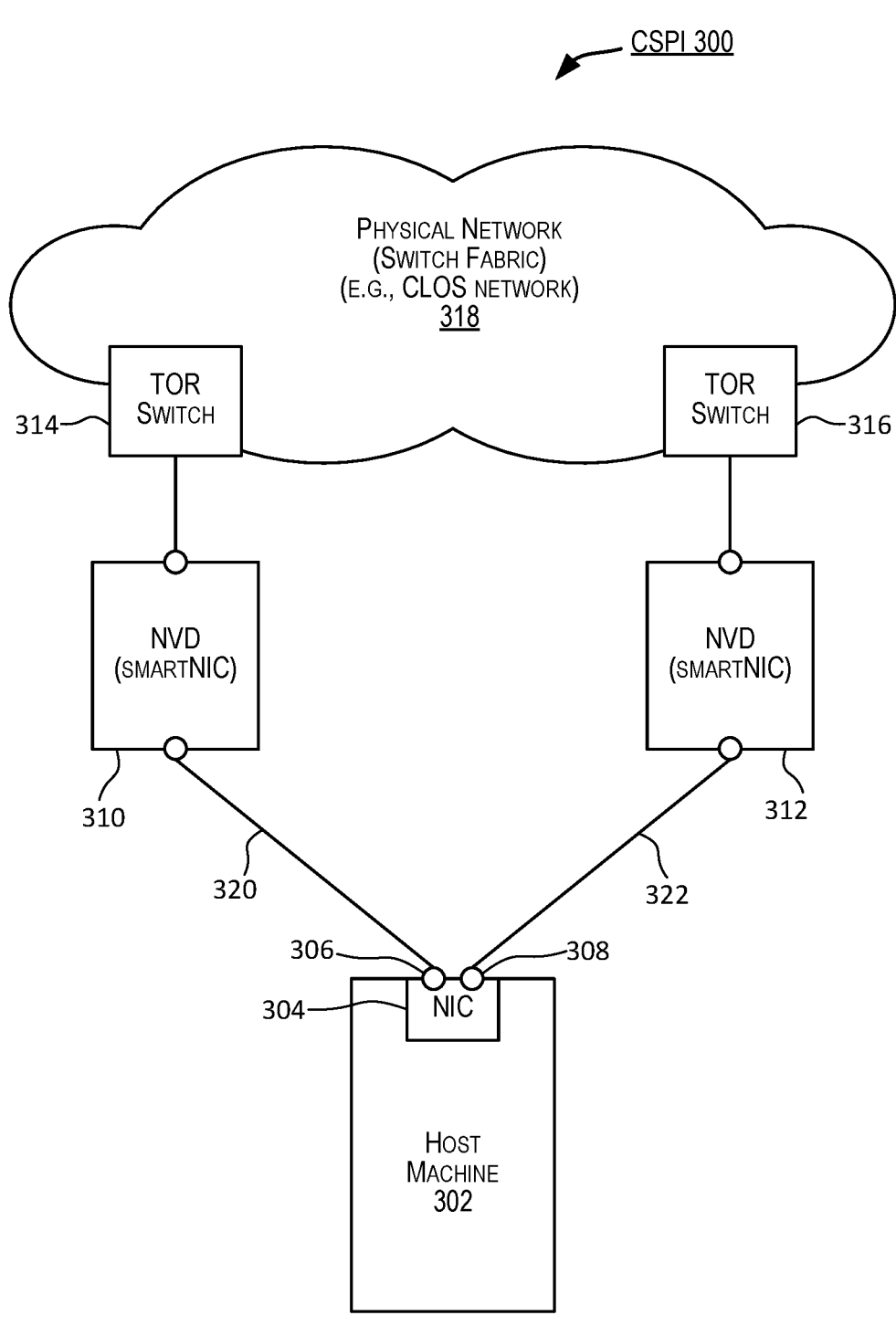
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch, or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two endpoints (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 14, 15, 16, and 17 (see references 1416, 1516, 1616, and 1716) and described below. Examples of a VCN Data Plane are depicted in FIGS. 14, 15, 16, and 17 (see references 1418, 1518, 1618, and 1718) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet)

(not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
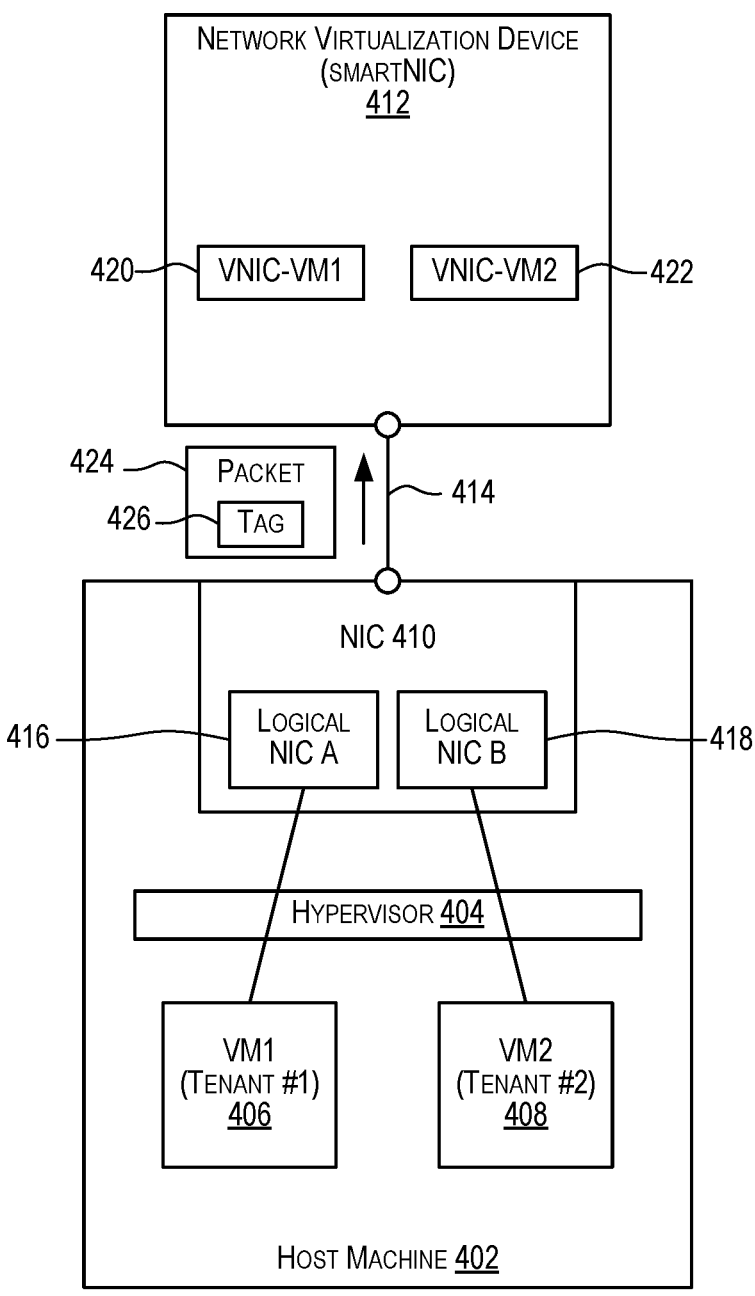
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multitenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>. [REGION] [.FUTURE USE].<UNIQUE ID> where, ocid1: The literal string indicating the version of the CID;

resource type: The type of resource (for example, instance, volume, VCN, subnet, user, group, and so on);

realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank; future use: Reserved for future use.

unique ID: The unique portion of the ID. The format may vary depending on the type of resource or service.

Processing Network Flows Using Flow Affinity/Locality (Colocation)

As described above, there are situations where, after the slow path plane has already programmed the accelerated path plane to handle data plane related processing for a traffic flow, there are certain actions or functions that the slow path plane has to perform for that flow. For example, the slow path plane may perform certain control plane-related actions. Examples of such actions include without limitation performing logging for a flow (also referred to as flow logging), deleting a flow when the flow expires (also referred to as flow aging or flow deletion)), and the like. As additional examples, in some situations, the accelerated path plane may be unable to perform some of its actions or functions and the slow path plane may then have to take over one or all functions performed by the accelerated path plane. This may happen, for example, when the accelerated path plane is shut down or not operational due to the presence of software or hardware problems, or when the accelerated path plane is shut down for performing a software/hardware upgrade, etc.

In such situations, when the slow path plane has to perform an action for a flow whose data plane-related processing is otherwise handled by the accelerated path plane, it is preferable that the processing be performed by the same particular core of the slow path plane that previously performed processing for the traffic flow. For example, if a particular processing component or unit (e.g., a core) of the slow path plane was selected for handling the first packet received for the flow and for programming the accelerated path plane for that flow, it is desirable that the same component or unit be selected for performing subsequent processing related to that flow. This is so that the flow colocation information can be leveraged for faster processing. The particular core may have built and cached flow-related data structures that were used by the core to process previous packets related to the flow, such as the first received packet for the flow. These data structures may still persist in the one or more caches associated with that core. These data structures may store state information for the flow such as timeout data, statistical data about the flow, routing information, n-tuple hash information, etc. Accordingly, if the same core performs the subsequent processing, the core can reuse and take advantage of these already built, cached, and available data structures and flow state information. If instead, the processing was performed by some other core of the slow path plane, that other core would have to rebuild these data structures in order to perform the processing. This rebuilding of the data structure can take time and thus add unwanted latency to the processing making the processing slower. Accordingly, it is preferable that the processing for a traffic flow be performed by the same core of the slow path plane so that the core can leverage the data structures stored in its cache(s) and be able to perform the flow-related processing in a faster manner with reduced latency. Also, all these data structures are not thread-safe and give higher performance.

The present disclosure describes improved packet and flow processing techniques implemented in a network device that includes at least two different processing planes for processing packet flows and associated packets, where the improved techniques take advantage of network flow affinity/locality for faster packet flows-related processing. In certain implementations, the techniques described herein can be implemented in a network virtualization device (NVD), such as in a smartNIC that is configured to perform network virtualization functions.

Figure 6:
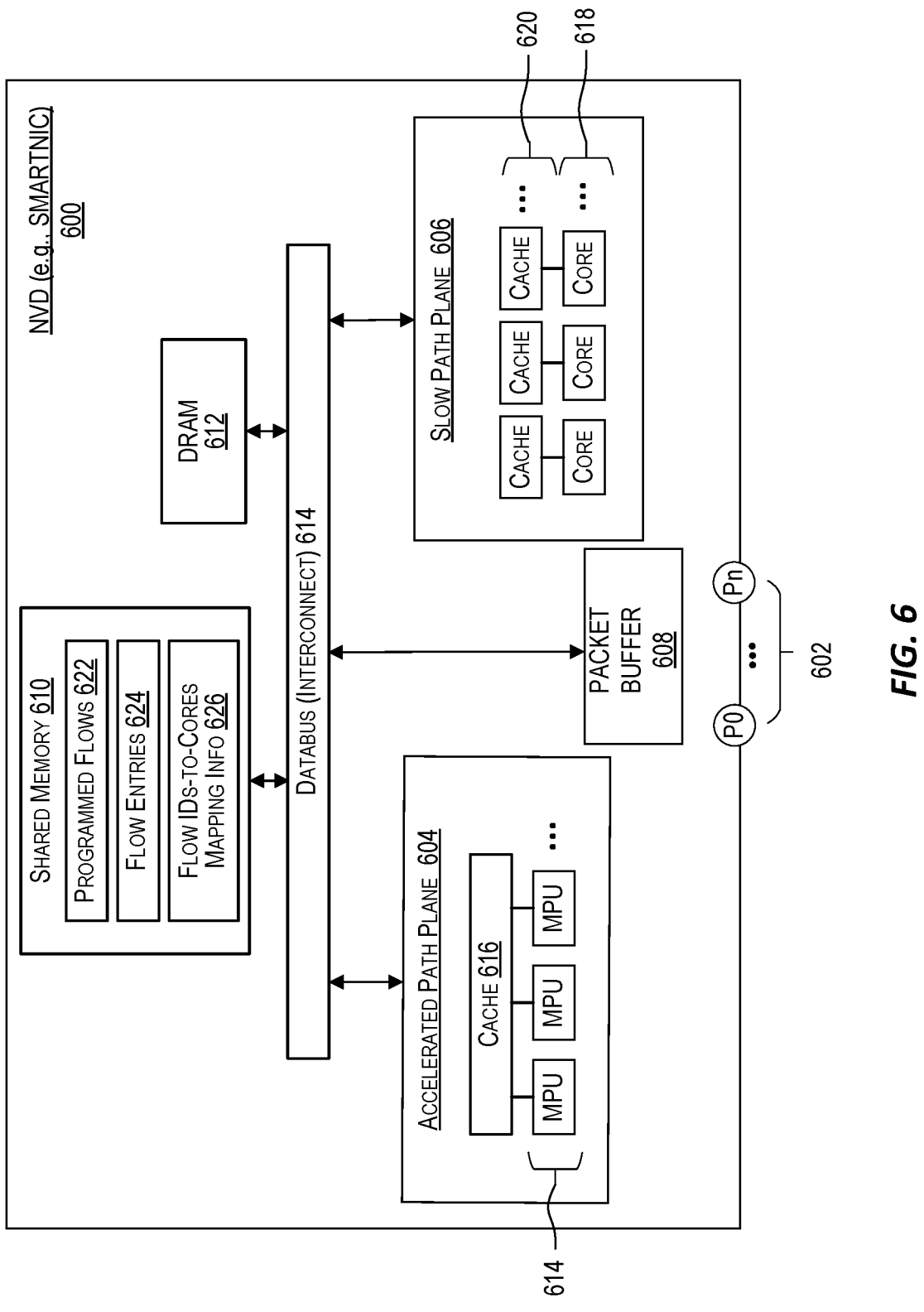
FIG. 6 is a simplified block diagram of an example network device (e.g., a network virtualization device (NVD)) that may implement one or more of the innovative techniques described in this disclosure.

FIG. 6 is a simplified block diagram of an example network device 600 that may implement one or more of the innovative techniques described in this disclosure. In the embodiment depicted in FIG. 6, network device 600 is an NVD. In certain implementations, the NVD may be in the form of a smartNIC. As shown in FIG. 6, NVD 600 may include one or more ports 602. NVD 600 may receive packets and transmit packets using one or more ports 602. A port on which a packet is received by NVD 600 is sometimes referred to as an ingress port. A port that is used to transmit a packet from NVD 600 is sometimes referred to as an egress port. The same port may function as an ingress port and an egress port. In certain implementations, ports 602 may include Ethernet ports. In certain implementations, when a packet is received by NVD 600 on an ingress port, the packet is stored in a packet buffer 608. The packet may then be processed by one of the multiple processing planes provided by NVD 600.

In the embodiment depicted in FIG. 6, NVD 600 comprises two processing planes, namely, an accelerated processing path plane 604 (referred to as accelerated path plane 604) and a slow path processing plane 606 (referred to as slow path plane 606). Each processing plane may comprise one or more processing units or components. Typically, the processing units of one processing plane are able to perform certain operations faster than the processing units of the second processing plane. For example, in the embodiment depicted in FIG. 6, the processing units of accelerated path plane 604 are able to perform certain operations faster than the processing units of slow path plane 606.

In the example depicted in FIG. 6, slow path plane 606 comprises multiple cores (e.g., ARM cores) 618, with each core having its associated cache 620. A cache 620 associated with a core 618 can include one or more levels (e.g., L1, L2, etc.) of cache. A cache associated with a core is referred to as being local to the core. A cache 620 associated with a core 618 may store information, including one or more data structures storing flow state information, which is used by the core to process packets. The data structures may store state information for the flow such as timeout data, statistical data about the flow, routing information, n-tuple hash information, etc.

In the embodiment depicted in FIG. 6, accelerated path plane 604 comprises MPUs 614. A cache 616 is associated with and shared by MPUs 614. Cache 616 may store information, including one or more data structures, which is used by the MPUs 614 to process packets. In other embodiments, each MPU 614 may have its own separate cache. MPUs 614 can run P4 code for performing various network functions (e.g., encapsulation of packets, decapsulation of packets). As previously indicated, P4 is a programming language that is typically used for performing packet processing functions in forwarding planes in networking devices. In contrast to general purpose languages such as C or Python, P4 is a domain-specific language with a number of constructs optimized for network data forwarding. The accelerated path plane 604 can thus process packets faster than the slow path plane. In certain implementations, accelerated path plane 604 can process 40 million PPS (packets per second), while slow path plane 606 comprising the ARM cores can do about 10 million PPS. The MPUs 614 can be organized into groups of MPUs and different pipelines of MPUs. MPUs 614 can run multiple stages and a packet could be processed by multiple MPUs. There could be a pipeline of actions performed by multiple MPUs.

As shown in FIG. 6, NVD 600 can also include a shared memory 610 that is shared between accelerated path plane 604 and slow path plane 606. NVD 600 can also include one or more additional memories, such as DRAM 612. Databus/Interconnect 614 provides interconnectivity between the various components of NVD 600. The functions performed by the various components of NVD 600 are further described below with respect to flowchart 700 depicted in FIG. 7.

Figure 7:
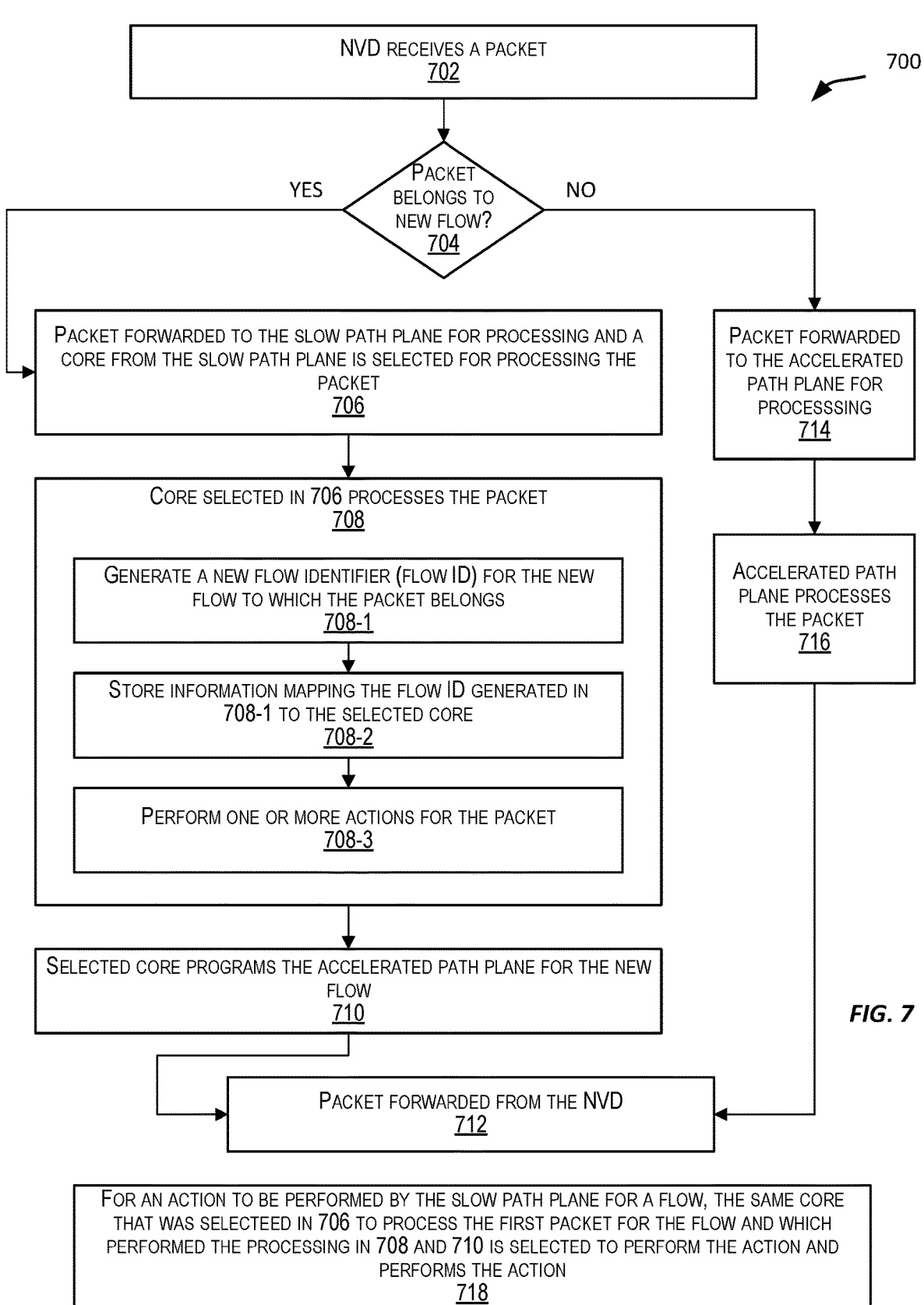
FIG. 7 depicts a simplified flowchart showing processing performed by an NVD (or a network device, in general) upon receiving a packet for a new flow according to certain embodiments.

FIG. 7 depicts a simplified flowchart 700 showing processing performed by an NVD (or a network device, in general) upon receiving a packet for a new flow according to certain embodiments. The processing depicted in FIG. 7 and described below may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method depicted in FIG. 7 and described below is intended to be illustrative and non-limiting. Although the various processing steps are shown as occurring in a particular sequence or order, this is not intended to be limiting. In certain alternative embodiments, the processing may be performed in some different order, or some steps may also be performed in parallel. The processing depicted in FIG. 7 has been explained in reference to NVD 600 depicted in FIG. 6.

At 702, NVD 600 receives a packet. The packet may be received, for example, via a port 602 (e.g., Ethernet port) of NVD 600. The received packet may be placed in a memory that is shared by the accelerated path plane and the slow path plane, such as in a packet buffer 608 (or DRAM 612) of NVD 600. In some embodiments, the packet buffer 608 itself may include one or more memories (e.g., dynamic random-access memory (DRAM), static random-access memory (SRAM), etc.). In certain implementations, packet buffer 220 may queue received packets for further processing by slow path plane 606 or accelerated path plane 604.

At 704, processing is performed to determine whether the packet belongs to a flow that accelerated path plane 604 is already programmed to handle (i.e., the received packet is not the first packet received by the NVD 600 for the flow), or whether the packet is the first packet for a new flow for which the accelerated path plane 604 has not yet been programmed to handle. In certain implementations, a set of rules are applied to perform the processing in 704. Upon determining in 704 that the received packet belongs to a new flow, then processing continues with 706. Upon determining in 704 that the received packet belongs to an existing flow that the accelerated path plane has already been programmed to handle, then processing continues with 714.

Various different techniques may be used to determine the flow to which the packet belongs. For example, the 5-tuple (or 6-tuple) information extracted from the header of the received packet may be used to determine a flow for the packet. In certain implementations, packets belonging to the same flow must have the same 5-tuple (or 6-tuple) pieces of information.

At 706, upon determining that the packet is for a new flow (i.e., is the first packet received by the NVD for the flow), the packet is sent to the slow path plane 606 for processing and a core 618 from the multiple cores of the slow path plane 606 is selected for processing the packet.

In certain implementations, the processing in 704 is performed by the accelerated path plane 604. For example, the accelerated path plane 604 may be "sitting on the wire" and looks at each packet received by the NVD 600 and determines whether it knows what to do with the packet (i.e., whether accelerated path plane 604 has previously been programmed by the slow path plane 606 for that flow). If the accelerated path plane 604 does not know how to process the packet, the accelerated path plane 604 sends the packet to the slow path plane 606 for processing. In certain implementations, as part of this processing, the accelerated path plane 604 may write the packet to shared memory 610, which is shared between the accelerated path plane 604 and the slow path plane 606. In certain other embodiments, the slow path plane 606 may pick the packet up from packet buffer 608. In certain use cases, in about 99% of the cases, the accelerated path plane 604 knows how to process received packets and the packet never gets sent to the slow path plane 606.

As indicated above, a particular core of the slow path plane 606 is selected in 706 for processing the received packet. Various different techniques may be used for selecting a particular core of the slow path plane 606 for processing the packet from the multiple available cores of the slow path plane 606. In certain implementations, an RSS hashing technique is used to select the core in 706. For example, the 6-tuple or the 5-tuple information determined from the header (e.g., encapsulated header) of the received packet may be hashed to generate a hash value. The hash value may then be used to select a core from the slow path plane to process the packet. For example, in an NVD with a slow path plane comprising sixteen (16) ARM cores, a 16-bit RSS hashing technique may be used to hash the 5-tuple or 6-tuple extracted from the packet header to generate a hash value. The generated hash value may then be used to select a particular ARM core 618 from the sixteen cores in the slow path plane. In certain implementations, the selected core may receive an interrupt, and in response, the packet may be copied (e.g., using Direct Memory Access (DMA) techniques) from the packet buffer 608 to a cache 620 associated with the selected core 618.

In alternative embodiments other hashing techniques may be used. Further, while the various examples described in this disclosure use a 5-tuple or a 6-tuple for the hashing and flow identification, this is not intended to be limiting. In alternative embodiments, other tuples using more or fewer than 5 or 6 fields of the packet header may be used for hashing and for flow identification.

At 708, the core 618 selected in 706 performs processing for the packet. As part of the processing, the selected core may:

(a) At 708-1, the selected core may generate a new identifier (flow ID) for the new flow.

(b) At 708-2, the selected core may store information mapping the new flow identifier generated in 708-1 to the selected core. In certain implementations, the information mapping the core to the flow (e.g., the flow ID generated in 708-1) may be stored as part to flow ID-to-cores mapping information 626 in shared memory 610 of NVD 600. The selected core may be identified using a core identifier (core ID). Accordingly, a mapping between the flow and the core may be stored as a mapping between a flow ID and a core ID, such as (flow ID: core ID). For example, "Flow X: Core Y" may indicate that flow X is mapped to core Y (or core Y is mapped to Flow X) thereby indicating that the processing of the first packet for traffic flow identified by "Flow X" was handled by the core identified by "Core Y" identifier. The mapping information may be stored in shared memory 610 from where it can be accessed by both components of accelerated path plane

604 and slow path plane 606. As described below, the flow ID-to-cores mapping information 626 is used to identify the specific selected for processing that is to be performed by slow path plane 606 after the accelerated path plane 604 has been programmed to process the flow. In some embodiments, in addition to the flow IDs-to-cores mapping information or instead of the flow IDs-to-cores mapping information, each core may store a list of flows for which the first packets for the flows were processed by the core. In certain implementations, a core may store this list in a memory accessible to the core, such as in a cache associated with the core.

(c) At 708-3, the selected core 618 performs one or more actions for the packet, such as encapsulation/decapsulation actions, etc.

As part of the processing performed in 708, the core from the slow path plane 606 that processes the packet may build one or more data structures in its associated cache to facilitate the processing of the packet. The one or more data structures may store flow state information for the flow corresponding to the packet. One or more cache entries may be stored in the core's cache storing information used for processing the packet for the new network flow. For example, the cache may store a hash table data structure, data structures storing information regarding the 5-tuple or 6-tuple of the received packet, and other packet or associated flow-related information. The packet itself may contain any suitable payload contents (e.g., text video, audio, etc.) associated with a particular flow between the endpoints.

At 710, the selected core programs the accelerated path plane 604 for the new flow. This enables the processing of subsequent packets belonging to the flow to be handled by the accelerated path plane 604 instead of the slow path plane 606. The programming enables the accelerated path plane 604, instead of slow path plane 606, to perform data plane related functions for subsequent packets received by the NVD for the flow. In certain implementations, as part of the programming, information regarding the flow ID for the new flow is conveyed to the accelerated path plane 604. The information mapping flow IDs to core IDs may be stored in a location accessible to the accelerated path plane. As part of the programming, rules may be programmed that identify the flow and how packets belonging to the flow are to be processed by the accelerated path plane 604. The programmed information may include rules related to the actions to be performed for the new flow, such as related to packet encapsulation, aging, logging, etc.

In certain implementations, such as the embodiment depicted in FIG. 6, the accelerated path plane 604 and the slow path plane 606 both have access to a shared memory 610. In such an embodiment, as part of programming the accelerated path plane 604 for a flow, the selected core may write rules 622 to the shared memory 610 identifying the programmed flows and, for each flow, how packets received for that flow are to be processed by the accelerated path plane 604. The mapping information 626 may also be written to the shared memory 610 for access by the accelerated path plane 604.

At 712, the packet is forwarded from the NVD 600. In the case where the packet is processed by the slow path plane, the packet forwarding is done based upon processing performed by the selected core of the slow path plane and without involving the accelerated path plane. For example, the packet may be forwarded from a port 602 of NVD 600 to another network device to facilitate communication of the packet to its intended destination. For example, the packet may be forwarded from NVD 600 to another NVD associated with the host machine that is the intended recipient of the packet. The processing performed by the core of the slow path plane may identify which port of the NVD the packet is to go out on.

In certain implementations, as part of 712, the packet may be queued in packet buffer 608 waiting to be routed to another network device. In some embodiments, a traffic manager process may be provided that coordinates (e.g., including load-balancing) queueing and/or de-queueing of packets in packet buffer 608 and for facilitating forwarding of the packets from NVD 600.

If it is determined in 704 that the received packet is not the first packet for a flow (i.e., is the second or subsequent packet for the flow) but is instead a packet belonging to a known flow for which the accelerated path plane 604 has already been programmed (e.g., programmed by slow path plane 606 in 710) to handle, then, at 714, the packet is forwarded to accelerated path plane 604 for processing.

At 716, the packet is processed by the accelerated path plane 604. In certain implementations, the P4 code running on MPUs 614 of accelerated path plane 604 examine the packet and determine how it is to be processed and perform the appropriate actions. Rules programmed for processing packets for that flow may be used to determine the actions to be performed. These actions may include, for example, adding a particular encapsulation to the packet, determining a port of NVD 600 to be used for egressing the packet, and other actions.

The processing in 716 may be performed by one or more MPUs 614 of the accelerated path plane 604. The MPUs may be organized into multiple pipelines including an ingress pipeline and an egress pipeline. The ingress pipeline may be configured to perform flow identification, encapsulate the packet, and send it to an egress pipeline where other actions (e.g., updating counters associated with the flow to which the packet belongs, update other info for the flow) may be performed after identifying the flow to which the packet belongs. Cache 616 associated with the MPUs may store information and one or more data structures that are used by the MPUs 614 to process the packets. Flow identification may include determining the flow ID for the flow to which the packet belongs. The egress pipeline may then forward the packet from the NVD in 712. In some cases, the packet may be forwarded from NVD 600 via a selected port to another network device for facilitating communication of the packet to its intended destination. For example, the packet may be forwarded to another NVD associated with the intended destination host for the packet. In some other use cases, the packet may get sent to one of the DMA portions of the accelerated path plane and the packet may get DMAed to the host via a PCIe interface.

After the slow path plane has processed the first packet received for a flow and programmed the accelerated path plane to handling data plane related processing for the traffic flow, there are certain actions or functions related for the traffic flow that are to be performed by the slow path plane. These actions may be referred to as slow path plane actions. In 718, for any action to be performed by the slow path plane for a flow after the first packet for the flow has been processed and the accelerated path plane programmed for that flow, the same slow path plane core that was selected in 706 for the first packet received for the flow and which performed the processing in 708 and 710 is selected to perform the action and the selected core then performs the action. Performing the action may include performing various processing corresponding to the action. In this manner, flow affinity/locality information is used to perform the action. As described below, different innovative techniques may be used in 718 to cause the action to be performed by same slow path plane core.

As indicated above, there are various actions that are performed by the slow path plane after a processing unit of the slow path plane (e.g., a processing core of the slow path plane) has already performed processing for the first packet received for the flow by the network device and programmed the accelerated path plane for handling data plane related processing for that flow. As described herein, these subsequent actions for a flow (subsequent because they are performed after the slow path plane has already processed the first packet received for the flow and programmed the accelerated path plane for handling data plane related processing for the flow) are also performed by the same processing unit of the slow path plane that processed the first packet for that flow and programmed the accelerated path plane.

There are various examples of such actions that are performed by the slow path plane including, but not limited to, actions for flow aging, for flow logging, and other actions. The following section describes actions associated with flow aging and flow logging. This is however not intended to be limiting or restricting in any manner. Flow aging and flow logging are just example of actions that are performed by the slow path plane and to which teachings described in this disclosure may be applied.

Flow Aging

There are various scenarios that may cause a traffic flow, that the accelerated path plane has been programmed to handle, to be deleted from an NVD. As one example, this may occur when there is a reset of the system (e.g., an inline delete). The slow path plane may receive a reset signal and then a core from the slow path plane may perform processing to delete a flow.

As another example, deletion of a flow can also be caused due to aging of a flow (referred to as flow aging). After the accelerated path plane has been programmed by the slow path plane to handle packet processing for a particular network flow, as part of its processing, the accelerated path plane keeps track of packets received for the flow and the time when the packets arrive at the NVD. In certain implementations, if the next packet in the flow is not received within a certain time interval from the last received packet for the flow (i.e., the time period between two packet is not within a certain time interval threshold), the accelerated path plane marks that flow as expired or aged. For example, if a packet for a particular flow does not arrive within some threshold time (e.g., 20 secs, 30 secs) of the last received packet, the accelerated path plane deems the flow as having aged or expired.

In certain implementations, the accelerated path plane sets a flag associated with the flow indicating the flow as aged or expired. For a flow marked as aged, the slow path plane then has to perform an action responsive to the flow being marked as aged. Performance of the action may include performing one or more sub-actions such as deleting the flow entries corresponding to the expired flow, deprogramming the accelerated path plane for the flow, and the like. In certain implementations, as part of performing the action, a core from the slow path plane that handles the processing may call one or more APIs provided by the accelerated path plane to perform the action or sub-actions.

In certain implementations, the accelerated path plane may inform the slow path plane that a flow has aged or expired by sending a notification to the slow path plane that the flow has aged (flow aged notification), and a core of the slow path plane then performs the responsive action.

It is preferred that the action and the related processing that is performed by the slow path plane for a flow that is aged be performed by the same core of the slow path plane that processed a previous packet of the flow (e.g., the first received packet for the flow) and which programmed the accelerated path plane for the flow. For example, in the scenario where the accelerated path plane sends a flow aged notification to the slow path plane, it is desired that the notification be sent to that same core from the slow path plane that previously performed processing for the flow. This enables any data structures storing flow state information cached by that core when a previous packet belonging to that flow was processed by that core to be taken advantage of and used for performing processing responsive to the flow aging or deletion notification. That same core can then use the previously built and cached data structures for performing an action responsive to the flow aging notification. This enables the action for the flow to the performed in a faster time than if the processing had been performed by some other core from the slow path plane. As described below, techniques are described that enable the flow aging action to be performed by the same core that processed a previous packet of the flow (e.g., the first received packet for the flow).

Flow Logging

Once the accelerated path plane has been programmed to handle a traffic flow, the accelerated path plane, as part of its processing for the flow, is configured to store or log information for the flow. This logged information (referred to as flow log information or flow log data) may include, for example, information related to various statistics and counters for the flow (e.g., how many packets for the flow are received by the NVD, when the packets are received including when the last packet for the flow was received), flow gaining information for the flow, and other flow-related information. For each flow handled by the accelerated path plane, the slow path plane is configured to, on a periodic basis (e.g., every 30 seconds, every minute, every 10 minutes, etc.), fetch information that is logged by the accelerated path plane for the flow. The slow path plane may then provide the fetched flow log information to a downstream consumer of the logged information (e.g., send it to the customer, send it to a downstream analytics or metrics service, send it to a logging service), store the flow log information in a database or memory, and the like. The accelerated processing plane thus manages and is responsible for logging information for each of the flows that the accelerated path plane is programmed to handle, and the slow path plane has to perform a flow logging action on a periodic basis for flow log information logged by the accelerated path plane.

In certain implementations, the accelerated path plane periodically sends a notification (referred to as a flow logging notification) to the slow path plane, for example, every minute. Upon receiving the notification, a core from the slow path plane picks up the notification and performs an action responsive to the notification where the action can include fetching the flow log data for the flow corresponding to the notification raised by the accelerated path plane, sending the fetched flow log data to some downstream consumer of the data (e.g., a metrics service, to a customer), and/or storing the fetched information in a database or other memory storage.

It is preferred that the processing related to flow logging be performed by the same core of the slow path plane that previously performed processing for the flow, such as a core that processed the first received packet for the flow and which programmed the accelerated path plane for the flow. It is thus desired that the flow logging notification sent by the accelerated path plane be sent to and be processed by this same core of the slow path plane. This enables any data structures cached by that core when a previous packet belonging to the flow was processed by that core to be taken advantage of and be used for performing processing responsive to the flow logging notification. That same core can then use these previously cached data structures for performing the flow logging related processing in a faster time than if the processing had been performed by some other core from the slow path plane. As described below, techniques are described that enable the flow logging notification to be sent to the same core that processed a previous packet of the flow (e.g., the first received packet for the flow).

In certain implementations, the flow log information written by the accelerated path plane for the various flows handled by the accelerated path plane may be written to memory in the form of one or more log entries. One or more multiple log entries may be written by the accelerated path plane for a flow. Each log entry comprises information (e.g., flow ID) identifying the flow for which the log entry is written. In certain implementations, these log entries may be written to a shared memory (e.g., shared memory 610 depicted in FIG. 6) that is shared between the accelerated path plane and the slow path plane. The cores from the slow path plane are configured to read and fetch the log entries from the shared memory and perform processing for the fetched entries. It is again preferable that, for a log entry for a particular flow, the same core of the slow path plane that previously performed processing for the flow perform the flow logging action and related processing.

General Actions Performed by the Slow Path Plane

Flow aging and flow logging are examples of situations where actions are performed by the slow path plane for a particular flow even after the slow path plane has already programmed the accelerated path plane for handling that flow. Flow aging and flow logging are merely examples of such actions and are not intended to limit the scope of claimed embodiments. Other actions may also be performed using similar techniques.

In general, after the slow path plane has processed a first packet for a flow and programmed the accelerated path plane for that packet flow, subsequent processing related to the flow that is to be performed by the slow path plane, it is desired that the processing be performed by the same core of the slow path plane that previously processed the flow. For example, it is preferred that the action be performed by the same core that processed the first packet received by the NVD for the flow and programmed the accelerated path plane for handling data plane forwarding for the flow. The teachings described in this disclosure enable the same core to perform the processing. The teachings described herein can apply to any action that the slow path plane performs after the accelerated path plane has already been programmed by the slow path plane to handle processing for the flow.

According to certain embodiments, when a core of the slow path plane has previously performed processing for a flow, for any subsequent action to be performed by the slow path plane for that flow, the teachings described in this disclosure enable the action to be directed to and be performed by the same core of the slow path plane that previously performed processing for the flow. For example, the subsequent action is performed by the core that processed the first packet belonging to the flow that was received by the NVD and programmed the accelerated path plane for that particular flow.

FIG. 8 depicts a simplified flowchart 800 showing processing performed for causing an action for a flow to be performed by a particular processing unit (e.g., core) of the slow path plane that previously performed processing for the flow, according to certain embodiments. The processing depicted in FIG. 8 and described below may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method described below is intended to be illustrative and non-limiting. Although the various processing steps are shown as occurring in a particular sequence or order, this is not intended to be limiting. In certain alternative embodiments, the processing may be performed in some different order, or some steps may also be performed in parallel.

Processing may be triggered, at 802, when the accelerated path plane identifies a particular flow for which an action is to be performed by the slow path plane. The action may be, for example, an action to be performed responsive to a flow being aged/expired, a flow logging action, and the like.

At 804, the accelerated path plane uses a technique, possibly from multiple available techniques, to identify a particular processing unit (e.g., a particular core) of the slow path plane that previously performed processing for the particular flow identified in 802. For example, the accelerated path plane may identify a core of the slow path plane that processed the first packet received by the NVD belonging to the particular flow and where the core programmed the accelerated path plane for handling that flow. For example, the accelerated path plane may identify a core of the slow path plane that performed processing corresponding to 706, 708, and 710 depicted in FIG. 7.

The accelerated path plane may use different techniques in 804 to identify the particular core from the multiple cores of the slow path plane. Examples of these techniques include:

(1) Using flow IDs-to-cores mapping information—According to this technique, the accelerated path plane uses the flow IDs-to-cores mapping information to determine a core of the slow path plane that is mapped to the particular flow identified in 802. For example, the accelerated path plane may determine a flow ID for the particular flow identified in 802. The accelerated path plane may then use the flow ID-to-cores mapping information to determine a particular core of the slow path plane that is mapped to or associated with the flow ID. As previously described, the flow IDs-to-cores mapping information is set up by the slow path plane when first packets corresponding to new flows are received by the slow path plane and processed by cores of the slow path plane.

(2) Using hashing techniques—In certain implementations, the accelerated path plane may use hashing techniques, such as RSS-hashing techniques, to determine the particular core of the slow path plane in 804. As described above, a 5-tuple or a 6-tuple or, in general, an n-tuple extracted from a packet header is used to determine a traffic flow for the packet. Accordingly, all packets belonging to a flow have the same n-tuple information. Additionally, when a first packet belonging to a new flow is received by an NVD, the hash of the n-tuple of that first packet may be used to select a particular core from the multiple cores of the slow path plane for processing that first received packet for the new flow. For example, see the description above for the processing performed in 706 for flowchart 700 depicted in FIG. 7. Accordingly, as part of the processing performed in 804, the accelerated path plane may use the same hashing technique (e.g., RSS hashing) to hash the n-tuple (e.g., 5-tuple, 6-tuple, etc.) corresponding to the particular flow to generate a hash value. Since all packets belonging to a particular flow have the same n-tuple, the resultant hash value generated from hashing the n-tuple is also the same. The accelerated path plane may then determine the particular core of the slow path plane based upon the hash value by using the same core selection technique that was used in 706 in FIG. 7. This technique results in the selection of the same core that previously handled the first packet for the flow and programmed the flow. In this technique, the RSS smartness is built into the accelerated path plane and the flow IDs-to-cores mapping information is not needed.

At 806, the accelerated path plane sends a signal to the particular core determined in 804 about the particular flow and the action to be performed. In certain implementations, the signal communicated from the accelerated path plane to the particular core includes information identifying the action to be performed and the flow for which the action is to be performed.

There are various ways in which the accelerated path plane can send the signal to the slow path plane in 806. The signal sent in 806 may take different forms such a notification, a message, and the like.

(a) Using a notification—In certain implementations, the signal may be a notification (e.g., flow aging notification, flow logging notification) that is sent by the accelerated path plane to the particular core of the slow path plane identified in 804. For example, the accelerated path plane may write a notification to the notifications queue of the particular core, where the notification identifies the action to be performed and the flow for which the action is to be performed.

(b) Using a message—As another example, the accelerated path plane may send a message to the particular core using some messaging system, where the message identifies the action to be performed and the flow for which the action is to be performed.

(c) Using a control packet—As yet another example, the accelerated path plane may send a control packet to the particular core of the slow path plane identified in 804 to inform the particular core of the action to be performed and the particular flow for which the action is to be performed. Information indicative of the action may be included in the control packet. Upon receiving the control packet, the slow path plane then processes the control packet like a regular packet and sees that it contains or represents an instruction from the accelerated path plane, where the instruction identifies the particular core of the slow path plane that is to perform the action, the action to be performed, and the particular flow for which the action is to be performed. Further details related to the use of control packets is described in U.S. Patent Application No. U.S. Non-Provisional application Ser. No. 17/244,727 filed Apr. 29, 2021, the entire contents of which are incorporated herein by reference for all purposes.

At 808, the particular core of the slow path plane receiving the signal sent in 806 performs the action for the particular flow. For example, if the signal is sent in the form of a notification that is written to the particular core's notifications queue, the particular core may access the notification written to its notifications queue and perform the appropriate processing corresponding to the action for the flow identified by the notification. Performing the action in 808 may involve performing one or more sub-actions. For example, the action to be performed in 808 for flow aging may include deleting flow entries for the flow, deprogramming the accelerated path plane for the flow, and other sub-actions. As another example, the action to be performed for flow logging may include fetching log data for the flow, processing the log data, providing the log data to a downstream consumer of the data, storing the log data, and the like.

In flowchart 800 depicted in FIG. 8 and described above, the accelerated path plane is configured to determine the particular traffic flow for which an action is to be performed by the slow path plane, the nature of the action, and also the particular core of the slow path plane that previously performed processing for the particular traffic flow. The accelerated path plane then sends a signal to that particular identified core. In flowchart 900 depicted in FIG. 9, the accelerated path plane does not determine the particular core of the slow path plane. Instead, the accelerated path plane sends a signal to the slow path plane, where the signal includes information that enables the particular core to be determined at the slow path plane. The signal may also include information indicative of the action to be performed, the flow for which the action is to be performed, and any other information needed for performing the action.

FIG. 9 depicts a simplified flowchart 900 showing processing performed for causing an action for a flow to be performed by a particular processing unit (e.g., core) of the slow path plane that previously performed processing for the flow, according to certain embodiments. The processing depicted in FIG. 9 and described below may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method described below is intended to be illustrative and non-limiting. Although the various processing steps are shown as occurring in a particular sequence or order, this is not intended to be limiting. In certain alternative embodiments, the processing may be performed in some different order, or some steps may also be performed in parallel.

Processing may be triggered, at 902, when the accelerated path plane identifies a particular flow for which an action is to be performed by the slow path plane. The action may be, for example, an action to be performed responsive to a flow being aged/expired, a flow logging action, and the like.

In 904, the accelerated path plane sends a signal to the slow path plane, where the signal includes information that enables the slow path plane to identify a particular core from the slow path plane to perform the action for the flow, where the particular core is one that previously processed a packet belonging to that particular flow (e.g., the first packet belonging to the flow received by the NVD) and programmed the accelerated path plane for that flow. The signal that is sent in 902 can take various different forms, such as a notification, a message, a control packet that is sent by the accelerated path plane to the slow path plane, and the like.

In 906, based upon the information included in the signal received from the accelerated path plane, a particular core of the slow path plane is selected for performing the action.

This selected core is the same core that processed the first packet of the flow received by the NVD and programmed the accelerated path plane for the flow.

At 908, the particular core of the slow path plane identified in 906 performs the action for the particular flow. Performing the action may include performing one or more sub-actions corresponding to the action.

As indicated above, in 904, the accelerated path plane includes information in the signal that is sent to the slow path plane that enables the slow path plane to determine the particular core of the slow path plane to perform the action. This information that is included in the signal can take different forms. Some examples are described below:

(1) Hash value—In certain implementations, the accelerated path plane may include in the signal, a hash value resulting from applying a hashing technique to the n-tuple corresponding to the flow for which the action is to be performed. Upon receiving the signal from the accelerated path plane, the slow path plane determines the hash value from the signal. The slow path plane can then use a selection technique to select a core from the slow path plane using the hash value. If the selection technique that is used in 906 is the same as the selection technique used to select a slow path plane core in 706 of FIG. 7, then the selection will result in the selection of the same core that was selected in 706 since the hash value will be the same. In certain implementations, the slow path plane may store mapping information that maps hash values to cores of the slow path plane. This mapping information may be set up when the slow path plane processes the first packets received for the flows. This mapping information may then be used in 906 to determine a core corresponding to the hash value identified by the signal received from the accelerated path plane. In this manner, the core selected in 906 to perform the action is the same core that previously processed the flow and programmed the accelerated path plane for that flow.

(2) n-tuple—In certain implementations, instead of including the hash value in the signal, the accelerated path plane may include in the signal the n-tuple (e.g., 5-tuple or 6-tuple) corresponding to the flow for which the action is to be performed. Upon receiving the signal, the slow path plane may generate a hash value based upon the n-tuple in the signal, and then use a core selection technique to select a particular core from the multiple cores of the slow path plane based upon the generated hash value. Since the tuple in the signal is the same tuple that was used to select a core of the slow path plane when a first packet for the flow was received by the NVD, if the same hash valued based core selection technique is used, then, in 906, this results in the selection of the same core that previously performed processing for the flow, e.g., processed the first packet of the flow received by the NVD and programmed the accelerated path plane for the flow.

(3) Flow identification information (e.g., flow ID)—In certain implementations, the accelerated path plane may include in the signal sent to the slow path plane in 904 the flow ID corresponding to the flow for which the action is to be performed. The slow path plane may then, in 906, use this flow ID and the flow IDs-to-cores mapping information to determine a particular core of the slow path plane that is mapped to the flow ID. The particular core may then perform the action for the flow in 908.

(4) Core information—In certain implementations, the accelerated path plane may use the flow IDs-to-cores mapping information to identify a core of the slow path plane that is mapped to the particular core for which the action is to be performed. The accelerated path plane may then include the core identification information (e.g., the core ID) in the signal sent to the slow path plane in 904. The core identification information may then be used to identify the specific core of the slow path plane to perform the action.

In flowcharts 800 and 900 depicted in FIGS. 8 and 9, and described above, the accelerated path plane sends a signal regarding the action to the slow path plane. In certain implementations, the accelerated path plane may not send any signal but may instead write data (e.g., a flag, a status indicator) to a memory entry related to the flow for which an action by the slow path plane is to be performed. This data is then used to inform the slow path plane of the action to be performed. The data stored in the memory entry may also be used to identify a particular core from the slow path plane for performing the action, where the core is one that previously performed processing for that flow, e.g., a core that processed the first packet received by the NVD for that flow and which programmed the accelerated path plane for that flow.

Figure 10:
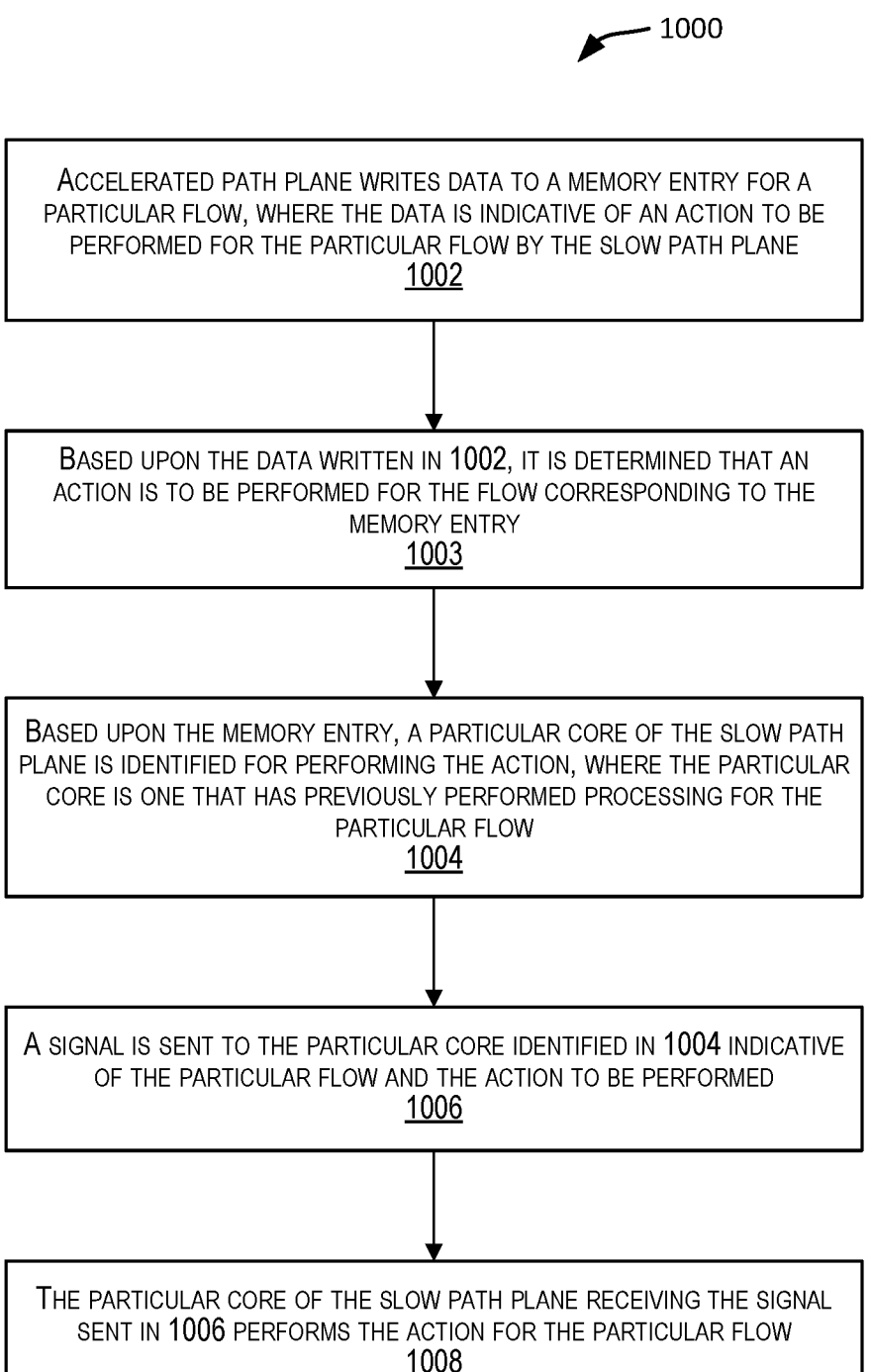
FIG. 10 depicts yet another simplified flowchart showing processing performed for causing an action for a flow to be performed by a particular processing unit (e.g., core) of the slow path plane that previously performed processing for the flow, according to certain embodiments.

FIG. 10 depicts a simplified flowchart 1000 showing processing performed for causing an action for a flow to be performed by a particular processing unit (e.g., core) of the slow path plane that previously performed processing for the flow, according to certain embodiments. The processing depicted in FIG. 10 and described below may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method described below is intended to be illustrative and non-limiting. Although the various processing steps are shown as occurring in a particular sequence or order, this is not intended to be limiting. In certain alternative embodiments, the processing may be performed in some different order, or some steps may also be performed in parallel.

In 1002, the accelerated path plane (e.g., one or more of the MPUs of the accelerated path plane) writes data to a memory entry for a particular flow, where the information is indicative of the action to be performed for the particular flow by the slow path plane. In certain embodiments, the accelerated path plane maintains a list of one or more memory entries for each flow that the accelerated path plane is programmed to handle. In certain implementations, these memory entries (also referred to as flow entries) may be stored in a shared memory that is accessible to the accelerated path plane and to the slow path plane. For example, in the embodiment depicted in FIG. 1, flow entries 624 may be stored and maintained by accelerated path plane 604 in shared memory 610 for the various flows handled by accelerated path plane 604.

A flow entry (e.g., an entry in flow entries 624) may include various pieces of information about a flow such as information indicative of a particular flow (e.g., a particular flow ID) for which the flow entry stores information, information regarding statistics/counters for the flow, and the like. Additionally, each flow entry may include a field for storing information that is indicative of an action to be performed by the slow path plane. For a flow for which an action is to be performed by the slow path plane, the accelerated path plane may write data to this field indicative of the action to be performed. The data that is written may be in the form of a flag, a status code, etc. For example, for a particular flow to be marked as aged, the accelerated path plane may write a flag to a flow entry for the particular flow indicating that the flow has been marked as aged or expired.

In 1003, based upon the data written to the memory entry (e.g., flow entry), it is determined that a slow path plane action is to be performed for the flow corresponding to the memory entry.

In 1004, based upon the memory entry, a particular core of the slow path plane is identified for performing the action, where the particular core is one that has previously performed processing for the particular flow. For example, a particular core of the slow path plane is identified that processed the first packet received by the NVD for that flow and which programmed the accelerated path plane for that flow.

There are various ways in which the processing performed in 1003 and 1004 may be implemented. In some implementations, the NVD provides a notifications subsystem that is configured to periodically read/poll the flow entries maintained by the accelerated path plane and to raise appropriate notifications responsive to data stored by the entries. As part of the processing in 1003, the notifications subsystem is able to detect the data written in 1002 and raise responsive notifications. For example, as part of periodically reading the flow entries, the notifications subsystem may detect that a particular flow entry includes data that indicates that a particular flow corresponding to the flow entry is flagged as aged by the accelerated path plane. The notification subsystem may then, in 1004, determine a flow ID corresponding to the expired flow, and then use the flow IDs-to-cores mapping information to determine a particular core of the slow path plane that is mapped to the flow ID of the expired flow. In some NVD implementations, the notifications subsystem may be separate from the slow path plane and the accelerated path plane. In other implementations, the notifications subsystem may be part of the accelerated path plane or part of the slow path plane. In yet other embodiments, the functionality of the notifications subsystem may be divided between the accelerated path plane and the slow path plane.

In 1006, a signal is sent to the particular core of the slow path plane identified in 1004 indicative of the particular flow and the action to be performed. This may be done by sending a message to the identified core, a notification to the particular core identifying the action to be performed and the flow for which the action is to be performed, a control packet, etc. For example, in the case of an expired flow, the notifications subsystems may then send a flow aged notification or message to a core of the slow path plane identified in 1004. This may be done, for example, by the notifications subsystem writing a flow age notification to a notifications queue associated with the identified core.

In 1008, the particular core of the slow path plane receiving the signal sent in 1006 performs the action for the particular flow. For example, if a flow aged notification is written in 1006 to a notifications queue of the particular core, the core may pick up the notification from its queue and perform the necessary processing for deleting the particular flow. As another example, if a flow logging notification is written in 1006 to a notifications queue of the particular core, the core may pick up the notification from its queue and perform the necessary processing related to log data for the flow.

FIG. 11 depicts a simplified flowchart 1100 showing processing performed for causing an action for a flow to be performed by a particular processing unit (e.g., core) of the slow path plane that previously performed processing for the flow, according to certain embodiments. The processing depicted in FIG. 11 and described below may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method described below is intended to be illustrative and non-limiting. Although the various processing steps are shown as occurring in a particular sequence or order, this is not intended to be limiting. In certain alternative embodiments, the processing may be performed in some different order, or some steps may also be performed in parallel.

In 1102, as described above with respect to 1002 depicted in FIG. 10, the accelerated path plane (e.g., one or more of the MPUs of the accelerated path plane) may write data to a memory entry for a particular flow, where the information is indicative of the action to be performed for the particular flow by the slow path plane.

In 1104, where the cores of the slow path plane may be configured to periodically read the flow entries maintained by the accelerated path plane for the various flows that the accelerated path plane is programmed to handle. For example, as indicated above, the flow entries may be stored in a memory that is shared between the accelerated path plane and the slow path plane. A core of the slow path plane may use the flow IDs-to-cores mapping information, or the list of flows stored by the core to determine all flows that are mapped to the core. On a periodic basis, a core may then be configured to read the flow entries for those flows that are mapped to that core and determine if any slow path plane action is to be performed for any of those flows.

Accordingly, based upon the reading of the flow entries by the slow path plane cores in 1104, in 1106, a particular core of the slow path plane may determine that it has previously performed processing for the particular flow and an action is to be performed for the flow. For example, the core may determine that a flow aged flag has been set in the flow entry for a flow whose first packet was processed by the particular core.

In 1108, the particular core of the slow path plane then performs the action for the particular flow. For example, the core may perform a flow aging action and delete the particular flow. As another example, the particular may perform a flow logging action for the particular flow.

In certain embodiments, cores of the slow path plane can query the accelerated path plane to determine if any actions are to be performed by the cores for flows that were previously processed by the cores. An example of such an embodiment is depicted in FIG. 12 and described below. FIG. 12 depicts a simplified flowchart 1200 showing processing performed when a core of the slow path plane initiates processing for an action to be performed by the slow path plane, according to certain embodiments. The processing depicted in FIG. 12 and described below may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method described below is intended to be illustrative and non-limiting. Although the various processing steps are shown as occurring in a particular sequence or order, this is not intended to be limiting. In certain alternative embodiments, the processing may be performed in some different order, or some steps may also be performed in parallel.

The processing depicted in FIG. 12 is performed by a processing unit (e.g., a core) of the slow path plane. In certain implementations, each core the slow path plane may be configured to periodically, or in response to some event, perform the processing depicted in FIG. 12 and described below. At 1202, a core of the slow path plane may send a signal to the accelerated path plane requesting information about any actions for any flows to be performed by that core. For example, the particular core of the slow path plane may call an API provided by the accelerated path plane to send the signal to the accelerated path plane. As part of the API call, information identifying the requesting core is communicated to the accelerated path plane.

In 1204, the accelerated path plane determines the set of one or more flows that were previously processed by the core sending the signal in 1202. For example, the accelerated path plane may use the flow ID-to-cores mapping information to determine all the flows that are mapped to the particular core of the slow path plane that sent the signal in 1202. Other techniques may also be used to identify the flows that were previously processed by the requesting slow path plane core.

In 1206, from the set of flows identified in 1204, the accelerated path plane identifies any flow for which one or more actions are to be performed by the slow path plane and the nature of the actions to be performed. For example, the accelerated path plane may determine if there are any flags set for entries associated with the flows identified in 1204 that indicate any actions to be performed by the slow path plane. For example, for each flow identified in 1204, the accelerated path plane may determine if a flow expired flag has been set for the flow, and if so, identify that flow as one for which a slow path plane action (e.g., action for flow aging) is to be performed. In a similar manner, the accelerated path plane may check other flags or status information in the flow entries to determine any slow path plane actions (e.g., flow logging) to be performed for the flows identified in 1204. A flow identified in 1204 may have zero, one, or multiple slow path plane actions to be performed for the flow.

At 1208, the accelerated path plane sends a signal to the requesting core identifying the one or more flows identified in 1206, and for each flow, the one or more slow path plane actions to be performed for the flow. The signal sent in 1208 may be in the form of one or more notifications, messages to the requesting core, control packets, and the like.

In the case of notifications, a notification may be sent for each (flow, action) combination. For example, if a particular action (e.g., flow aging action) is to be performed for a first flow and a second flow, a first notification corresponding to the (first flow, action) may be written to a notifications queue of the requesting core, and a second notification corresponding to the (second flow, action) may written to the notifications queue of the requesting core. As another example, if two different actions (e.g., flow aging and flow logging) are to be performed for the same flow, a first notification corresponding to the (flow, first action) and a second notification corresponding to the (flow, second action) may written to the notifications queue of the requesting core. In other embodiments, other types of indications may be sent by the accelerated path plane to the particular core in 1208.

At 1210, the requesting core of the slow path plane receiving the signal sent in 1208 performs, for each identified flow, the one or more actions identified in the signal to be performed for that flow. In embodiments where notifications are written to the notifications queue of the core, the core may access these notifications form its notifications queue and, for each notification, perform the action for the flow identified by the notification.

Per flowchart 1200 depicted in FIG. 12 and the associated description, given information identifying a particular core, the accelerated path plane is able to identify all flows for which that core previously performed processing (e.g., the core processed the first packet received by the NVD for that flow and programmed the accelerated path plane for handling the flow), and further identify those flows for which one or more slow path plane actions are to be performed. The accelerated path plane is able to send information identifying such flows and the associated actions to be performed to the requesting core of the slow path plane. The accelerated path plane then sends a signal to the requesting slow path plane core identifying the flows and the actions.

In flowchart 1200 depicted in FIG. 12, the requesting core may call APIs provided by the accelerated path plane to send the request to the accelerated path plane in 1202. The accelerated path plane determines both a set of flows that are mapped to the requesting core and, from that set, one or more flows for which one or more actions are to be performed by the slow path plane. In some other embodiments, action-specific APIs may be provided that enable a core of the slow path plane to query the accelerated path plane for a particular action and request information from the accelerated path plane regarding flows previously processed by the requesting core and for which the particular action is to be performed. For example, a slow path plane core may call a flow aging API which requests the accelerated path plane to send information to the requesting core identifying any flows that were previously processed by the core and for which a flow aging action is to be performed. Responsive to the API call, the accelerated path plane may identify those flows that were previously processed by the calling core and for which a flow aging action is to be performed. Information identifying those flows may be then sent as a response to the core calling the action-specific API. The slow path plane core receiving the information may then perform the flow aging action for the identified flows.

In some other embodiments, flow-specific APIs may be provided that enable a slow path plane core to determine if any actions are to be performed by the requesting core for a particular flow. Information identifying a flow (or multiple flows) is provided as an input parameter to the flow-specific API by the calling core. For example, a core of the slow path plane may itself be able to determine which set of flows were previously processed by that core. The core may then call a flow-specific API and provide a flow (or multiple flows) from the set of flows as input to the API. In response, the accelerated path plane may respond back with any slow path plane actions to be performed for that flow by the calling core.

In the embodiment depicted in FIG. 12 and described above, the accelerated path plane first determines, in 1204, a set of flows that are mapped to the requesting slow path plane core and then, in 1206, identifies if any slow path plane actions are to be performed for any flow in that set of flows. In other embodiments, the accelerated path plane may first identify a set of flows for which any slow path plane action is to be performed, and then from this set, identify flows that are mapped to the requesting slow path plane core.

In some other embodiments, a core of the slow path plane may itself be able to determine which set of flows were previously processed by that core. The core may then on its own determine if any slow path plane actions are to be performed for any of those set of flows. An example of such an embodiment is depicted in FIG. 13 and described below.

FIG. 13 depicts a simplified flowchart 1300 showing processing performed according to certain embodiments. The processing depicted in FIG. 13 and described below may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method described below is intended to be illustrative and non-limiting. Although the various processing steps are shown as occurring in a particular sequence or order, this is not intended to be limiting. In certain alternative embodiments, the processing may be performed in some different order, or some steps may also be performed in parallel.

At 1302, a core of the slow path plane identifies a set of flows that were previously processed by that core. For example, the core may identify a set of one or more flows for which the first packets received by the NVD for those flows were processed by that core and the core programmed the accelerated path plane for those flows.

The core may use different techniques to identify the flows in 1302. Examples of these techniques include:

(1) The core uses the flow IDs-to-cores mapping information to identify all flow IDs that are mapped to that core. The flow IDs correspond to the flows programmed by that core.

(2) The core may have stored information identifying a list of flows that were previously processed by that core. In certain implementations, information identifying the list may be stored in a cache associated with the core. The core may then use this list to identify the flows that were previously processed by the core.

(3) As previously described, the accelerated path plane may maintain a set of flow entries corresponding to the different flows that the accelerated path plane is programmed to handle. A flow entry for a flow may include various pieces of information related to the flow such as the n-tuple (e.g., 5-tuple or 6-tuple) that was used to identify the flow, various counters and statistics for the flow (e.g., when packets for the received). In certain implementations, as part of the processing performed in 1302, the core may use a hashing technique to hash the n-tuple for each flow entry to generate a hash value. The hash value maps to a particular core of the slow path plane. If the same hashing technique is used as in 706 in FIG. 7, when a core of the slow path plane is selected to handle a first packet received by the NVD for a new flow, the hash value generated in 1302 will map to the same core of the slow path plane. Using this technique, the core can identify all flows that map to itself.

(4) In certain implementations, the accelerated path plane may itself perform the hashing for each flow and write the resultant hash value in a flow entry for that flow. A list may be maintained in the NVD identifying cores of the slow path plane, and for each core, a list of hash values that are mapped to that core indicating that the flows corresponding to the hash values were processed by that core. In such an embodiment, as part of the processing performed in 1302, the core may read the hash values from the flow entries and determine which ones of those hash values map to that core. The flow entries with hash values that map to that slow path plane core are the flows that were previously processed by the core.

At 1304, from the set of flows identified in 1302, the core identifies those one or more (or zero) flows for which at least one slow path plane action is to be performed, and the one or more actions to be performed for each such identified flow. A flow that maps to the core may have zero, one, or multiple slow path plane actions to be performed for the flow.

As previously described, in certain implementations, the accelerated path plane may maintain a set of flow entries corresponding to network flows that the accelerated path plane has been programmed to handle. The accelerated path plane may write data to flow entries corresponding to flows for which a slow path plane action is to be performed. For example, for a flow that the accelerated path plane determines has aged, the accelerated path plane may set a flag in the flow entry for that flow indicating that the flow has aged. In 1304, the slow path plane core may read these flow entries and determine that for a flow that was previously processed by the core, a flag has been set indicating that the flow has aged and accordingly a flow aging action is to be performed for that flow.

At 1306, for each flow identified in 1304, the core performs the one or more actions for that flow. For example, the core may perform flow aging-related action, flow logging action, etc.

As depicted in flowchart 1300 depicted in FIG. 13 and the associated description, a core of the slow path plane is able to identify those flows that were programmed by the core. The core can then take ownership for performing any slow path plane-performed actions for those flows. In the alternative, if a particular flow is not programmed by the core, the core does not perform the actions for that core and instead allows the particular core that programed that flow to perform those actions.

As described above, various different implementations (e.g., architectures) and techniques may be used to ensure that the same slow path plane processing unit that processed the first packet received by an NVD for a flow and which programmed the accelerated path plane for handling the data plane processing for the flow performs any subsequent slow path plane actions for that flow. FIG. 14 depicts processing that is performed in the context of flow aging, according to certain embodiments. FIG. 14 depicts a simplified flowchart 1400 showing processing performed when a flow is marked as aged or expired and where the resultant processing on the slow path plane side is directed to and performed by the same core that processed a previous (e.g., the first packet of the flow received by the NVD) packet belonging to the flow and programmed that flow, according to certain embodiments. The processing depicted in FIG. 14 and described below may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method described below is intended to be illustrative and non-limiting. Although the various processing steps are shown as occurring in a particular sequence or order, this is not intended to be limiting. In certain alternative embodiments, the processing may be performed in some different order, or some steps may also be performed in parallel.

Processing is initiated when, at 1402, the accelerated path plane determines that a particular flow has aged or expired. As part of 1402, the accelerated path plane may determine that, for the particular flow, a packet for the flow has not arrived within a threshold time (e.g., 20 seconds, 30 seconds, etc.) from the last received packet for the flow.

At 1404, the accelerated path plane marks the particular flow as expired/aged. In certain implementations, the accelerated path plane may write data (e.g., an aged flag) to a flow entry corresponding to aged flow to indicate that the flow has aged.

At 1405, based upon the identity of the flow marked as aged or expired, a core of the slow path plane is identified that previously processed the flow. For example, a core of the slow path plane that processed the first packet received by the NVD for the flow and which programmed the accelerated path plane for the flow.

At 1406, a signal (e.g., a flow aged notification, message, control packet) is sent to the core identified in 1405, where the signal includes information indicative of the flow marked as aged or expired. At 1408, responsive to receiving the signal sent in 1406, the core of the slow path plane performs an action for the aged flow. The processing performed as part of performing the action may involve, for example, deleting the particular flow from the NVD, and deprogramming the accelerated path plane for the flow. This may include removing rules or entries programmed by the slow path plane for that flow, which results in deprogramming the accelerated path plane for the flow. As part of 1408, the selected core may use one or more APIs to perform processing related to deleting the flow and deprogramming the accelerated path plane for the flow. After the deletion, any subsequent packet received by the NVD for the flow is treated as a first packet received by the NVD for the flow.

There are different ways in which the processing in 1405 and 1406 may be implemented. For example, the accelerated path plane may determine a particular flow ID corresponding to the flow that is marked as aged, and then use the flow IDs-to-cores mapping information to determine a core that is mapped to or associated with the particular flow ID. The accelerated path plane may then send a signal to that identified core. As another example, a notifications subsystem provided by the NVD may periodically read/poll flow entries maintained by the accelerated path plane and raise appropriate notifications responsive to information stored by the entries. The notification subsystem may determine that the expired flag has been set for a particular flow, determine the flow ID corresponding to the expired flow, use the flow IDs-to-cores mapping information to determine a slow path plane core mapped to the flow ID of the expired flow, and then send a flow aged notification or message to that core.

In some other implementations, instead of (or in addition to) generating flow IDs and using the flow IDs-to-cores mapping information, the accelerated path plane may use hashing techniques to determine a particular core of the slow path plane. The n-tuple corresponding to the aged flow may be hashed using a hashing technique (e.g., an RSS hashing technique) to generate a hash value. The accelerated path plane may then identify a core of the slow path plane corresponding to the generated hash value. A signal is then sent to the identified core.

In certain implementations, flow aging-specific APIs may be provided that can be called by cores of the slow path plane to get flow aging information from the accelerated path plane. The cores of the slow path plane may be configured to make these API calls on a periodic basis, such as every minute. In response to an API call made by a core, the core may receive information from the accelerated path plane identifying any expired flows mapped to the calling core. The calling core then performs flow aged actions for these flows. There are different ways for implementing these APIs calls.

(Flow Aging APIs—Use Case #1) The calling core has knowledge of or determines the particular flows programmed by that core, and then makes an API call related to flow aging, where the API call identifies those particular flows. For example, a core may use flow IDs-to-cores mapping information to determine all flows that map to that core and their corresponding flow IDs. As another example, the core may store information regarding one or more flows processed by that core. The core may then make an API call to retrieve flow aging information where information identifying those flows is provided as input parameters to the API call. For example, the flow IDs corresponding to those flows previously processed by the core may be included in the API call. Upon receiving the API call, the accelerated path plane determines the flow IDs from the API call, and determines if any of the flows identified by the flow IDs have been marked as aged/expired. The accelerated path plane may then, as a response to the API call, send information to the calling core identifying the expiry status of each flow ID included in the API call, where the expiry status indicates whether a flow is marked as aged/expired or not. The calling core receiving the response may then perform processing for deleting those zero or more flows that are identified as aged/expired.

(Flow Aging APIs—Use Case #2) The calling core has no knowledge and does not perform any processing to identify the flows previously processed and programmed by the core. Instead, this processing is performed by the accelerated path plane. In this second use case, the API call may only include information identifying the core making the call. In such an embodiment, upon receiving an API call made by a particular core of the slow path plane, the accelerated path plane (or some other subsystem of the NVD) may use the flow IDs-to-cores mapping information to determine all the flow IDs (there could be one or multiple flows) that are mapped to that particular calling core. For each determined flow ID, the accelerated path plane may determine if the corresponding flow is marked as aged/expired, and if it is marked as aged/expired, may send information identifying the expired flow to the calling core. The response from the accelerated path plane to the calling core may include information identifying all flows corresponding to that core, and for each flow, expiry status information indicating whether the flow is marked as expired/aged or not. In certain implementations, the response may identify only those zero or more flows that are marked as expired/aged. The calling core may then perform processing for deleting those flows identified as expired/aged.

In certain implementations, for both of the flow aging-related use cases described above, instead of or in addition to sending a response to the API to the calling core, the accelerated path plane may, for each flow marked as expired/aged, write a flow aging notification for that flow to the notifications queue of the calling core. If there are multiple expired flows for the calling core, multiple flow aging notifications, one for each expired flow, may be written to the notifications queue of the calling core. The calling core may then perform processing for the one or more flow aging notifications in its notifications queue.

FIGS. 15 and 16 depict processing that is performed in the context of flow logging. As previously described, the accelerated path plane writes log data/information for the various flows handled by the accelerated path plane. The log information may be written in the form of log entries, where one or multiple log entries may be written for each flow handled by the accelerated path plane. In certain implementations, the log entries may be written to a shared memory that is shared between the accelerated path plane and the slow path plane. Each log entry comprises information (e.g., flow ID) identifying the flow for which the log entry is written. Since the flow ID information is included in each of the log entries, this coupled with the flow IDs-to-cores mapping information can be used to identify a particular core of the slow path plane that is mapped to a flow corresponding to a log entry.

FIG. 15 depicts a simplified flowchart 1500 showing flow logging processing performed according to certain embodiments. The processing depicted in FIG. 15 and described below may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method described below is intended to be illustrative and non-limiting. Although the various processing steps are shown as occurring in a particular sequence or order, this is not intended to be limiting. In certain alternative embodiments, the processing may be performed in some different order, or some steps may also be performed in parallel.

The processing in FIG. 15 assumes that the accelerated path plane has stored log information for the flows that the accelerated path plane is programmed to handle. The stored log information may be in the form of one or multiple log entries for each flow handled by the accelerated path plane. The log entries may be stored by the accelerated path plane in a memory that is shared with the slow path plane. In certain embodiments, the processing depicted in FIG. 15 and described below is performed by each core of the slow path plane.

At 1502, a particular core from the slow path plane accesses the log entries stored by the accelerated path plane for the different packet flows for which the accelerated path plane has been programmed. For example, the core may access the log entries from the shared memory to which the accelerated path plane has written the log information.

At 1504, the core determines the one or more flows that were programmed by that core. The flows identified in 1504 are those where the core has processed a previous packet for the flow (e.g., the first packet received by the NVD for that flow), and the core programmed the accelerated path plane for handling that flow. For example, as part of the processing performed in 1504, the core may use the flow IDs-to-cores mapping information to identify all flow IDs that map to the particular core. In some other implementations, each core of the slow path plane may store information identifying flows handled by that core and their corresponding flow IDs.

At 1506, the core reads and extracts, from the stored log entries accessed in 1502, only those log entries corresponding to one or more flows identified in 1504 that were processed by the core. At 1508, the core performs processing for the log entries extracted in 1506. The processing performed in 1508 may include, for example, performing an action for each flow identified from the log entries. The action for a flow may include fetching the log data (e.g., the one or more log entries) for the flow, processing the log data, providing the log information for the flow to a downstream service (e.g., an analytics/metrics service), sending the log data to a customer or consumer, and the like. Since each core only reads and processes log entries for flows programmed by that core, the same core is used for performing processing for a flow and the core can leverage and use any data structures stored in the cache of the core when the core previously performed processing for the flow (e.g., when the core processed the first packet received by the NVD for the flow) for faster processing of the log data than if the log data processing were done by some other core of the slow path plane.

The example described above uses a shared memory for storing the log data. This is not intended to be limiting. Various other storage techniques and data structures (e.g., arrays) may be used in alternative embodiments.

In certain implementations, flow logging related APIs may be provided that can be called by cores of the slow path plane to fetch log data for the flows. The cores of the slow path plane may be configured to make these API calls on a periodic basis, such as every minute. A particular core of the slow path plane may make an API call to fetch log data for flows handled by the particular core. In response to an API call made by a core, the core may receive log data corresponding only to those flows that were previously processed by that core. There are different ways for implementing these APIs calls.

(Flow Logging APIs—Use Case #1) The calling core has knowledge of or determines the particular flows programmed by that core, and then makes an API call for retrieving the log information, where the API call identifies those particular flows. For example, a core may use flow IDs-to-cores mapping information to determine all flows that map to that core and their corresponding flow IDs. As another example, the core may store information regarding one or more flows processed by that core. The core may then make an API call to retrieve log entries where information identifying those flows is provided as input parameters to the API call. For example, the flow IDs corresponding to those flows may be included in the API call. Upon receiving the API call, the accelerated path plane determines the one or more flow IDs from the API call. The accelerated path plane then identifies, from the log entries stored for the various flows handled by the accelerated path plane, those log entries corresponding to the flow IDs identified in the API call. The accelerated path plane then provides those identified log entries in a response to the calling core. The calling core receiving the response may then perform processing for the received flow log entries.

(Flow Logging APIs—Use Case #2) The calling core has no knowledge and does not perform any processing to identify the flows previously processed and programmed by the core. Instead, this processing is performed by the accelerated path plane. In this case, the API call made by the core may only include information identifying the core. In such an embodiment, upon receiving an API call made by a particular core of the slow path plane, the accelerated path plane (or some other subsystem of the NVD) may use the flow IDs-to-cores mapping information to determine all the flow IDs (there could be one or multiple flows) that are mapped to that particular calling core. For each determined flow ID, the accelerated path plane may then, from the log information stored for the various flows handled by the accelerated path plane, identify those flow log entries corresponding to the flow ID. The accelerated path plane may then provide the identified flow log entries in a response to the calling core. The calling core receiving the response may then perform processing for the received flow log entries.

In certain implementations, for both of the flow logging-related use cases described above, instead of or in addition to sending the log data for the different flows to the calling core, for each flow ID identified in the API call or for each flow ID mapped to the calling core in the flow IDs-to-cores mapping information, the accelerated path plane may write a flow logging notification for the flow corresponding to the flow ID to the notification queue of the calling core. If there are multiple flow IDs for the calling core, multiple flow logging notifications, one for each flow corresponding to a flow ID, may be written to the notifications queue of the calling core. The calling core may then process the log information for the one or more notifications in its notifications queue.

In the processing described above with respect to flow-chart 1500 and the use cases for flow logging, the cores of the slow path plane may be configured to poll the shared memory on a regular basis to read the log information for the various flows from the shared memory. In some other embodiments, the accelerated path plane may be configured to send log notifications to the appropriate core of the slow path plane periodically or when the log entries get written by the accelerated path plane.

FIG. 16 depicts a simplified flowchart 1600 showing flow logging processing performed according to certain embodiments. The processing depicted in FIG. 16 and described below may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method described below is intended to be illustrative and non-limiting. Although the various processing steps are shown as occurring in a particular sequence or order, this is not intended to be limiting. In certain alternative embodiments, the processing may be performed in some different order, or some steps may also be performed in parallel.

At 1602, the accelerated path plane determines that a flow log notification is to be sent to the slow path plane for a particular flow. In certain implementations, the accelerated path plane may be configured to send such a log notification for a flow on a periodic basis. In some other implementations, the accelerated path plane may be configured to send such a log notification for a flow whenever a flow log entry is written by the accelerated path plane for that flow.

At 1604, the accelerated path plane determines the flow ID for the particular flow.

At 1606, using the flow IDs-to-cores mapping information, the accelerated path plane determines a particular core of the slow path plane mapped to the flow ID determined in 1604. The core identified in 1606 is one that processed a previous packet for the flow (e.g., the first packet for the flow received by the NVD) and programmed the accelerated path plane for the flow. At 1608, the accelerated path plane sends a flow log notification for the flow to the core identified in 1606.

At 1610, the core receiving the notification sent in 1608 performs an action responsive to the notification. The performance of the action may include one or more sub-actions or processing that is to be performed for the particular flow. The processing performed in 1610 may include using one or more of the data structures stored in the cache of the core, where the data structures were built by the core when the core previously performed processing for the flow. The one or more data structures may store state information for the flow (e.g., timeout data, statistical data about the flow, routing information, n-tuple hash information, etc.). For example, the core may have built these data structures when the core processed the first packet received by the NVD for the flow and the core programmed the accelerated path plane for handling data plane forwarding for the flow. This enables faster processing as compared to the same processing being performed by some other core of the slow path plane.

Some of the flow logging examples described above use flow IDs and flow IDs-to-cores mapping information. In other embodiments, the accelerated path plane may use RSS hashing techniques to determine a particular core of the slow path plane based upon a hash value generated by applying a hashing technique (e.g., an RSS hashing technique) to the n-tuple (e.g., 5-tuple or 6-tuple) for the particular flow. The accelerated path plane may then send a flow logging notification to the core corresponding to the generated hash value. The hashing technique works such that the same hash value generated for a flow maps to the same core within the slow path plane that was selected for processing the first packet received by the NVD for the flow. The hash value generated by the accelerated path plane thus results in the selection of the same core that previously handled the first packet for the flow and programmed the flow. In this manner, the notifications are sent to the same core of the slow path plane. In this technique, the RSS smartness is built into the accelerated path plane and flow IDs are not needed.

In some embodiments, the accelerated path plane may be configured to, for each log entry for a flow, store the hash value of the n-tuple of that flow in the log entry. A core of the slow path plane can then use these hash values to determine one or more flows handled by the core and the associated log entries. A core can then read and process only those log entries for flows handled by that core.

The cores from the slow path plane are configured to read the log entries and fetch the flow log information for the various flows from the shared memory and perform downstream processing of the flow log information. Since the flow ID information is included in each of the log entries, the flow ID information can be used to identify a particular core of the slow path plane that is mapped to that flow ID. A core of the slow path plane thus can determine flows handled by that core and, can read and process only those log entries for those flows. In this manner, the same core of the slow path plane that handled the first packet for a flow and that programmed the flow also handles the processing of log entries for that flow.

As described above, embodiments described in this disclosure describe techniques that enable, after a particular processing unit (e.g., a core) of the slow path plane has processed the first packet received for the flow and programmed the accelerated path plane to handle data plane processing for the flow, for any subsequent action to be performed by the slow path plane to be directed to and performed by that same particular processing unit (e.g., by the same core). This enables the NVD to take advantage of flow colocation and enables the action to be performed in a faster manner than if the action were to be performed by some other processing unit of the slow path plane. This is because the particular processing unit of the slow path plane may have cached flow-related information and data structures when the processing unit previously processed the flow (e.g., when the processing unit processed the first packet for the flow received by the NVD). The core can reuse and take advantage of these already cached and available information and data structures for performing the subsequent slow path plane action. If instead, the action was to be performed by some other processing unit of the slow path plane, that other unit would need time to rebuild these data structures in order to perform the processing. This rebuilding of the data structure can take time and add unwanted latency to the processing making the processing slower. By ensuring that the subsequent action is performed by the same processing unit that previously performed processing for the flow, the unwanted latency is avoided, and the action is performed in a faster and more efficient manner. More efficient because compute and memory resources do not have to be wasted in regenerating those memory data structures.

The teachings described in this disclosure can be implemented in a network device that is configured to process packet flows. For example, the teachings can be implemented in NVDs the are part of the infrastructure used by a cloud services provider (CSP) to provide one or more cloud services to one or more subscribing customers. NVDs incorporating the various techniques described in this disclosure enable the NVDs to process flows in a faster and efficient manner. This translates to providing faster delivery of cloud services and data communications to the subscribing customers, which in turn translates to a better customer experience. The following section describes examples of CSP infrastructure setups that may be used to provide cloud services to subscribing customers, where the infrastructure can include a set of NVDs that implement the various features described in this disclosure.

Example Architectures for Providing a Cloud Service

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 17:
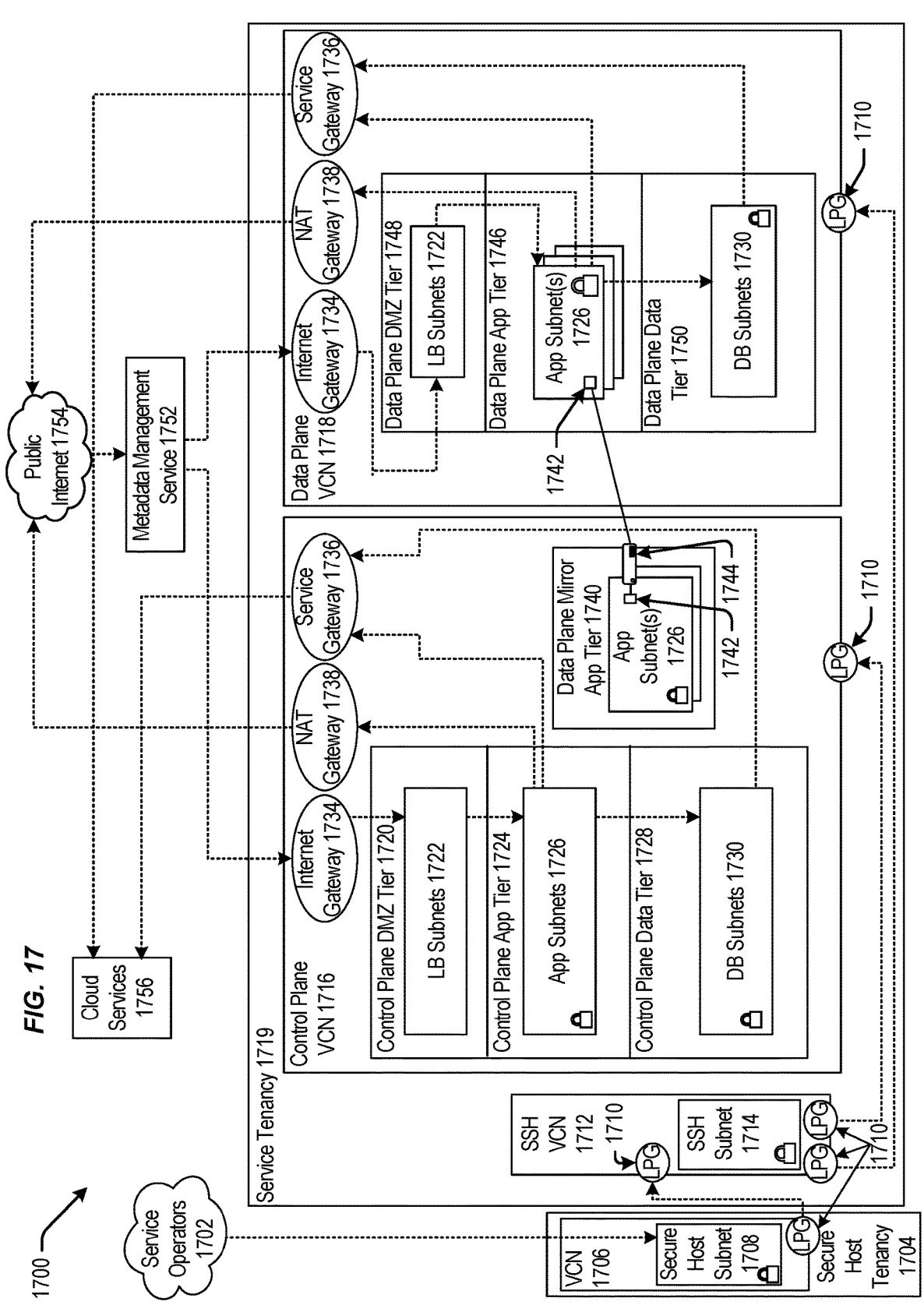
FIG. 17 is a block diagram illustrating one pattern for implementing a cloud infrastructure as a service system, according to at least one embodiment.

FIG. 17 is a block diagram 1700 illustrating an example pattern of an IaaS architecture, according to at least one embodiment. Service operators 1702 can be communicatively coupled to a secure host tenancy 1704 that can include a virtual cloud network (VCN) 1706 and a secure host subnet 1708. In some examples, the service operators 1702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1706 and/or the Internet.

The VCN 1706 can include a local peering gateway (LPG) 1710 that can be communicatively coupled to a secure shell (SSH) VCN 1712 via an LPG 1710 contained in the SSH VCN 1712. The SSH VCN 1712 can include an SSH subnet 1714, and the SSH VCN 1712 can be communicatively coupled to a control plane VCN 1716 via the LPG 1710 contained in the control plane VCN 1716. Also, the SSH VCN 1712 can be communicatively coupled to a data plane VCN 1718 via an LPG 1710. The control plane VCN 1716 and the data plane VCN 1718 can be contained in a service tenancy 1719 that can be owned and/or operated by the IaaS provider.

The control plane VCN 1716 can include a control plane demilitarized zone (DMZ) tier 1720 that acts as a perimeter network (e.g., portions of a corporate network between the corporate intranet and external networks). The DMZ-based servers may have restricted responsibilities and help keep breaches contained. Additionally, the DMZ tier 1720 can include one or more load balancer (LB) subnet(s) 1722, a control plane app tier 1724 that can include app subnet(s) 1726, a control plane data tier 1728 that can include database (DB) subnet(s) 1730 (e.g., frontend DB subnet(s) and/or backend DB subnet(s)). The LB subnet(s) 1722 contained in the control plane DMZ tier 1720 can be communicatively coupled to the app subnet(s) 1726 contained in the control plane app tier 1724 and an Internet gateway 1734 that can be contained in the control plane VCN 1716, and the app subnet(s) 1726 can be communicatively coupled to the DB subnet(s) 1730 contained in the control plane data tier 1728 and a service gateway 1736 and a network address translation (NAT) gateway 1738. The control plane VCN 1716 can include the service gateway 1736 and the NAT gateway 1738.

The control plane VCN 1716 can include a data plane mirror app tier 1740 that can include app subnet(s) 1726. The app subnet(s) 1726 contained in the data plane mirror app tier 1740 can include a virtual network interface controller (VNIC) 1742 that can execute a compute instance 1744. The compute instance 1744 can communicatively couple the app subnet(s) 1726 of the data plane mirror app tier 1740 to app subnet(s) 1726 that can be contained in a data plane app tier 1746.

The data plane VCN 1718 can include the data plane app tier 1746, a data plane DMZ tier 1748, and a data plane data tier 1750. The data plane DMZ tier 1748 can include LB subnet(s) 1722 that can be communicatively coupled to the app subnet(s) 1726 of the data plane app tier 1746 and the Internet gateway 1734 of the data plane VCN 1718. The app subnet(s) 1726 can be communicatively coupled to the service gateway 1736 of the data plane VCN 1718 and the NAT gateway 1738 of the data plane VCN 1718. The data plane data tier 1750 can also include the DB subnet(s) 1730 that can be communicatively coupled to the app subnet(s) 1726 of the data plane app tier 1746.

The Internet gateway 1734 of the control plane VCN 1716 and of the data plane VCN 1718 can be communicatively coupled to a metadata management service 1752 that can be communicatively coupled to public Internet 1754. Public Internet 1754 can be communicatively coupled to the NAT gateway 1738 of the control plane VCN 1716 and of the data plane VCN 1718. The service gateway 1736 of the control plane VCN 1716 and of the data plane VCN 1718 can be communicatively couple to cloud services 1756.

In some examples, the service gateway 1736 of the control plane VCN 1716 or of the data plane VCN 1718 can make application programming interface (API) calls to cloud services 1756 without going through public Internet 1754. The API calls to cloud services 1756 from the service gateway 1736 can be one-way: the service gateway 1736 can make API calls to cloud services 1756, and cloud services 1756 can send requested data to the service gateway 1736. But, cloud services 1756 may not initiate API calls to the service gateway 1736.

In some examples, the secure host tenancy 1704 can be directly connected to the service tenancy 1719, which may be otherwise isolated. The secure host subnet 1708 can communicate with the SSH subnet 1714 through an LPG 1710 that may enable two-way communication over an otherwise isolated system. Connecting the secure host subnet 1708 to the SSH subnet 1714 may give the secure host subnet 1708 access to other entities within the service tenancy 1719.

The control plane VCN 1716 may allow users of the service tenancy 1719 to set up or otherwise provision desired resources. Desired resources provisioned in the control plane VCN 1716 may be deployed or otherwise used in the data plane VCN 1718. In some examples, the control plane VCN 1716 can be isolated from the data plane VCN 1718, and the data plane mirror app tier 1740 of the control plane VCN 1716 can communicate with the data plane app tier 1746 of the data plane VCN 1718 via VNICs 1742 that can be contained in the data plane mirror app tier 1740 and the data plane app tier 1746.

In some examples, users of the system, or customers, can make requests, for example create, read, update, or delete (CRUD) operations, through public Internet 1754 that can communicate the requests to the metadata management service 1752. The metadata management service 1752 can communicate the request to the control plane VCN 1716 through the Internet gateway 1734. The request can be received by the LB subnet(s) 1722 contained in the control plane DMZ tier 1720. The LB subnet(s) 1722 may determine that the request is valid, and in response to this determination, the LB subnet(s) 1722 can transmit the request to app subnet(s) 1726 contained in the control plane app tier 1724. If the request is validated and requires a call to public Internet 1754, the call to public Internet 1754 may be transmitted to the NAT gateway 1738 that can make the call to public Internet 1754. Metadata that may be desired to be stored by the request can be stored in the DB subnet(s) 1730.

In some examples, the data plane mirror app tier 1740 can facilitate direct communication between the control plane VCN 1716 and the data plane VCN 1718. For example, changes, updates, or other suitable modifications to configuration may be desired to be applied to the resources contained in the data plane VCN 1718. Via a VNIC 1742, the control plane VCN 1716 can directly communicate with, and can thereby execute the changes, updates, or other suitable modifications to configuration to, resources contained in the data plane VCN 1718.

In some embodiments, the control plane VCN 1716 and the data plane VCN 1718 can be contained in the service tenancy 1719. In this case, the user, or the customer, of the system may not own or operate either the control plane VCN 1716 or the data plane VCN 1718. Instead, the IaaS provider may own or operate the control plane VCN 1716 and the data plane VCN 1718, both of which may be contained in the service tenancy 1719. This embodiment can enable isolation of networks that may prevent users or customers from interacting with resources of other users, or other customers. Also, this embodiment may allow users or customers of the system to store databases privately without needing to rely on public Internet 1754, which may not have a desired level of threat prevention, for storage.

In other embodiments, the LB subnet(s) 1722 contained in the control plane VCN 1716 can be configured to receive a signal from the service gateway 1736. In this embodiment, the control plane VCN 1716 and the data plane VCN 1718 may be configured to be called by a customer of the IaaS provider without calling public Internet 1754. Customers of the IaaS provider may desire this embodiment since database(s) that the customers use may be controlled by the IaaS provider and may be stored on the service tenancy 1719, which may be isolated from public Internet 1754.

Figure 18:
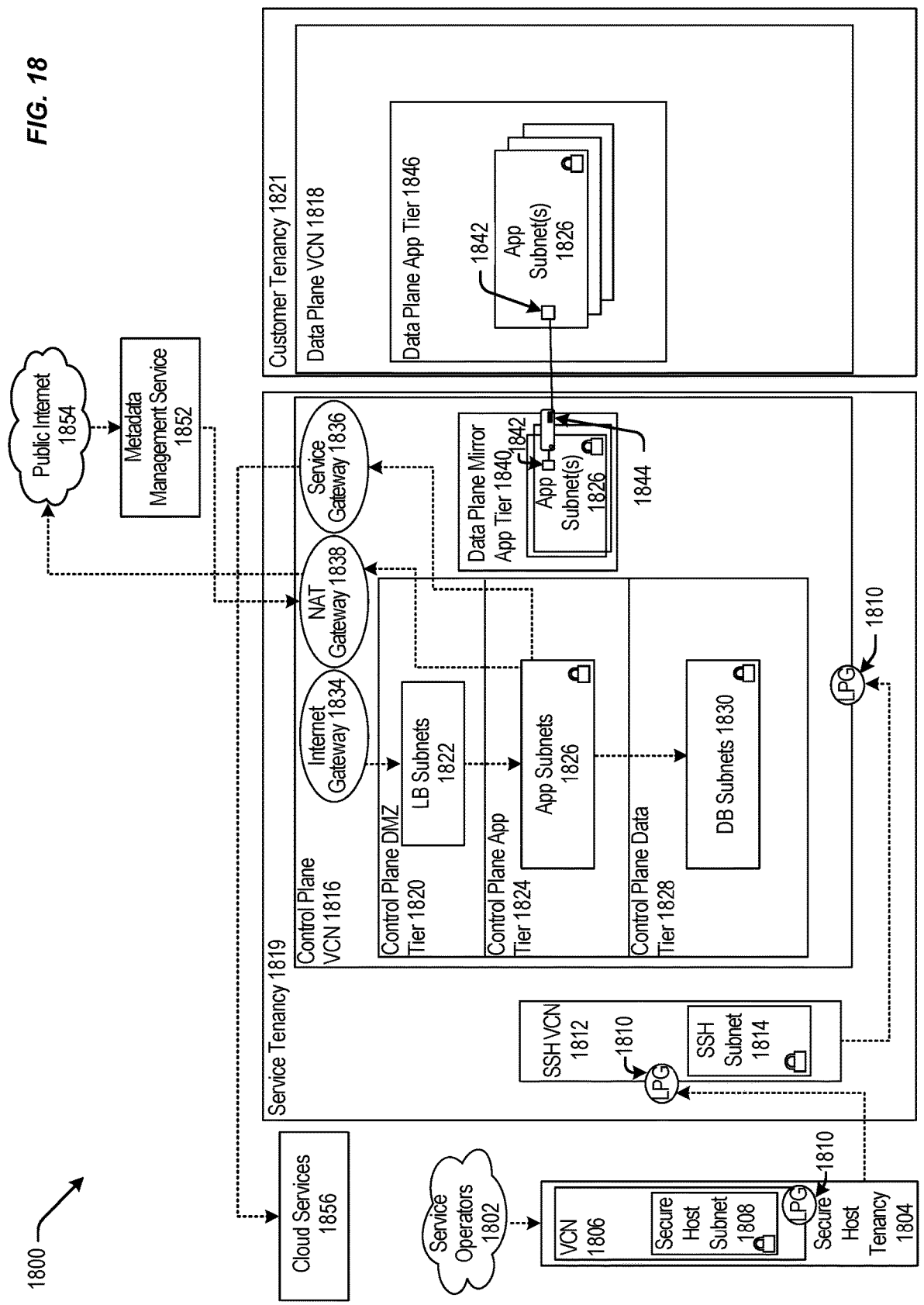
FIG. 18 is a block diagram illustrating another pattern for implementing a cloud infrastructure as a service system, according to at least one embodiment.

FIG. 18 is a block diagram 1800 illustrating another example pattern of an IaaS architecture, according to at least one embodiment. Service operators 1802 (e.g., service operators 1702 of FIG. 17) can be communicatively coupled to a secure host tenancy 1804 (e.g., the secure host tenancy 1704 of FIG. 17) that can include a virtual cloud network (VCN) 1806 (e.g., the VCN 1706 of FIG. 17) and a secure host subnet 1808 (e.g., the secure host subnet 1708 of FIG. 17). The VCN 1806 can include a local peering gateway (LPG) 1810 (e.g., the LPG 1710 of FIG. 17) that can be communicatively coupled to a secure shell (SSH) VCN 1812 (e.g., the SSH VCN 1712 of FIG. 17) via an LPG 1710 contained in the SSH VCN 1812. The SSH VCN 1812 can include an SSH subnet 1814 (e.g., the SSH subnet 1714 of FIG. 17), and the SSH VCN 1812 can be communicatively coupled to a control plane VCN 1816 (e.g., the control plane VCN 1716 of FIG. 17) via an LPG 1810 contained in the control plane VCN 1816. The control plane VCN 1816 can be contained in a service tenancy 1819 (e.g., the service tenancy 1719 of FIG. 17), and the data plane VCN 1818 (e.g., the data plane VCN 1718 of FIG. 17) can be contained in a customer tenancy 1821 that may be owned or operated by users, or customers, of the system.

The control plane VCN 1816 can include a control plane DMZ tier 1820 (e.g., the control plane DMZ tier 1720 of FIG. 17) that can include LB subnet(s) 1822 (e.g., LB subnet(s) 1722 of FIG. 17), a control plane app tier 1824 (e.g., the control plane app tier 1724 of FIG. 17) that can include app subnet(s) 1826 (e.g., app subnet(s) 1726 of FIG. 17), a control plane data tier 1828 (e.g., the control plane data tier 1728 of FIG. 17) that can include database (DB) subnet(s) 1830 (e.g., similar to DB subnet(s) 1730 of FIG. 17). The LB subnet(s) 1822 contained in the control plane DMZ tier 1820 can be communicatively coupled to the app subnet(s) 1826 contained in the control plane app tier 1824 and an Internet gateway 1834 (e.g., the Internet gateway 1734 of FIG. 17) that can be contained in the control plane VCN 1816, and the app subnet(s) 1826 can be communicatively coupled to the DB subnet(s) 1830 contained in the control plane data tier 1828 and a service gateway 1836 (e.g., the service gateway 1736 of FIG. 17) and a network address translation (NAT) gateway 1838 (e.g., the NAT gateway 1738 of FIG. 17). The control plane VCN 1816 can include the service gateway 1836 and the NAT gateway 1838.

The control plane VCN 1816 can include a data plane mirror app tier 1840 (e.g., the data plane mirror app tier 1740 of FIG. 17) that can include app subnet(s) 1826. The app subnet(s) 1826 contained in the data plane mirror app tier 1840 can include a virtual network interface controller (VNIC) 1842 (e.g., the VNIC of 1742) that can execute a compute instance 1844 (e.g., similar to the compute instance 1744 of FIG. 17). The compute instance 1844 can facilitate communication between the app subnet(s) 1826 of the data plane mirror app tier 1840 and the app subnet(s) 1826 that can be contained in a data plane app tier 1846 (e.g., the data plane app tier 1746 of FIG. 17) via the VNIC 1842 contained in the data plane mirror app tier 1840 and the VNIC 1842 contained in the data plane app tier 1846.

The Internet gateway 1834 contained in the control plane VCN 1816 can be communicatively coupled to a metadata management service 1852 (e.g., the metadata management service 1752 of FIG. 17) that can be communicatively coupled to public Internet 1854 (e.g., public Internet 1754 of FIG. 17). Public Internet 1854 can be communicatively coupled to the NAT gateway 1838 contained in the control plane VCN 1816. The service gateway 1836 contained in the control plane VCN 1816 can be communicatively couple to cloud services 1856 (e.g., cloud services 1756 of FIG. 17).

In some examples, the data plane VCN 1818 can be contained in the customer tenancy 1821. In this case, the IaaS provider may provide the control plane VCN 1816 for each customer, and the IaaS provider may, for each customer, set up a unique compute instance 1844 that is contained in the service tenancy 1819. Each compute instance 1844 may allow communication between the control plane VCN 1816, contained in the service tenancy 1819, and the data plane VCN 1818 that is contained in the customer tenancy 1821. The compute instance 1844 may allow resources, which are provisioned in the control plane VCN 1816 that is contained in the service tenancy 1819, to be deployed or otherwise used in the data plane VCN 1818 that is contained in the customer tenancy 1821.

In other examples, the customer of the IaaS provider may have databases that live in the customer tenancy 1821. In this example, the control plane VCN 1816 can include the data plane mirror app tier 1840 that can include app subnet(s) 1826. The data plane mirror app tier 1840 can reside in the data plane VCN 1818, but the data plane mirror app tier 1840 may not live in the data plane VCN 1818. That is, the data plane mirror app tier 1840 may have access to the customer tenancy 1821, but the data plane mirror app tier 1840 may not exist in the data plane VCN 1818 or be owned or operated by the customer of the IaaS provider. The data plane mirror app tier 1840 may be configured to make calls to the data plane VCN 1818 but may not be configured to make calls to any entity contained in the control plane VCN 1816. The customer may desire to deploy or otherwise use resources in the data plane VCN 1818 that are provisioned in the control plane VCN 1816, and the data plane mirror app tier 1840 can facilitate the desired deployment, or other usage of resources, of the customer.

In some embodiments, the customer of the IaaS provider can apply filters to the data plane VCN 1818. In this embodiment, the customer can determine what the data plane VCN 1818 can access, and the customer may restrict access to public Internet 1854 from the data plane VCN 1818. The IaaS provider may not be able to apply filters or otherwise control access of the data plane VCN 1818 to any outside networks or databases. Applying filters and controls by the customer onto the data plane VCN 1818, contained in the customer tenancy 1821, can help isolate the data plane VCN 1818 from other customers and from public Internet 1854.

In some embodiments, cloud services 1856 can be called by the service gateway 1836 to access services that may not exist on public Internet 1854, on the control plane VCN 1816, or on the data plane VCN 1818. The connection between cloud services 1856 and the control plane VCN 1816 or the data plane VCN 1818 may not be live or continuous. Cloud services 1856 may exist on a different network owned or operated by the IaaS provider. Cloud services 1856 may be configured to receive calls from the service gateway 1836 and may be configured to not receive calls from public Internet 1854. Some cloud services 1856 may be isolated from other cloud services 1856, and the control plane VCN 1816 may be isolated from cloud services 1856 that may not be in the same region as the control plane VCN 1816. For example, the control plane VCN 1816 may be located in "Region 1," and cloud service "Deployment 17," may be located in Region 1 and in "Region 2." If a call to Deployment 17 is made by the service gateway 1836 contained in the control plane VCN 1816 located in Region 1, the call may be transmitted to Deployment 17 in Region 1. In this example, the control plane VCN 1816, or Deployment 17 in Region 1, may not be communicatively coupled to, or otherwise in communication with, Deployment 17 in Region 2.

Figure 19:
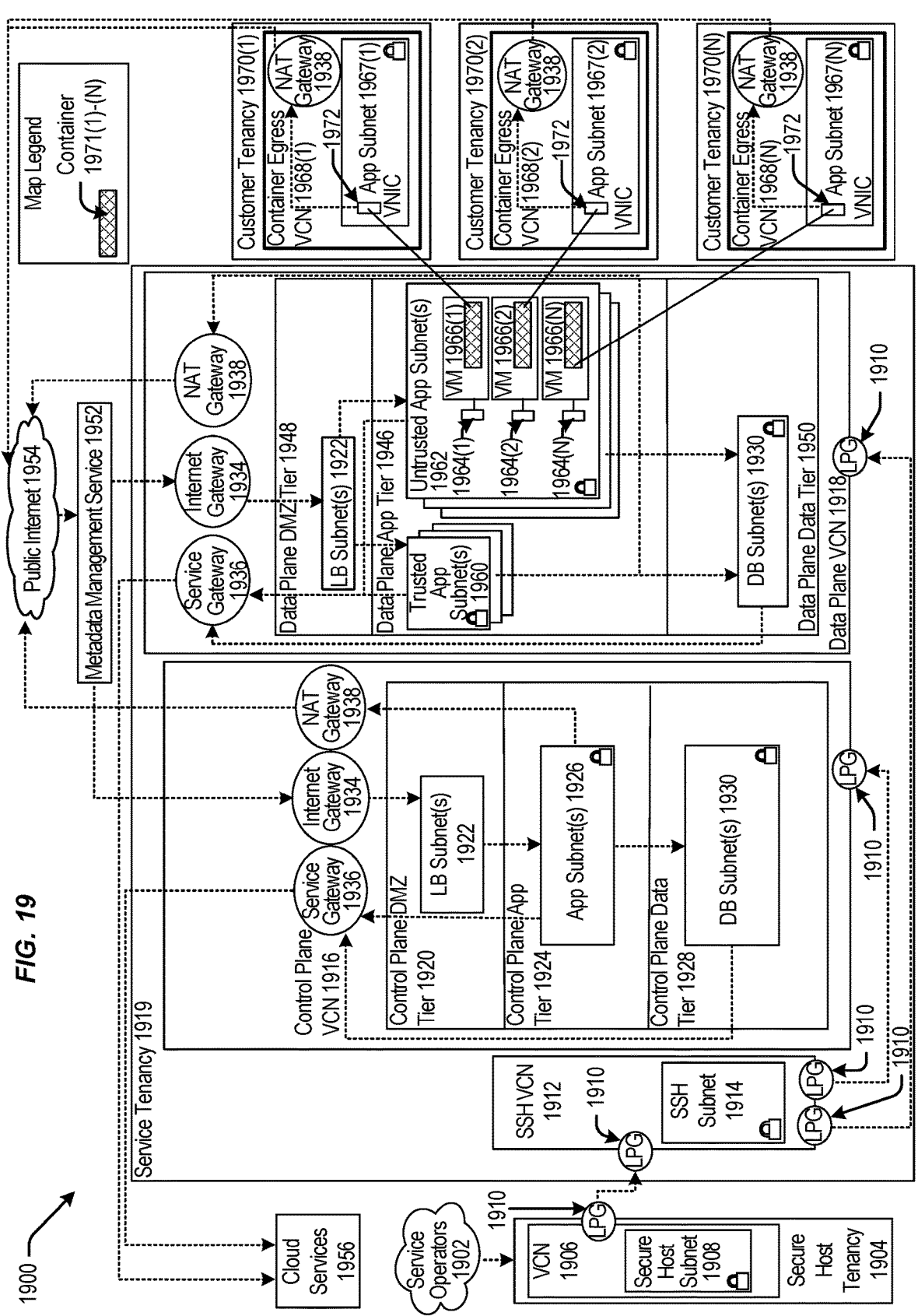
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g., service operators 1702 of FIG. 17) can be communicatively coupled to a secure host tenancy 1904 (e.g., the secure host tenancy 1704 of FIG. 17) that can include a virtual cloud network (VCN) 1906 (e.g., the VCN 1706 of FIG. 17) and a secure host subnet 1908 (e.g., the secure host subnet 1708 of FIG. 17). The VCN 1906 can include an LPG 1910 (e.g., the LPG 1710 of FIG. 17) that can be communicatively coupled to an SSH VCN 1912 (e.g., the SSH VCN 1712 of FIG. 17) via an LPG 1910 contained in the SSH VCN 1912. The SSH VCN 1912 can include an SSH subnet 1914 (e.g., the SSH subnet 1714 of FIG. 17), and the SSH VCN 1912 can be communicatively coupled to a control plane VCN 1916 (e.g., the control plane VCN 1716 of FIG. 17) via an LPG 1910 contained in the control plane VCN 1916 and to a data plane VCN 1918 (e.g., the data plane 1718 of FIG. 17) via an LPG 1910 contained in the data plane VCN 1918. The control plane VCN 1916 and the data plane VCN 1918 can be contained in a service tenancy 1919 (e.g., the service tenancy 1719 of FIG. 17).

The control plane VCN 1916 can include a control plane DMZ tier 1920 (e.g., the control plane DMZ tier 1720 of FIG. 17) that can include load balancer (LB) subnet(s) 1922 (e.g., LB subnet(s) 1722 of FIG. 17), a control plane app tier 1924 (e.g., the control plane app tier 1724 of FIG. 17) that can include app subnet(s) 1926 (e.g., similar to app subnet(s) 1726 of FIG. 17), a control plane data tier 1928 (e.g., the control plane data tier 1728 of FIG. 17) that can include DB subnet(s) 1930. The LB subnet(s) 1922 contained in the control plane DMZ tier 1920 can be communicatively coupled to the app subnet(s) 1926 contained in the control plane app tier 1924 and to an Internet gateway 1934 (e.g., the Internet gateway 1734 of FIG. 17) that can be contained in the control plane VCN 1916, and the app subnet(s) 1926 can be communicatively coupled to the DB subnet(s) 1930 contained in the control plane data tier 1928 and to a service gateway 1936 (e.g., the service gateway of FIG. 17) and a network address translation (NAT) gateway 1938 (e.g., the NAT gateway 1738 of FIG. 17). The control plane VCN 1916 can include the service gateway 1936 and the NAT gateway 1938.

The data plane VCN 1918 can include a data plane app tier 1946 (e.g., the data plane app tier 1746 of FIG. 17), a data plane DMZ tier 1948 (e.g., the data plane DMZ tier 1748 of FIG. 17), and a data plane data tier 1950 (e.g., the data plane data tier 1750 of FIG. 17). The data plane DMZ tier 1948 can include LB subnet(s) 1922 that can be communicatively coupled to trusted app subnet(s) 1960 and untrusted app subnet(s) 1962 of the data plane app tier 1946 and the Internet gateway 1934 contained in the data plane VCN 1918. The trusted app subnet(s) 1960 can be communicatively coupled to the service gateway 1936 contained in the data plane VCN 1918, the NAT gateway 1938 contained in the data plane VCN 1918, and DB subnet(s) 1930 contained in the data plane data tier 1950. The untrusted app subnet(s) 1962 can be communicatively coupled to the service gateway 1936 contained in the data plane VCN 1918 and DB subnet(s) 1930 contained in the data plane data tier 1950. The data plane data tier 1950 can include DB subnet(s) 1930 that can be communicatively coupled to the service gateway 1936 contained in the data plane VCN 1918.

The untrusted app subnet(s) 1962 can include one or more primary VNICs 1964(1)-(N) that can be communicatively coupled to tenant virtual machines (VMs) 1966(1)-(N). Each tenant VM 1966(1)-(N) can be communicatively coupled to a respective app subnet 1967(1)-(N) that can be contained in respective container egress VCNs 1968(1)-(N) that can be contained in respective customer tenancies 1970(1)-(N). Respective secondary VNICs 1972(1)-(N) can facilitate communication between the untrusted app subnet(s) 1962 contained in the data plane VCN 1918 and the app subnet contained in the container egress VCNs 1968(1)-(N). Each container egress VCNs 1968(1)-(N) can include a NAT gateway 1938 that can be communicatively coupled to public Internet 1954 (e.g., public Internet 1754 of FIG. 17).

The Internet gateway 1934 contained in the control plane VCN 1916 and contained in the data plane VCN 1918 can be communicatively coupled to a metadata management service 1952 (e.g., the metadata management system 1752 of FIG. 17) that can be communicatively coupled to public Internet 1954. Public Internet 1954 can be communicatively coupled to the NAT gateway 1938 contained in the control plane VCN 1916 and contained in the data plane VCN 1918. The service gateway 1936 contained in the control plane VCN 1916 and contained in the data plane VCN 1918 can be communicatively couple to cloud services 1956.

In some embodiments, the data plane VCN 1918 can be integrated with customer tenancies 1970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1946. Code to run the function may be executed in the VMs 1966(1)-(N), and the code may not be configured to run anywhere else on the data plane VCN 1918. Each VM 1966(1)-(N) may be connected to one customer tenancy 1970. Respective containers 1971(1)-(N) contained in the VMs 1966(1)-(N) may be configured to run the code. In this case, there can be a dual isolation (e.g., the containers 1971(1)-(N) running code, where the containers 1971(1)-(N) may be contained in at least the VM 1966(1)-(N) that are contained in the untrusted app subnet(s) 1962), which may help prevent incorrect or otherwise undesirable code from damaging the network of the IaaS provider or from damaging a network of a different customer. The containers 1971(1)-(N) may be communicatively coupled to the customer tenancy 1970 and may be configured to transmit or receive data from the customer tenancy 1970. The containers 1971(1)-(N) may not be configured to transmit or receive data from any other entity in the data plane VCN 1918. Upon completion of running the code, the IaaS provider may kill or otherwise dispose of the containers 1971(1)-(N).

In some embodiments, the trusted app subnet(s) 1960 may run code that may be owned or operated by the IaaS provider. In this embodiment, the trusted app subnet(s) 1960 may be communicatively coupled to the DB subnet(s) 1930 and be configured to execute CRUD operations in the DB subnet(s) 1930. The untrusted app subnet(s) 1962 may be communicatively coupled to the DB subnet(s) 1930, but in this embodiment, the untrusted app subnet(s) may be configured to execute read operations in the DB subnet(s) 1930. The containers 1971(1)-(N) that can be contained in the VM 1966(1)-(N) of each customer and that may run code from the customer may not be communicatively coupled with the DB subnet(s) 1930.

In other embodiments, the control plane VCN 1916 and the data plane VCN 1918 may not be directly communicatively coupled. In this embodiment, there may be no direct communication between the control plane VCN 1916 and the data plane VCN 1918. However, communication can occur indirectly through at least one method. An LPG 1910 may be established by the IaaS provider that can facilitate communication between the control plane VCN 1916 and the data plane VCN 1918. In another example, the control plane VCN 1916 or the data plane VCN 1918 can make a call to cloud services 1956 via the service gateway 1936. For example, a call to cloud services 1956 from the control plane VCN 1916 can include a request for a service that can communicate with the data plane VCN 1918.

Figure 20:
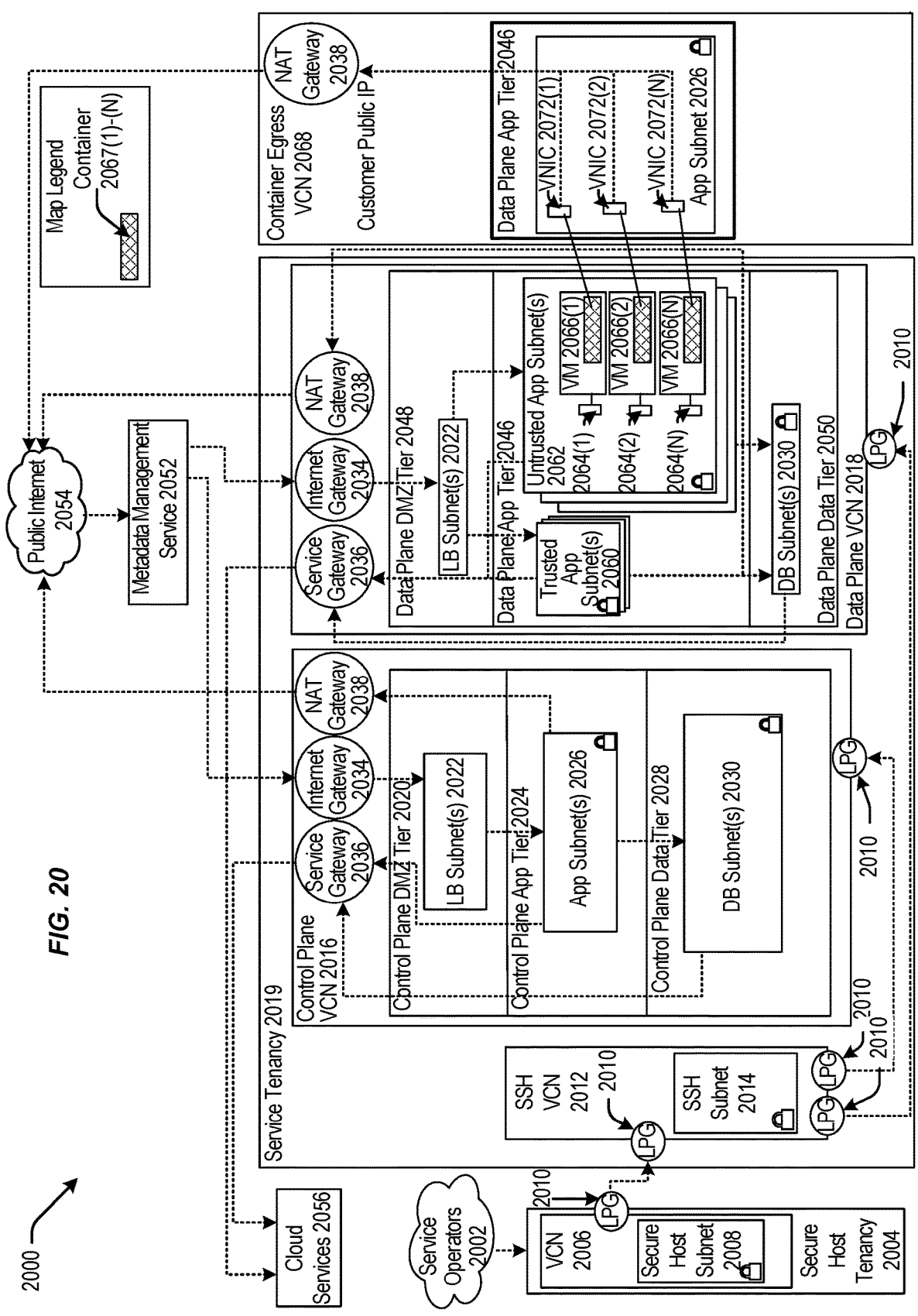
FIG. 20 is a block diagram illustrating another pattern for implementing a cloud infrastructure as a service system, according to at least one embodiment.
Figure 21:
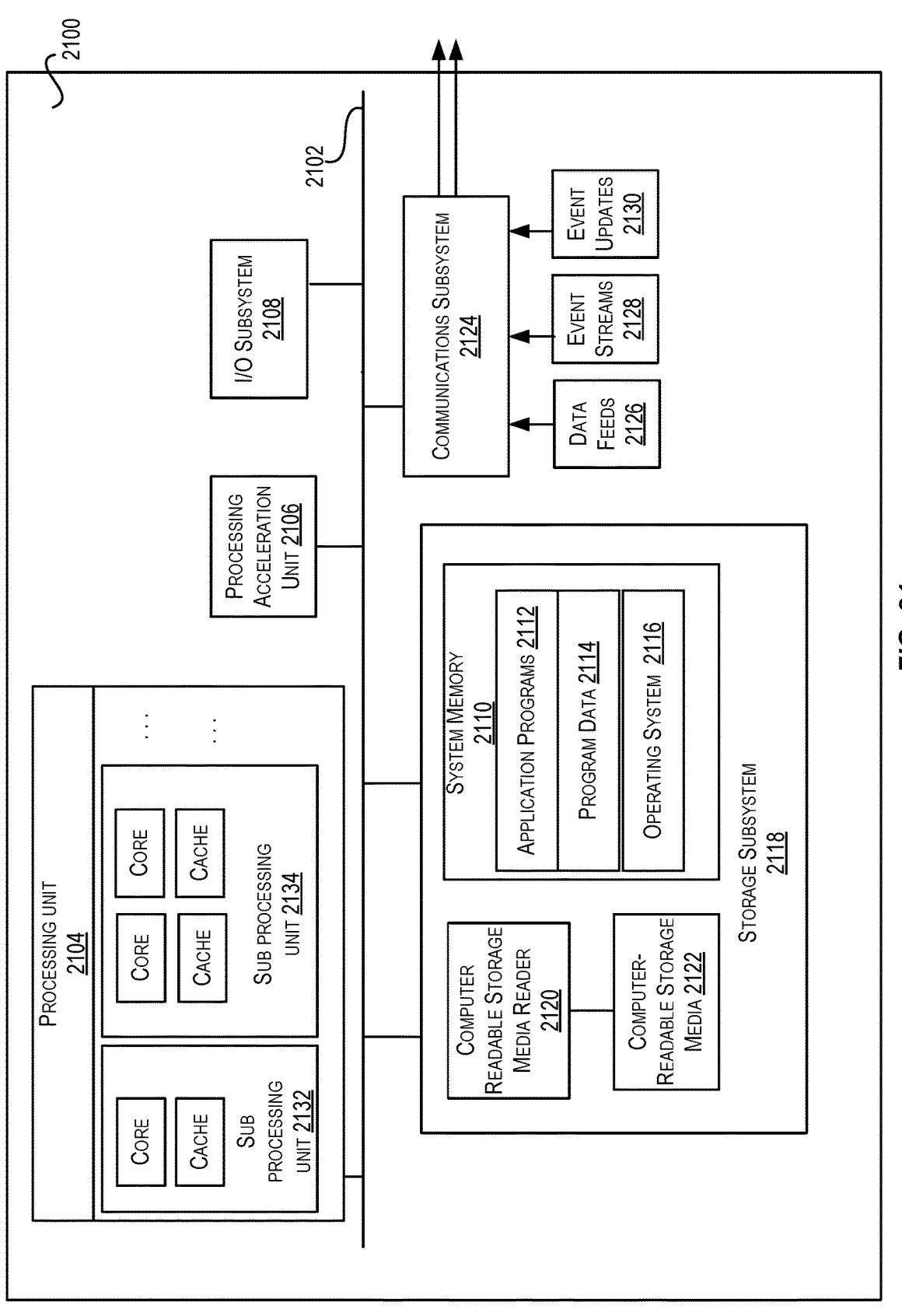
FIG. 21 is a block diagram illustrating an example computer system, according to at least one embodiment.

FIG. 20 is a block diagram 2000 illustrating another example pattern of an IaaS architecture, according to at least one embodiment. Service operators 2002 (e.g., service operators 1702 of FIG. 17) can be communicatively coupled to a secure host tenancy 2004 (e.g., the secure host tenancy 1704 of FIG. 17) that can include a virtual cloud network (VCN) 2006 (e.g., the VCN 1706 of FIG. 17) and a secure host subnet 2008 (e.g., the secure host subnet 1708 of FIG. 17). The VCN 2006 can include an LPG 2010 (e.g., the LPG 1710 of FIG. 17) that can be communicatively coupled to an SSH VCN 2012 (e.g., the SSH VCN 1712 of FIG. 17) via an LPG 2010 contained in the SSH VCN 2012. The SSH VCN 2012 can include an SSH subnet 2014 (e.g., the SSH subnet 1714 of FIG. 17), and the SSH VCN 2012 can be communicatively coupled to a control plane VCN 2016 (e.g., the control plane VCN 1716 of FIG. 17) via an LPG 2010 contained in the control plane VCN 2016 and to a data plane VCN 2018 (e.g., the data plane 1718 of FIG. 17) via an LPG 2010 contained in the data plane VCN 2018. The control plane VCN 2016 and the data plane VCN 2018 can be contained in a service tenancy 2019 (e.g., the service tenancy 1719 of FIG. 17).

The control plane VCN 2016 can include a control plane DMZ tier 2020 (e.g., the control plane DMZ tier 1720 of FIG. 17) that can include LB subnet(s) 2022 (e.g., LB subnet(s) 1722 of FIG. 17), a control plane app tier 2024 (e.g., the control plane app tier 1724 of FIG. 17) that can include app subnet(s) 2026 (e.g., app subnet(s) 1726 of FIG. 17), a control plane data tier 2028 (e.g., the control plane data tier 1728 of FIG. 17) that can include DB subnet(s) 2030 (e.g., DB subnet(s) 1930 of FIG. 19). The LB subnet(s) 2022 contained in the control plane DMZ tier 2020 can be communicatively coupled to the app subnet(s) 2026 contained in the control plane app tier 2024 and to an Internet gateway 2034 (e.g., the Internet gateway 1734 of FIG. 17) that can be contained in the control plane VCN 2016, and the app subnet(s) 2026 can be communicatively coupled to the DB subnet(s) 2030 contained in the control plane data tier 2028 and to a service gateway 2036 (e.g., the service gateway of FIG. 17) and a network address translation (NAT) gateway 2038 (e.g., the NAT gateway 1738 of FIG. 17). The control plane VCN 2016 can include the service gateway 2036 and the NAT gateway 2038.

The data plane VCN 2018 can include a data plane app tier 2046 (e.g., the data plane app tier 1746 of FIG. 17), a data plane DMZ tier 2048 (e.g., the data plane DMZ tier 1748 of FIG. 17), and a data plane data tier 2050 (e.g., the data plane data tier 1750 of FIG. 17). The data plane DMZ tier 2048 can include LB subnet(s) 2022 that can be communicatively coupled to trusted app subnet(s) 2060 (e.g., trusted app subnet(s) 1960 of FIG. 19) and untrusted app subnet(s) 2062 (e.g., untrusted app subnet(s) 1962 of FIG. 19) of the data plane app tier 2046 and the Internet gateway 2034 contained in the data plane VCN 2018. The trusted app subnet(s) 2060 can be communicatively coupled to the service gateway 2036 contained in the data plane VCN 2018, the NAT gateway 2038 contained in the data plane VCN 2018, and DB subnet(s) 2030 contained in the data plane data tier 2050. The untrusted app subnet(s) 2062 can be communicatively coupled to the service gateway 2036 contained in the data plane VCN 2018 and DB subnet(s) 2030 contained in the data plane data tier 2050. The data plane data tier 2050 can include DB subnet(s) 2030 that can be communicatively coupled to the service gateway 2036 contained in the data plane VCN 2018.

The untrusted app subnet(s) 2062 can include primary VNICs 2064(1)-(N) that can be communicatively coupled to tenant virtual machines (VMs) 2066(1)-(N) residing within the untrusted app subnet(s) 2062. Each tenant VM 2066(1)-(N) can run code in a respective container 2067(1)-(N), and be communicatively coupled to an app subnet 2026 that can be contained in a data plane app tier 2046 that can be contained in a container egress VCN 2068. Respective secondary VNICs 2072(1)-(N) can facilitate communication between the untrusted app subnet(s) 2062 contained in the data plane VCN 2018 and the app subnet contained in the container egress VCN 2068. The container egress VCN can include a NAT gateway 2038 that can be communicatively coupled to public Internet 2054 (e.g., public Internet 1754 of FIG. 17).

The Internet gateway 2034 contained in the control plane VCN 2016 and contained in the data plane VCN 2018 can be communicatively coupled to a metadata management service 2052 (e.g., the metadata management system 1752 of FIG. 17) that can be communicatively coupled to public Internet 2054. Public Internet 2054 can be communicatively coupled to the NAT gateway 2038 contained in the control plane VCN 2016 and contained in the data plane VCN 2018. The service gateway 2036 contained in the control plane VCN 2016 and contained in the data plane VCN 2018 can be communicatively couple to cloud services 2056.

In some examples, the pattern illustrated by the architecture of block diagram 2000 of FIG. 20 may be considered an exception to the pattern illustrated by the architecture of block diagram 1900 of FIG. 19 and may be desirable for a customer of the IaaS provider if the IaaS provider cannot directly communicate with the customer (e.g., a disconnected region). The respective containers 2067(1)-(N) that are contained in the VMs 2066(1)-(N) for each customer can be accessed in real-time by the customer. The containers 2067(1)-(N) may be configured to make calls to respective secondary VNICs 2072(1)-(N) contained in app subnet(s) 2026 of the data plane app tier 2046 that can be contained in the container egress VCN 2068. The secondary VNICs 2072(1)-(N) can transmit the calls to the NAT gateway 2038 that may transmit the calls to public Internet 2054. In this example, the containers 2067(1)-(N) that can be accessed in real-time by the customer can be isolated from the control plane VCN 2016 and can be isolated from other entities contained in the data plane VCN 2018. The containers 2067(1)-(N) may also be isolated from resources from other customers.

In other examples, the customer can use the containers 2067(1)-(N) to call cloud services 2056. In this example, the customer may run code in the containers 2067(1)-(N) that requests a service from cloud services 2056. The containers 2067(1)-(N) can transmit this request to the secondary VNICs 2072(1)-(N) that can transmit the request to the NAT gateway that can transmit the request to public Internet 2054. Public Internet 2054 can transmit the request to LB subnet(s) 2022 contained in the control plane VCN 2016 via the Internet gateway 2034. In response to determining the request is valid, the LB subnet(s) can transmit the request to app subnet(s) 2026 that can transmit the request to cloud services 2056 via the service gateway 2036.

It should be appreciated that IaaS architectures 1700, 1800, 1900, 2000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 21 illustrates an example computer system 2100, in which various embodiments may be implemented. The system 2100 may be used to implement any of the computer systems described above. As shown in the figure, computer system 2100 includes a processing unit 2104 that communicates with a number of peripheral subsystems via a bus subsystem 2102. These peripheral subsystems may include a processing acceleration unit 2106, an I/O subsystem 2108, a storage subsystem 2118 and a communications subsystem 2124. Storage subsystem 2118 includes tangible computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative embodiments of the bus subsystem may utilize multiple buses. Bus subsystem 2102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2104, which can be implemented as one or more integrated circuits (e.g., a conventional microprocessor or microcontroller), controls the operation of computer system 2100. One or more processors may be included in processing unit 2104. These processors may include single core or multicore processors. In certain embodiments, processing unit 2104 may be implemented as one or more independent processing units 2132 and/or 2134 with single or multicore processors included in each processing unit. In other embodiments, processing unit 2104 may also be implemented as a quad-core processing unit formed by integrating two dual-core processors into a single chip.

In various embodiments, processing unit 2104 can execute a variety of programs in response to program code and can maintain multiple concurrently executing programs or processes. At any given time, some or all of the program code to be executed can be resident in processor(s) 2104 and/or in storage subsystem 2118. Through suitable programming, processor(s) 2104 can provide various functionalities described above. Computer system 2100 may additionally include a processing acceleration unit 2106, which can include a digital signal processor (DSP), a special-purpose processor, and/or the like.

I/O subsystem 2108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2100 to a user or other computer. For example, user interface output devices may include, without limitation, a variety of display devices that visually convey text, graphics, and audio/video information such as monitors, printers, speakers, headphones, automotive navigation systems, plotters, voice output devices, and modems.

Computer system 2100 may comprise a storage subsystem 2118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2104 provide the functionality described above. Storage subsystem 2118 may also provide a repository for storing data used in accordance with the present disclosure.

As depicted in the example in FIG. 21, storage subsystem 2118 can include various components including a system memory 2110, computer-readable storage media 2122, and a computer readable storage media reader 2120. System memory 2110 may store program instructions that are loadable and executable by processing unit 2104. System memory 2110 may also store data that is used during the execution of the instructions and/or data that is generated during the execution of the program instructions. Various different kinds of programs may be loaded into system memory 2110 including but not limited to client applications, Web browsers, mid-tier applications, relational database management systems (RDBMS), virtual machines, containers, etc.

System memory 2110 may also store an operating system 2116. Examples of operating system 2116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2100 executes one or more virtual machines, the virtual machines along with their guest operating systems (GOSs) may be loaded into system memory 2110 and executed by one or more processors or cores of processing unit 2104.

System memory 2110 can come in different configurations depending upon the type of computer system 2100. For example, system memory 2110 may be volatile memory (such as random-access memory (RAM)) and/or non-volatile memory (such as read-only memory (ROM), flash memory, etc.) Different types of RAM configurations may be provided including a static random-access memory (SRAM), a dynamic random-access memory (DRAM), and others. In some implementations, system memory 2110 may include a basic input/output system (BIOS) containing basic routines that help to transfer information between elements within computer system 2100, such as during start-up.

Computer-readable storage media 2122 may represent remote, local, fixed, and/or removable storage devices plus storage media for temporarily and/or more permanently containing, storing, computer-readable information for use by computer system 2100 including instructions executable by processing unit 2104 of computer system 2100.

Computer-readable storage media 2122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2100.

Machine-readable instructions executable by one or more processors or cores of processing unit 2104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to connect to one or more devices via the Internet. In some embodiments communications subsystem 2124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2124 can provide wired network connectivity (e.g., Ethernet) in addition to or instead of a wireless interface.

In some embodiments, communications subsystem 2124 may also receive input communication in the form of structured and/or unstructured data feeds 2126, event streams 2128, event updates 2130, and the like on behalf of one or more users who may use computer system 2100.

By way of example, communications subsystem 2124 may be configured to receive data feeds 2126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2124 may also be configured to receive data in the form of continuous data streams, which may include event streams 2128 of real-time events and/or event updates 2130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2124 may also be configured to output the structured and/or unstructured data feeds 2126, event streams 2128, event updates 2130, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments, and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method performed by a network device, the network device comprising a first processing plane and a second processing plane, the first processing plane comprising a first plurality of processing units and second processing plane comprising a second plurality of processing units, the processing units in the second plurality of processing units being different from the processing units in the first plurality of processing units, the method comprising:

responsive to a first packet received by the network device for a network flow, performing processing for the network flow by a first processing unit from the first plurality of processing units, the processing comprising:

processing the first packet for the network flow, and programming the second processing plane to handle processing of subsequent packets received by the network device for the network flow; and subsequent to the processing for the network flow performed by the first processing unit, for an action to be performed for the network flow by the first processing plane: (i) identifying, by the first processing plane, the first processing unit from the first plurality of processing units that previously processed the first packet of the network flow based on a signal received from the second processing plane, and (ii) causing the action to be performed by the first processing unit.

2. The method of claim 1 wherein programming the second processing plane for the network flow comprises:

configuring the second processing plane to perform data plane-related functions for the network flow, the data plane-related functions including forwarding packets received by the network device that belong to the network flow.

3. The method of claim 1 wherein the network device is configured to perform one or more network virtualization functions for forwarding data in an overlay network.

4. The method of claim 1 wherein the action is an action performed for the network flow responsive to the network flow being marked as aged, or the action is an action related to processing one or more log entries for the network flow.

5. The method of claim 1 wherein the performing processing by the first processing unit for the network flow comprises:

storing mapping information indicative of a mapping between the network flow and the first processing unit.

6. The method of claim 5 wherein storing the mapping information comprises storing the mapping information in a memory that is shared between the first processing plane and the second processing plane.

7. The method of claim 1:

wherein performing processing by the first processing unit for the network flow comprises building, by the first processing unit, one or more data structures in a cache associated with the first processing unit; and wherein causing the action to be performed by the first processing unit comprises performing, by the first processing unit, the action using at least one of the one or more data structures stored in the cache associated with the first processing unit.

8. The method of claim 1 wherein causing the action to be performed by the first processing unit comprises:

determining, by the second processing plane, that the action is to be performed for the network flow;

identifying, by the second processing plane, that the first processing unit of the first processing plane previously performed processing for the network flow;

sending, by the second processing plane, a signal to the first processing unit, the signal identifying the network flow and the action to be performed; and responsive to the signal received from the second processing plane, performing, by the first processing unit, the action for the network flow.

9. The method of claim 8 wherein sending, by the second processing plane, the signal to the first processing unit comprises:

sending, by the second processing plane, a notification or a control packet to the first processing unit.

10. The method of claim 1 wherein causing the action to be performed by the first processing unit comprises:

determining, by the second processing plane, that the action is to be performed for the network flow;

sending, by the second processing plane and to the first processing plane, a signal including information about the network flow and the action;

identifying, at the first processing plane and based upon the signal received from the second processing plane, the first processing unit of the first processing plane for performing the action for the network flow; and performing, by the first processing unit, the action for the network flow.

11. The method of claim 10 wherein the information about the network flow and the action included in the signal sent by the second processing plane to the first processing plane comprises a hash value generated by the second processing plane based upon an n-tuple corresponding to the network flow.

12. The method of claim 10 wherein:

the information about the network flow and the action included in the signal sent by the second processing plane to the first processing plane comprises an n-tuple corresponding to the network flow; and the identifying, at the first processing plane and based upon the signal received from the second processing plane, the first processing unit of the first processing plane for performing the action for the network flow comprises:

generating, by the first processing plane, a hash value for the n-tuple; and identifying the first processing unit for performing the action for the network flow based upon the hash value.

13. The method of claim 10 wherein:

the information about the network flow and the action included in the signal sent by the second processing plane to the first processing plane comprises information identifying the network flow; and identifying, at the first processing plane and based upon the signal received from the second processing plane, the first processing unit of the first processing plane for performing the action for the network flow comprises:

using mapping information indicative of mappings between processing units of the first processing plane and a set of network flows that the second processing plane is programmed to handle, identifying the first processing plane that the first processing unit is mapped to the network flow.

14. The method of claim 1 wherein causing the action to be performed by the first processing unit comprises:

storing, by the second processing plane, a set of one or more flow entries corresponding to a set of one or more network flows for which the second processing plane is programmed to handle processing, the set of one or more flow entries comprising a first flow entry for the network flow;

writing, by the second processing plane, data to the first flow entry indicative of the action;

determining, based upon the data written by the second processing plane, that the action for the network flow is to be performed by the first processing plane;

determining that the first processing unit of the first processing plane previously performed processing for the network flow corresponding to the first flow entry;

sending a signal to the first processing unit indicative of the network flow and the action; and responsive to receiving the signal, performing, by the first processing unit, the action for the network flow.

15. The method of claim 14 wherein:

the network device comprises a notifications subsystem;

the determining, based upon the data written by the second processing plane, that the action is to be performed by the first processing plane comprises determining by the notifications subsystem that the action is to be performed by the first processing plane;

the determining that the first processing unit previously performed processing for the network flow corresponding to the first flow entry comprises determining by the notifications subsystem that the first processing unit previously performed processing for the network flow corresponding to the first flow entry; and sending the signal to the first processing unit comprises sending, by the notifications subsystem, the notification to the first processing unit indicative of the network flow and the action.

16. The method of claim 1 wherein causing the action to be performed by the first processing unit comprises:

sending, by the first processing unit, a signal to the second processing plane requesting information about any actions for any network flows to be performed by the first processing unit;

responsive to receiving the signal from the first processing unit:

the second processing plane determines that the first processing unit previously processed the network flow;

the second processing plane determines that the action is to be performed for the network flow; and the second processing plane sends a signal to the first processing unit, wherein the signal identifies the network flow and the action; and based upon the signal received from the second processing plane, performing, by the first processing unit, the action for the network flow.

17. The method of claim 1 wherein causing the action to be performed by the first processing unit comprises:

storing, by the second processing plane in a memory shared by the second processing plane and the first processing plane, a set of one or more flow entries corresponding to a set of one or more network flows for which the second processing plane is programmed to handle processing, the set of one or more flow entries comprising a first flow entry for the network flow;

writing, by the second processing plane, data to the first flow entry indicative of the action;

determining, by the first processing unit, that the first processing unit previously performed processing for the network flow;

determining, by the first processing unit and based upon the data written by the second processing plane to the first flow entry, that the action is to be performed for the network flow; and performing, by the first processing unit, the action for the network flow.

18. A network device comprising:

a first processing plane comprising a first plurality of processing units, the first plurality of processing units including a first processing unit; and a second processing plane comprising a second plurality of processing units, wherein the processing units in the second plurality of processing units are different from the processing units in the first plurality of processing units;

responsive to a first packet received by the network device for a network flow, the first processing unit from the first plurality of processing units is configured to:

process the first packet for the network flow;

program the second processing plane to handle processing of subsequent packets received by the network device for the network flow; and store mapping information indicative of a mapping between the network flow and the first processing unit; and subsequent to the programming of the second processing plane by the first processing unit:

the second processing plane is configured to:

determine that an action is to be performed for the network flow;

identify, using the mapping information, that the first processing unit of the first processing plane is mapped to the network flow; and send a signal to the first processing unit, the signal identifying the network flow and the action to be performed; and responsive to the signal received from the second processing plane, the first processing unit is configured to: (i) select the first processing unit that previously processed the first packet of the network flow, and (ii) perform the action for the network flow by the first processing unit.

19. The network device of claim 18 wherein:

the network device is configured to perform one or more network virtualization functions for forwarding data in an overlay network; and the action is an action performed for the network flow responsive to the network flow being marked as aged, or the action is an action related to processing one or more log entries for the network flow.

20. A network device comprising:

a slow path plane; and an accelerated path plane;

wherein the accelerated path plane is configured to perform processing comprising:

for a particular processing unit from the plurality of processing components of the slow path plane, determine a network flow for which an action is to be performed by the slow path plane, wherein the particular processing unit previously programmed the accelerated path plane for the particular flow and processed a first packet of the network flow; and sending information indicative of the network flow to the particular processing unit of the slow path plane; and wherein the slow path plane selects the particular processing unit to perform the action for the network flow.

* * * * *